(12) United States Patent
Suzuki et al.

(10) Patent No.: US 7,430,233 B2
(45) Date of Patent: Sep. 30, 2008

(54) SPREAD-SPECTRUM DEMODULATOR

(75) Inventors: Kenji Suzuki, Kanagawa (JP); Mamoru Ugajin, Tokyo (JP); Tsuneo Tsukahara, Kanagawa (JP)

(73) Assignee: Nippon Telephone and Telegraph Corporation, Tokyo (JP)

( * ) Notice: Subject to any disclaimer, the term of this patent is extended or adjusted under 35 U.S.C. 154(b) by 825 days.

(21) Appl. No.: 10/726,371

(22) Filed: Dec. 2, 2003

(65) Prior Publication Data

US 2004/0156452 A1 Aug. 12, 2004

(30) Foreign Application Priority Data

| Dec. 4, 2002 | (JP) | ............................. 2002/352019 |
| Mar. 17, 2003 | (JP) | ............................. 2003/072669 |
| Aug. 1, 2003 | (JP) | ............................. 2003/285332 |
| Aug. 1, 2003 | (JP) | ............................. 2003/285334 |
| Aug. 1, 2003 | (JP) | ............................. 2003/285340 |

(51) Int. Cl.
*H04B 1/00* (2006.01)

(52) U.S. Cl. .................. 375/142; 375/130; 375/144; 375/147; 375/150; 375/152

(58) Field of Classification Search ......... 375/142–143, 375/145, 148–150, 152, 130, 340, 144, 147; 370/320, 335, 342, 441

See application file for complete search history.

(56) References Cited

U.S. PATENT DOCUMENTS

| 4,606,039 A | * | 8/1986 | Nicolas et al. .............. 375/142 |
| 5,031,191 A | * | 7/1991 | Hiramatsu et al. .......... 375/130 |
| 5,048,052 A | * | 9/1991 | Hamatsu et al. ............. 375/151 |
| 5,504,787 A | * | 4/1996 | Zscheile et al. ............. 375/367 |
| 5,583,884 A | * | 12/1996 | Maruyama et al. .......... 375/143 |

(Continued)

FOREIGN PATENT DOCUMENTS

| JP | 9-321667 | 12/1997 |
| JP | 10-173485 | 6/1998 |
| JP | 10-190524 | 7/1998 |
| JP | 11-239081 | 8/1999 |

(Continued)

OTHER PUBLICATIONS

Marubayashi et al., "Spread Spectrum Communication and Its Applications", IEICE, 1998, pp. 94-145, ISBN4-88562-163X, Abstract.

*Primary Examiner*—Mohammad Ghayour
*Assistant Examiner*—Sophia Vlahos
(74) *Attorney, Agent, or Firm*—Blakely, Sokoloff, Taylor & Zafman LLP

(57) ABSTRACT

A spread-spectrum demodulator includes a spreading code generating section, correlation value computing section, data signal demodulating section, peak signal detecting section, and spreading code generation control section. The spreading code generating section generates a spreading code for correlating with a received spread signal. The correlation value computing section computes a correlation value between the spread signal and the spreading code output from the spreading code generating section. The data signal demodulating section detects the peak of an output from the correlation value computing section and demodulates a data signal on the basis of the detected peak. The peak signal detecting section detects the peak of the output from the correlation value computing section. The spreading code generation control section changes the shifting direction of the spreading code relative to the spread signal every time a peak is detected by the peak signal detecting section.

63 Claims, 34 Drawing Sheets

U.S. PATENT DOCUMENTS

| | | | | |
|---|---|---|---|---|
| 5,940,432 A * | 8/1999 | Saito et al. | ................... | 375/148 |
| 6,366,603 B1 * | 4/2002 | Uchida et al. | ................ | 375/136 |
| 6,385,232 B1 * | 5/2002 | Terashima | ................... | 375/149 |
| 6,487,237 B1 * | 11/2002 | Imaizumi | .................... | 375/149 |
| 6,490,316 B1 * | 12/2002 | Motegi et al. | ............... | 375/150 |
| 6,707,844 B1 * | 3/2004 | Imaizumi et al. | ............ | 375/148 |

FOREIGN PATENT DOCUMENTS

| | | |
|---|---|---|
| JP | 2000-101547 | 4/2000 |
| JP | 2000-261352 | 9/2000 |
| WO | WO 99/06922 | 2/1999 |

* cited by examiner

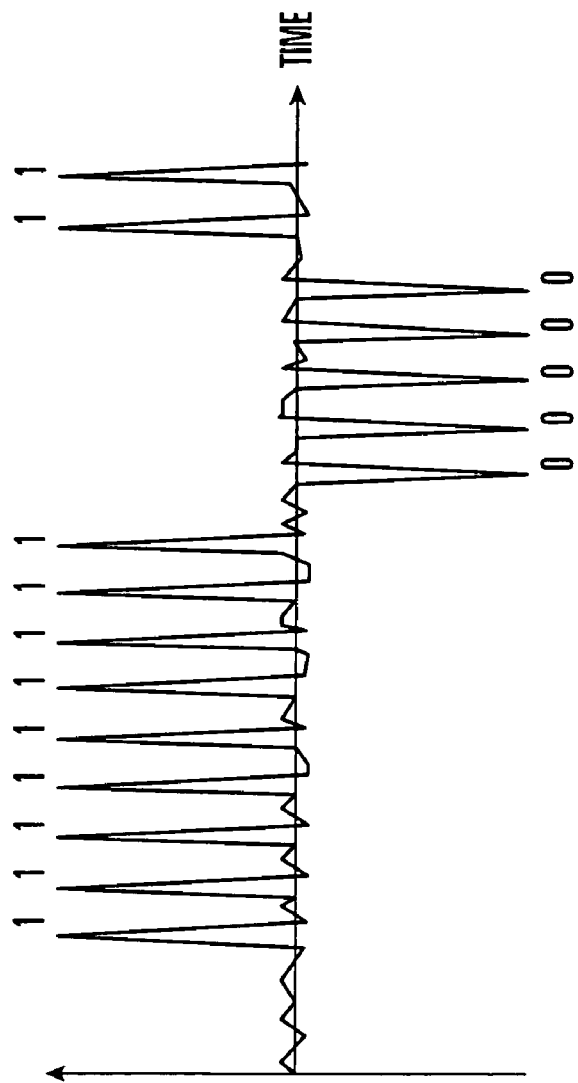
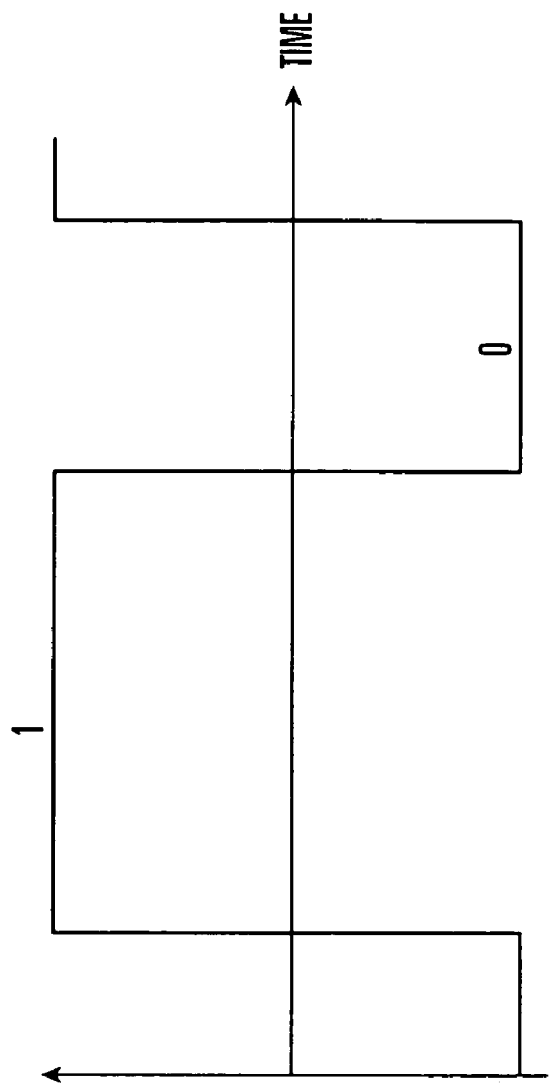
FIG.3A
FIG.3B

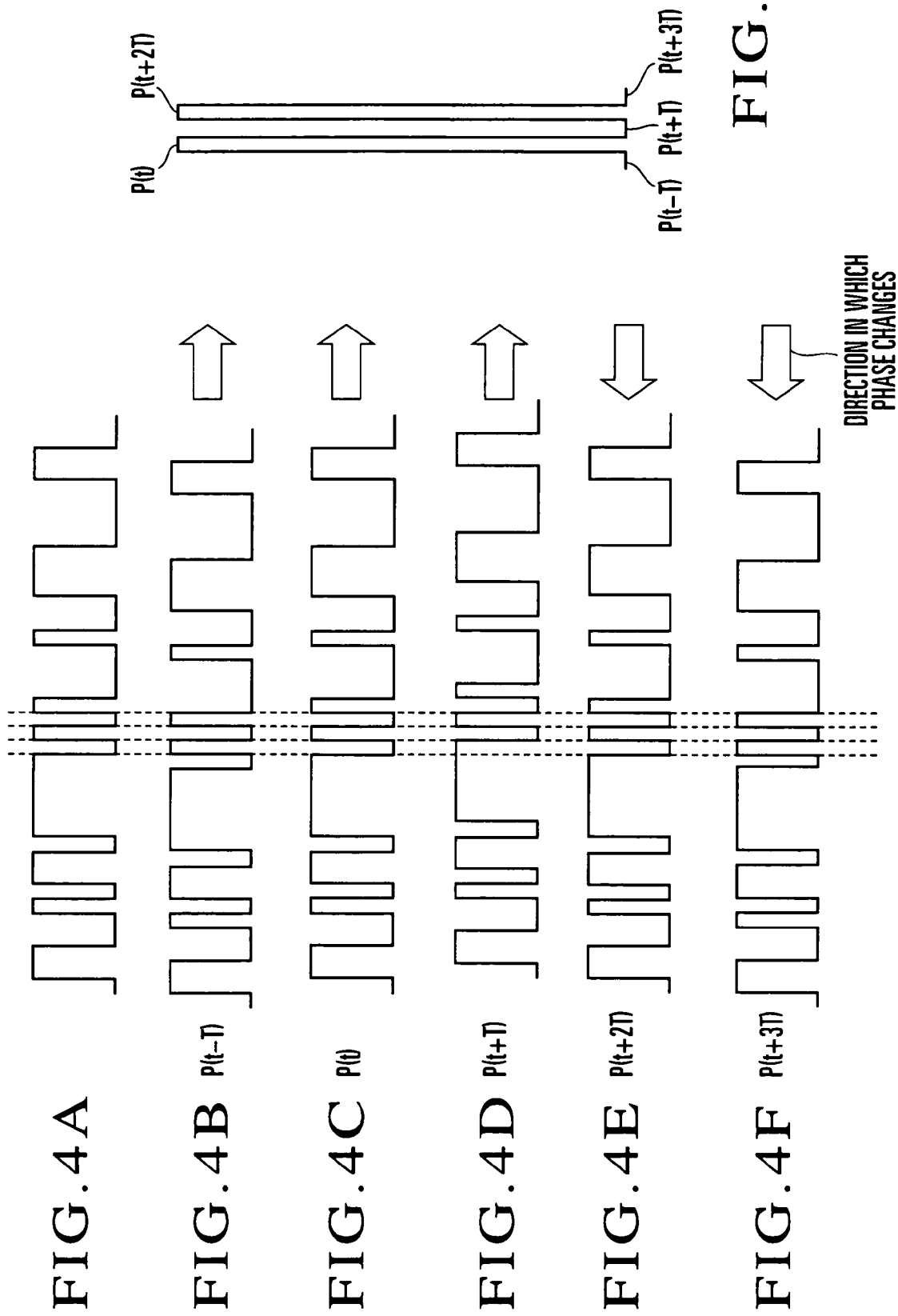

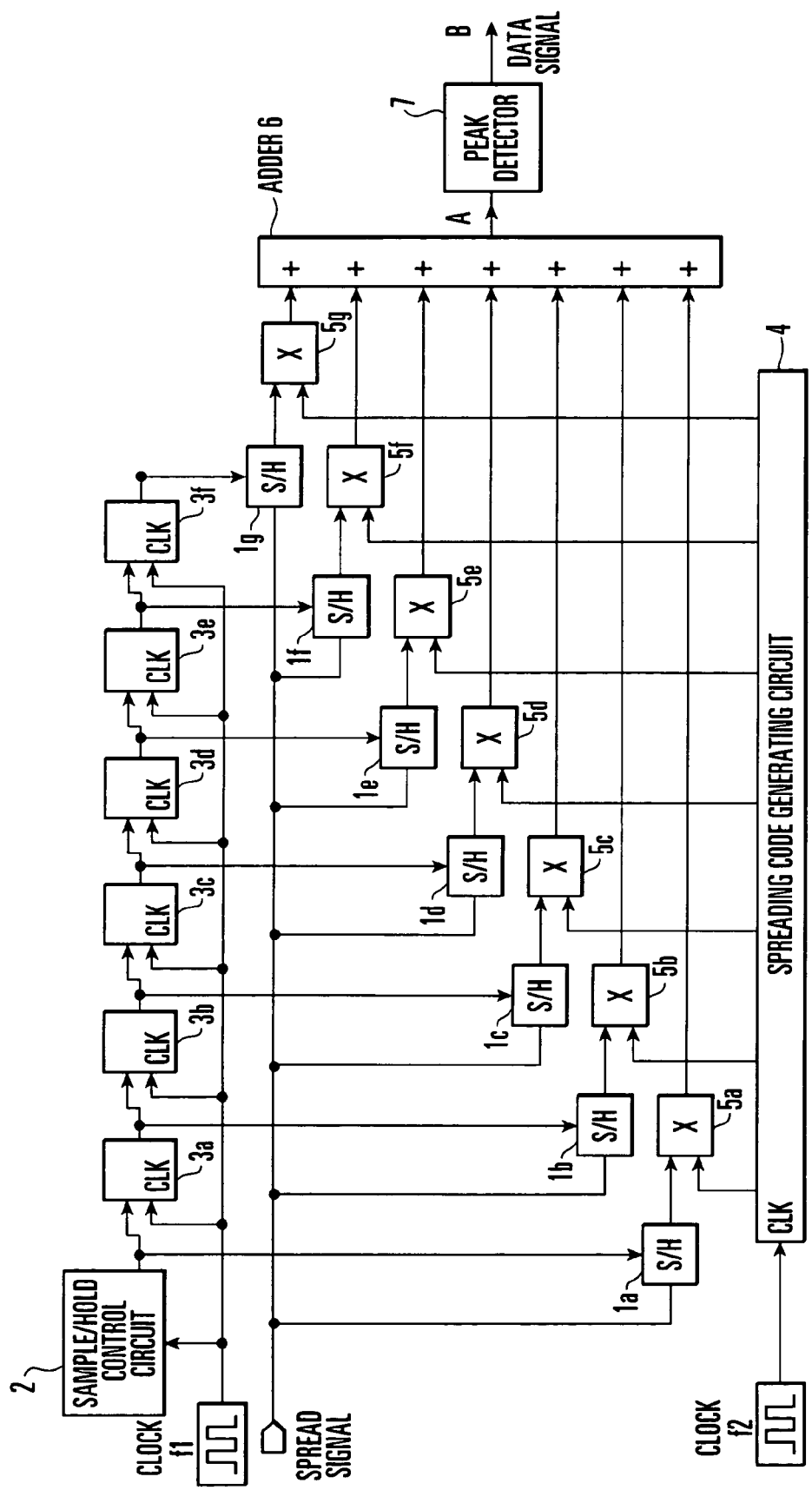

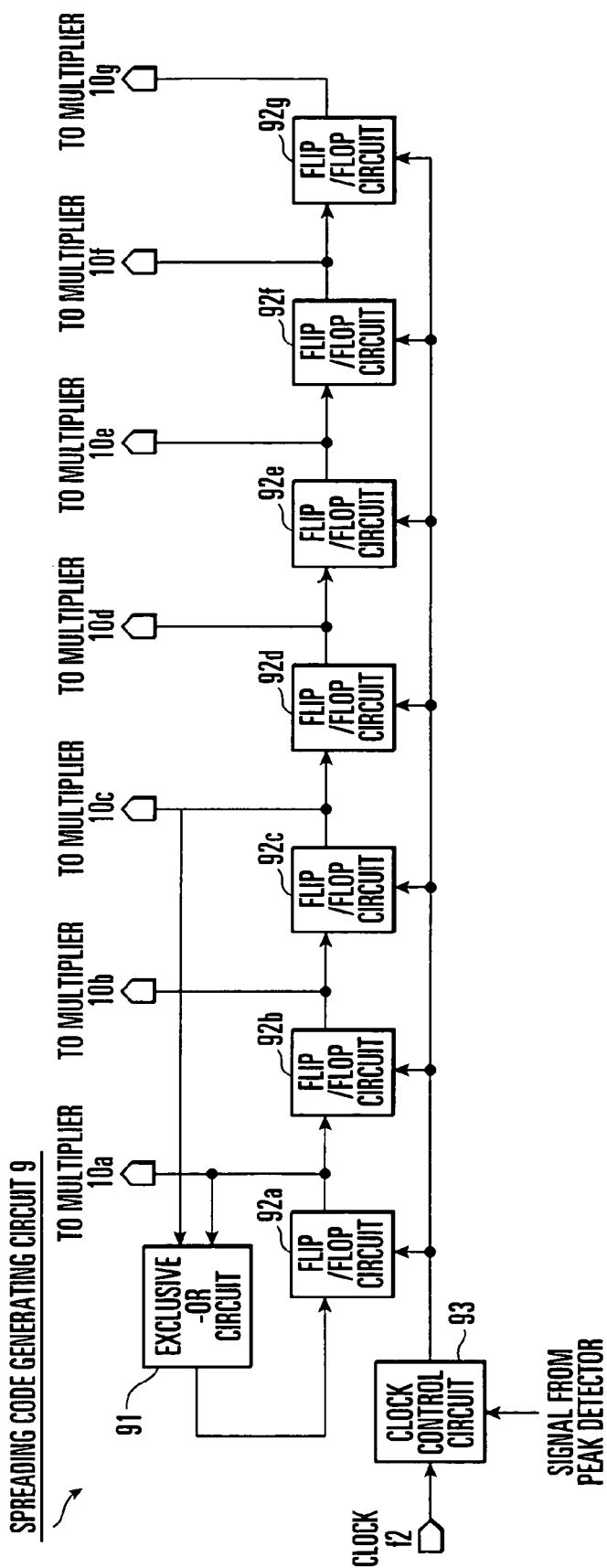
FIG. 11
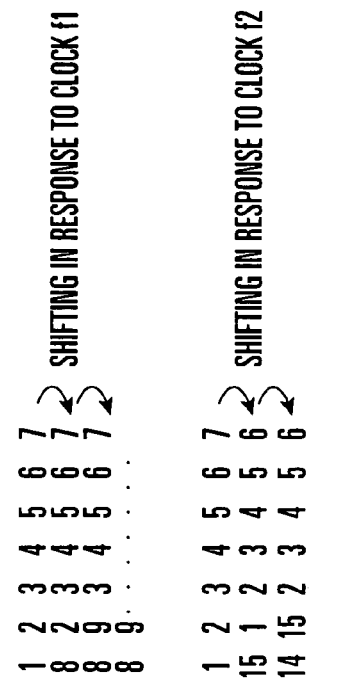
FIG. 12A  CHANGES IN INPUT SPREAD SIGNALS
FIG. 12B  CHANGES IN OUTPUT SPREADING CODES

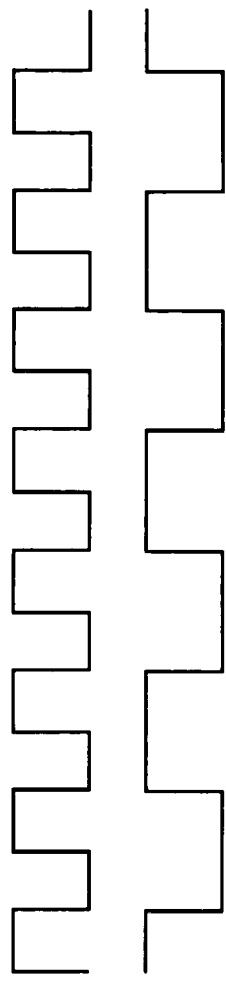
FIG.16A CLOCK f2
FIG.16B CLOCK f3
FIG.16C STATE OF SPREADING CODE GENERATING CIRCUIT
| A | B | C | D | E | F | G | H |
FIG.16D STATE OF POLARITY CONVERSION CIRCUIT
| − | + | − | + | − | + | − | + |
TIME →

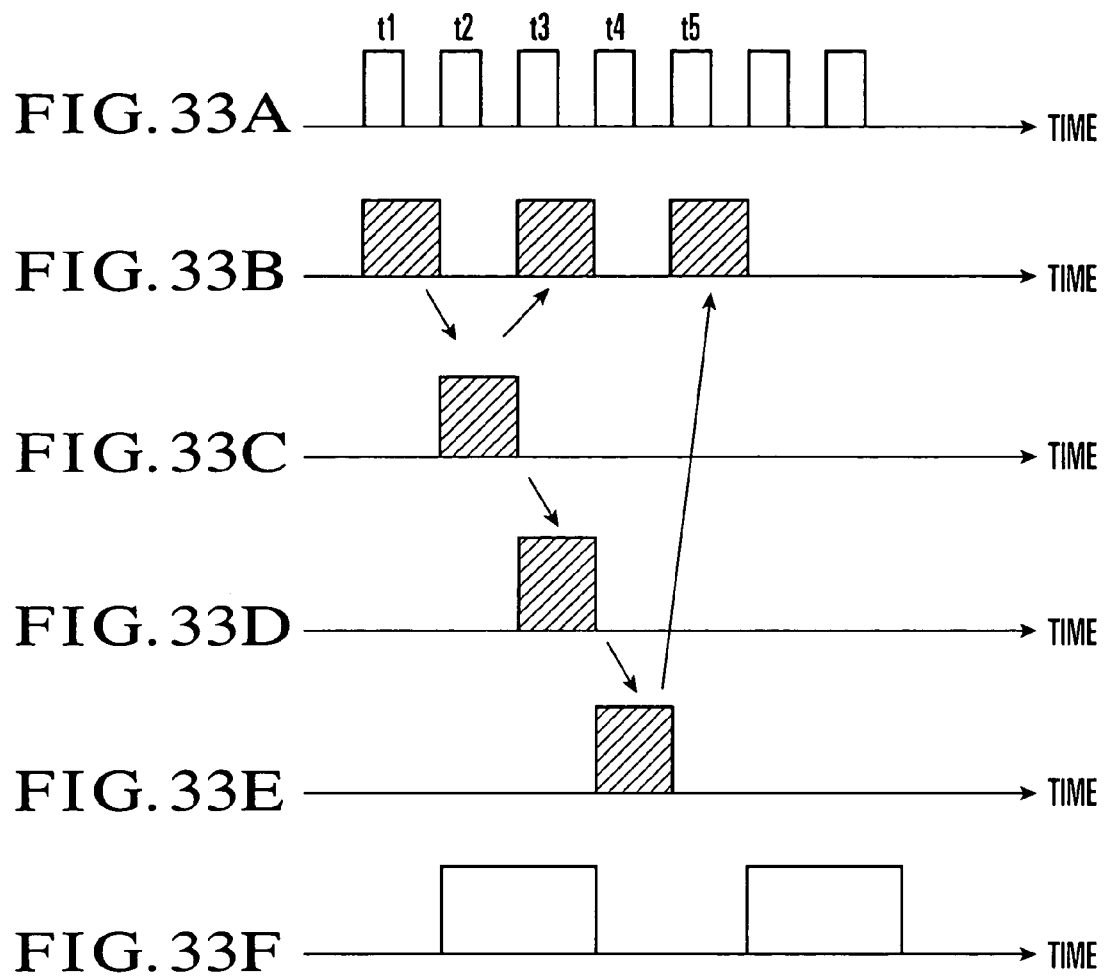
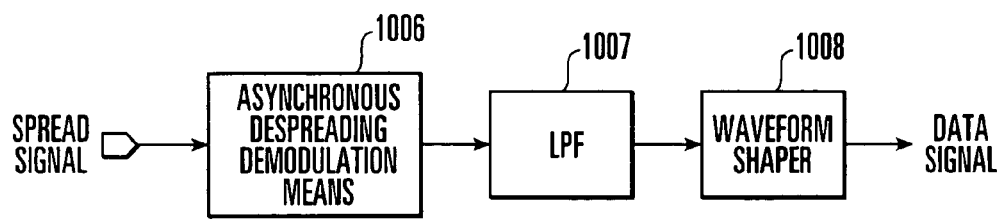
FIG. 34

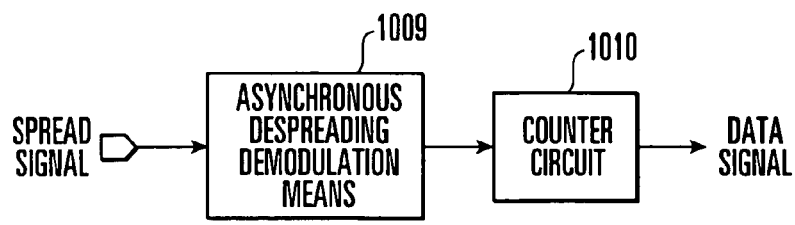
FIG. 36
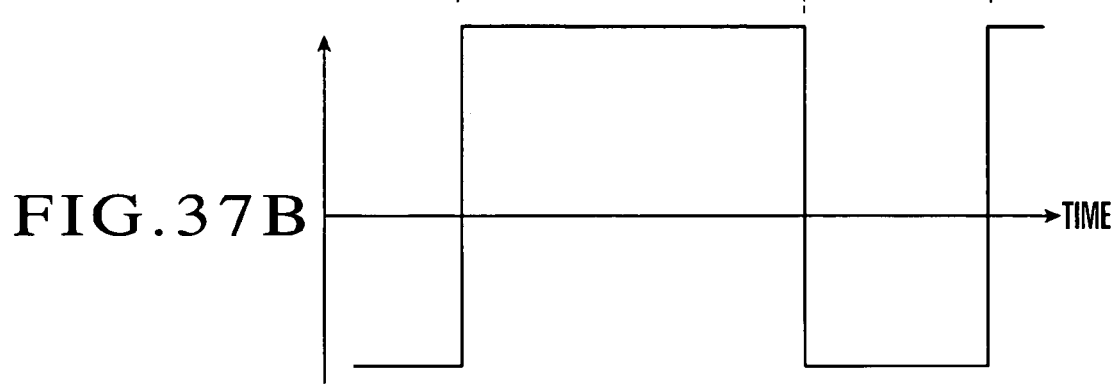
FIG.37A
FIG.37B

SPREAD-SPECTRUM DEMODULATOR

BACKGROUND OF THE INVENTION

The present invention relates to a spread-spectrum demodulator in radio communication, which receives a spread signal transmitted upon frequency spreading of a desired signal by computation using a spreading code, and extracts the desired signal by despreading the received spread signal by computation using the spreading code.

FIG. 38 shows the arrangement of a spread-spectrum demodulator according to the first prior art. In this arrangement, a multiplier 2002 multiplies a received spread signal by the spreading code generated by a spreading code generating circuit 2001. An output from the multiplier 2002 is filtered by a bandpass filter 2005 to extract only a signal component in a necessary band, and an amplitude detector 2008 detects it. A spreading code leading in phase with respect to the spreading code supplied to the multiplier 2002 is supplied to a multiplier 2003. The multiplier 2003 multiplies this spreading code and the spread signal. A spreading code lagging in phase with respect to the spreading code supplied to the multiplier 2002 is supplied to a multiplier 2004. The multiplier 2004 multiplies this spreading code and the spread signal. An output from the multiplier 2003 is filtered by a bandpass filter 2006 and detected by an amplitude detector 2009. Likewise, an output from the multiplier 2004 is filtered by a bandpass filter 2007 and detected by an amplitude detector 2010. The passbands of the bandpass filters 2005 to 2007 are almost the same as the band of data signals. A subtracter 2011 computes the difference between an output from the amplitude detector 2009 and an output from the amplitude detector 2010. A multiplier 2012 multiplies an output from the amplitude detector 2008 and an output from the subtracter 2011. A loop filter 2013 integrates an output from the multiplier 2012 to generate a control voltage. A voltage-controlled oscillator 2014 supplies a clock having frequency proportional to the control voltage to the spreading code generating circuit 2001.

If no synchronization can be established between a spread signal and a spreading code, low-power, noise-like signals are output from the bandpass filters 2005 to 2007. When the spread signal slightly leads in phase in a synchronized state, a large signal appears in the bandpass filter 2006, and a large detection output is obtained from the amplitude detector 2009. When the spread signal slightly lags in phase in a synchronized state, a large output is obtained from the bandpass filter 2007. In the synchronized state, a large output signal is obtained from the amplitude detector 2008. According to the arrangement in FIG. 38, clocks to be supplied to the spreading code generating circuit 2001 are controlled with high precision by using outputs from the three amplitude detectors 2008 to 2010, thereby obtaining a data signal from the amplitude detector 2008.

FIG. 39 shows the arrangement of a spread-spectrum demodulator according to the second prior art. In this arrangement, a matched filter 2111 corresponding to a spreading code converts a received spread signal into a correlation signal, and a delay line 2112 delays the correlation signal by the reciprocal of a data clock. A multiplier 2113 multiplies the delay signal and the correlation signal. A peak detector 2114 then detects the peak of the multiplication result to obtain a data signal. FIG. 40A shows the waveform of an output from the multiplier 2113 in the spread-spectrum demodulator in FIG. 39. FIG. 40B shows the waveform of an output from the peak detector 2114.

The spread-spectrum demodulator having the synchronous control circuit in FIG. 38 and the spread-spectrum demodulator having the matched filter in FIG. 39 are disclosed in, for example, Gen Marubayashi, Masao Nakagawa, and Ryuji Kohno, "Spread Spectrum Communication and Its Applications", IEICE, 1998, pp. 94-145, ISBN4-88562-163-X".

In the spread-spectrum demodulator as the first prior art shown in FIG. 38, a spreading code and a spread signal must be set in phase with each other with high precision. This complicates the circuit arrangement and increases the circuit size and power consumption.

In the spread-spectrum demodulator as the second prior art shown in FIG. 39, a general SAW (Surface Acoustic Wave) filter is used as the matched filter 2111. This leads to increases in implementation area and implementation cost. In addition, since the matched filter 2111 specialized for a specific spreading code is used, a spread signal with a different spreading code cannot be demodulated. In addition, if the matched filter 2111 is formed from an on-chip circuit, the area power consumption increase.

SUMMARY OF THE INVENTION

The present invention has been made in consideration of the above problems, and has as its object to provide a low-power spread-spectrum demodulator which requires no external part and no synchronous control.

It is another object of the present invention to provide a spread-spectrum demodulator which can contribute to reductions in the power and cost of a portable radio.

In order to achieve the above objects, according to the present invention, there is provided a spread-spectrum demodulator comprising a spreading code generating section which generates a spreading code for correlating with a received spread signal, a correlation value computing section which computes a correlation value between the spread signal and the spreading code output from the spreading code generating section, a data signal demodulating section which detects a peak of an output from the correlation value computing section and demodulates a data signal on the basis of the detected peak, a peak signal detecting section which detects the peak of the output from the correlation value computing section, and a spreading code generation control section which changes a shifting direction of the spreading code relative to the spread signal every time a peak is detected by the peak signal detecting section.

BRIEF DESCRIPTION OF THE DRAWINGS

FIGS. 2A to 2E are views for explaining correlation value computation in a correlation value computing section in FIG. 1, in which FIG. 2A is a view showing the waveform of a spread signal, FIGS. 2B to 2D are views each showing the waveform of a spreading code, and FIG. 2E is a view showing the waveform of the correlation signal output from the correlation value computing section;

FIGS. 3A and 3B are views for explaining the operation of a data signal demodulating section in FIG. 1, in which FIG. 3A is a view showing the waveform of an output from the correlation value computing section, and FIG. 3B is a view showing the waveform of an output from the data signal demodulating section;

FIGS. 4A to 4G are views for explaining the operation of a spreading code generation control section in FIG. 1, in which FIG. 4A is a view showing the waveform of a spread signal, FIGS. 4B to 4F are views each showing the waveform of a spreading code, and FIG. 4G is a view showing the waveform of the correlation signal output from the correlation value computing section;

FIG. 5 is a block diagram showing a spread-spectrum demodulator according to the first embodiment of the present invention;

FIGS. 9A and 9B are views showing the operation of the spreading code generating circuit used in the spread-spectrum demodulator in FIG. 5, in which FIG. 9A is a view showing the waveform of the first spreading code, and FIG. 9B is a view showing the waveform of the second spreading code;

FIG. 11 is a block diagram showing an example of a spreading code generating circuit used in the spread-spectrum demodulator in FIG. 10;

FIGS. 12A and 12B are views for explaining a problem which arises when the length of spreading code used in the spread-spectrum demodulator in FIG. 5 does not agree with the number of multipliers, in which FIG. 12A is a view showing changes in spread signals, and FIG. 12B is a view showing changes in spreading codes;

FIGS. 15A and 15B are views for explaining a problem in the spread-spectrum demodulator in FIG. 5, in which FIG. 15A is a view showing the waveform of an output from an adder, and FIG. 15B is a view showing the waveform of an output from a peak detector;

FIGS. 16A to 16D are views for explaining the operation of a polarity conversion circuit used in the spread-spectrum demodulator in FIG. 14, in which FIG. 16A is a view showing the waveform of the second clock, FIG. 16B is a view showing the waveform of the third clock, FIG. 16C is a view showing the state of a spreading code generating circuit, and FIG. 16D is a view showing the state of the polarity conversion circuit;

FIGS. 32A and 32B are views for explaining the operation of the peak detector in FIG. 30, in which FIG. 32A is a view showing the waveform of an output from the adder, and FIG. 32B is a view showing the waveform of the control signal output from a JK flip-flop in the peak detector;

FIGS. 33A to 33F are views for explaining the operation of the spreading code generating circuit in FIG. 29, in which FIG. 33A is a view showing the waveform of the second clock, FIGS. 33B to 33E are views each showing the waveform of an output from a flip-flop circuit, and FIG. 33F is a view showing the waveform of the control signal output from the JK flip-flop in the peak detector;

FIG. 34 is a block diagram showing a spread-spectrum demodulator according to the 16th embodiment of the present invention;

FIGS. 35A to 35D are views for explaining the operation of the spread-spectrum demodulator in FIG. 34, in which FIG. 35A is a view showing the waveform of an output from an adder in an asynchronous despreading demodulation means, FIG. 35B is a view showing the waveform of an output from the asynchronous despreading demodulation means, FIG. 35C is a view showing the waveform of an output from a low-pass filter, and FIG. 35D is a view showing the waveform of an output from a waveform shaper;

FIG. 36 is a block diagram showing a spread-spectrum demodulator according to the 17th embodiment of the present invention;

FIGS. 37A and 37B are views for explaining the operation of the spread-spectrum demodulator in FIG. 36, in which FIG. 37A is a view showing the waveform of an output from an asynchronous despreading demodulation means, and FIG. 37B is a view showing the waveform of an output from a counter circuit;

DESCRIPTION OF THE PREFERRED EMBODIMENTS

The present invention will be described in detail next with reference to the accompanying drawings.

Basic Concept of Present Invention

Figure 1:
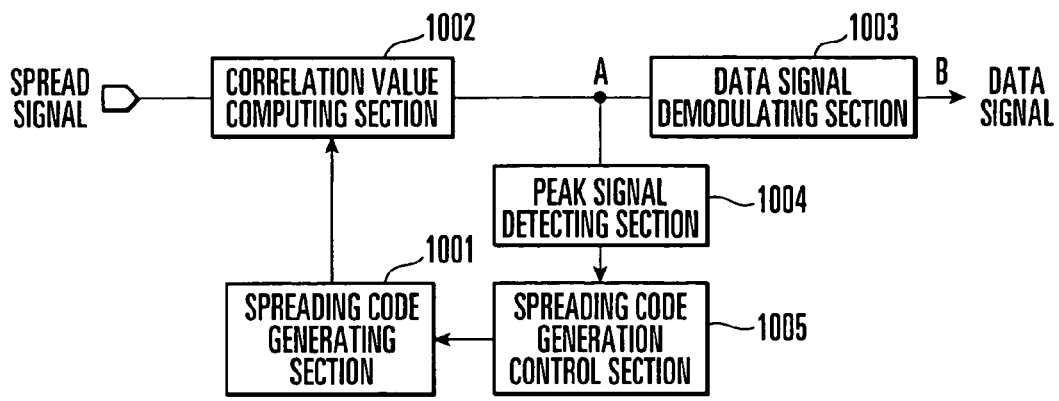
FIG. 1 is a block diagram of a spread-spectrum demodulator, which shows the basic concept of the present invention.

FIG. 1 shows a spread-spectrum demodulator, which shows the basic concept of the present invention. The spread-spectrum demodulator in FIG. 1 is comprised of a spreading code generating section 1001 which generates a spreading code for correlating with a received spread signal, a correlation value computing section 1002 which computes the correlation value between the spread signal and the spreading code output from the spreading code generating section 1001, a data signal demodulating section 1003 which detects the peak of the correlation signal output from the correlation value computing section 1002 and demodulates a data signal (baseband signal) on the basis of the detected peak, a peak signal detecting section 1004 which detects the peak of the correlation signal output from the correlation value computing section 1002, and a spreading code generation control section 1005 which changes the shifting direction of a spreading code relative to a spread signal every time a peak is detected by the peak signal detecting section 1004.

The operation of the spread-spectrum demodulator in FIG. 1 will be described below with reference to the accompanying drawings.

Figure 2A:
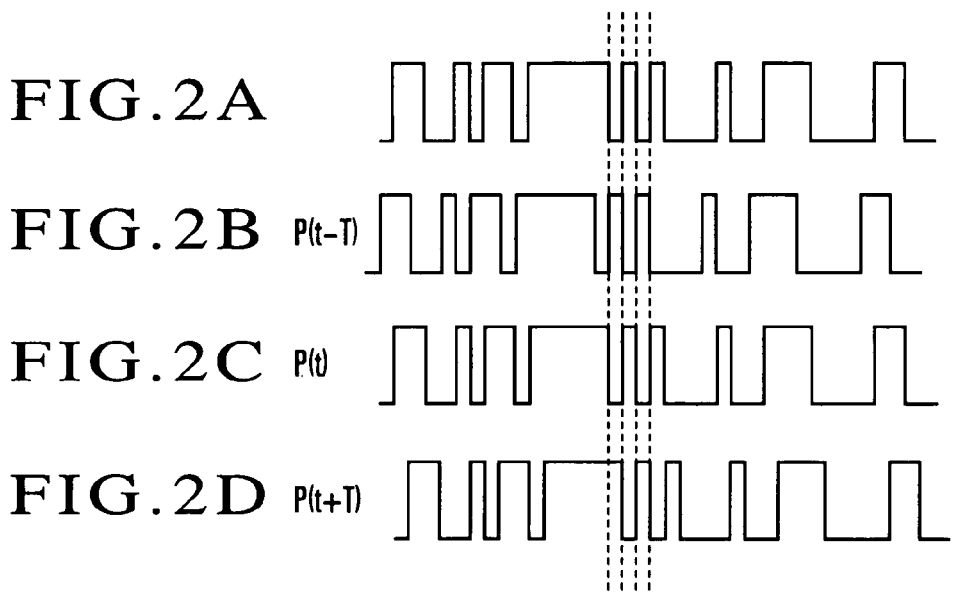
Figure 2E:
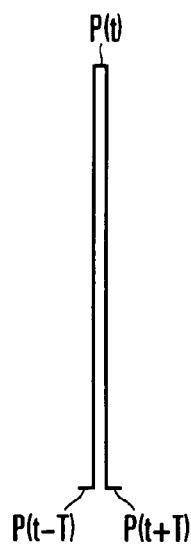

The correlation value computing section 1002 compares time-series changes in an input spread signal with time-series changes in the spreading code output from the spreading code generating section 1001, and outputs a correlation peak signal when the spread signal and spreading code are in phase. FIGS. 2A to 2E explain correlation value computation in the correlation value computing section 1002. FIG. 2A schematically shows the waveform of a spread signal. Each of FIGS. 2B to 2D schematically shows the waveform of a spreading code. FIG. 2E schematically shows a correlation signal output from the correlation value computing section 1002.

The spread signal is input to the correlation value computing section 1002 while shifting at the speed of a first clock f1. The spreading code is input to the correlation value computing section 1002 while shifting at the speed of a second clock f2. The first and second clocks f1 and f2 have arbitrary frequencies.

The spreading code at time P(t−T) in FIG. 2B leads in phase with respect to the spread signal in FIG. 2A. The spreading code at time P(t) in FIG. 2C is in phase with the spread signal. The spreading code at time P(t+T) in FIG. 2D lags in phase with respect to the spread signal. As shown in FIG. 2E, when the spread signal and spreading code are in phase, a correlation peak signal with an S/N ratio corresponding to a spreading ratio can be obtained.

The data signal demodulating section 1003 then detects the peak of the correlation signal output from the correlation value computing section 1002, demodulates the data signal (baseband signal) on the basis of the detected correlation peak signal, and outputs the resultant signal. FIGS. 3A and 3B explain the operation of the data signal demodulating section 1003. FIG. 3A shows an output (a point A in FIG. 1) from the correlation value computing section 1002. FIG. 3B shows an output (a point B in FIG. 1) from the data signal demodulating section 1003. Since the polarity of the correlation peak signal output from the correlation value computing section 1002 changes in accordance with the transmitted data signal, the data signal demodulating section 1003 demodulates the data signal in accordance with the change in the polarity of the correlation peak signal.

The peak signal detecting section 1004 detects the peak of the correlation signal output from the correlation value computing section 1002.

The spreading code generation control section 1005 changes the shifting direction of the spreading code relative to the spread signal every time a peak is detected by the peak signal detecting section 1004. FIGS. 4A to 4G explain the operation of the spreading code generation control section 1005. FIG. 4A schematically shows the waveform of a spread signal. Each of FIGS. 4B to 4F schematically shows the waveform of a spreading code. FIG. 4G schematically shows the waveform of the correlation signal output from the correlation value computing section 1002.

As described above, the spreading code output from the spreading code generating section 1001 is input to the correlation value computing section 1002 while shifting at the speed of the second clock f2.

The spreading code at time P(t−T) in FIG. 4B leads in phase with respect to the spread signal in FIG. 4A. At time P(t), the spreading code shifts to the state shown in FIG. 4C to become in phase with the spread signal in FIG. 4A. Consequently, as shown in FIG. 4G, a correlation peak signal is obtained from the correlation value computing section 1002.

In this case, there is a delay time between the instant at which the peak signal detecting section 1004 detects a correlation peak signal and the instant at which the spreading code generation control section 1005 starts to shift the spreading code in the reverse direction. The spreading code keeps shifting during this delay time to be set in the state at time P(t+T) shown in FIG. 4D. For this reason, a phase shift occurs between the spread signal in FIG. 4A and the spreading code having undergone a change in shift direction after time P(t+T). However, since the spreading code begins to shift in the reverse direction, the spread signal coincides in phase with the spreading code again at time P (t+2T). As a consequence, the next correlation peak signal is obtained from the correlation value computing section 1002.

By subsequently repeating similar control, correlation peak signals can be frequently obtained without waiting for a one-period change in the phase of the spreading code.

The spread-spectrum demodulator in FIG. 1 requires no external part and despreads/demodulates spread signals by using the spreading code generating section 1001 which requires no synchronous control between spread signals and spreading codes. Therefore, a low-power spread-spectrum demodulator can be realized. This in turn makes it possible to achieve reductions in the power and cost of a portable radio incorporating the spread-spectrum demodulator. In addition, the correlation peak signals output from the correlation value computing section 1002 are independent of the first and second clocks f1 and f2 and spreading codes, and correlation peak signals can be frequently obtained. This allows despreading demodulation even if a data signal to be transmitted has a high data clock frequency, and hence makes it possible to increase the data clock frequency.

In the case shown in FIGS. 4A to 4G, the shifting direction of a spreading code is changed every time a peak is detected by the peak signal detecting section 1004. However, the present invention is not limited to this, and may use any arrangement as long as it can change the shifting direction of a correlation signal relative to a spread signal. That is, although the first clock f1 remains unchanged, the second clock f2 can be stopped or changed.

First Embodiment

FIG. 5 shows a spread-spectrum demodulator according to the first embodiment of the present invention. The spread-spectrum demodulator in FIG. 5 is comprised of N (N is an integer equal to or more than 2; 7 in this embodiment) sample/hold circuits 1a to 1g each of which samples/holds an input spread signal, a sample/hold control circuit 2 which receives a first clock f1 and controls the sample/hold circuits 1a to 1g to sequentially perform sample/hold operation, flip-flop circuits 3a to 3f constituting a shift register which shifts an output signal from the sample/hold control circuit 2 in synchronism with the first clock f1, a spreading code generating circuit 4 which generates N spreading codes in synchronism with a second clock f2, N multipliers 5a to 5g which multiply the spread signals output from the sample/hold circuits 1a to 1g and the spreading codes output from the spreading code generating circuit 4 for each corresponding signal, an adder 6 which adds the respective output signals from the multipliers 5a to 5g, and a peak detector 7 which detects the peak value of an output signal from the adder 6 and demodulates a data signal (baseband signal) on the basis of the detected peak.

The sample/hold circuits 1a to 1g, sample/hold control circuit 2, flip-flop circuits 3a to 3f, multipliers 5a to 5g, and adder 6 constitute the correlation value computing section 1002 in FIG. 1. The spreading code generating circuit 4 forms the spreading code generating section 1001 and spreading code generation control section 1005. The peak detector 7 forms the data signal demodulating section 1003 and peak signal detecting section 1004.

As described above, the first clock f1 is a clock having the same frequency as that of the clock used to spread a signal on the transmitting side. The second clock f2 is a clock having the same frequency as that of the clock used to generate a spreading code on the transmitting side. However, the second clock f2 may be faster or as fast as the first clock f1.

This embodiment has exemplified the case wherein N=7 is set to set the number of sample/hold circuits 1a to 1g and the number of multipliers 5a to 5g to N=7, and the number of flip-flop circuits 3a to 3f to (N−1)=6. However, N can be set to any integer equal to or more than 2.

Figure 6:
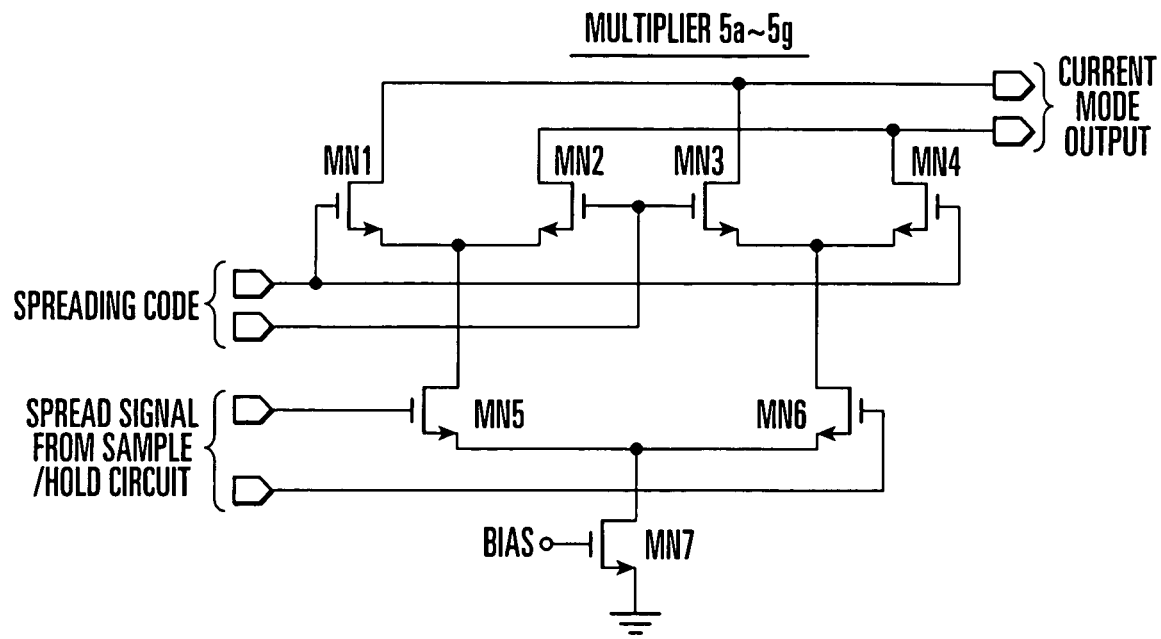
FIG. 6 is a circuit diagram showing an example of a multiplier used in the spread-spectrum demodulator in FIG. 5.

FIG. 6 shows an example of the arrangement of the multiplier 5 (5a to 5g). Each multiplier 5 is formed from a vertical two-stage type differential circuit constituted by NMOS transistors MN1 to MN7. A spreading code output from the spreading code generating circuit 4 and a spread signal output from each sample/hold circuit 1 (1a to 1g) are signals in the differential form. The spreading codes output from the spreading code generating circuit 4 are respectively input to the differential circuit constituted by the transistors MN1 and MN2 and the differential circuit constituted by the transistors MN3 and MN4 in opposite phase. The spread signals output from the sample/hold circuit 1 (1a to 1g) are input to the differential circuit constituted by the transistors MN5 and MN6. As a consequence, the spreading codes and spread signals are multiplied, and the multiplication results are output in the current mode.

Figure 7:
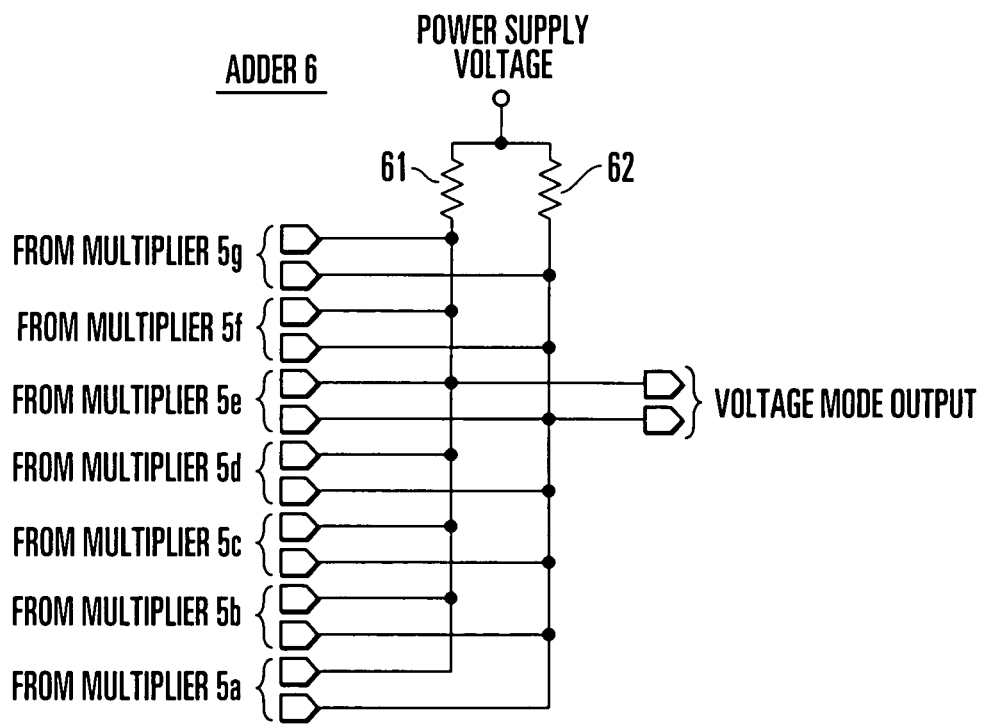
FIG. 7 is a circuit diagram showing an example of an adder used in the spread-spectrum demodulator in FIG. 5.

FIG. 7 shows an example of the arrangement of the adder 6. The adder 6 is comprised of load resistors 61 and 62 each having one end to which a power supply voltage is applied and the other end to which differential outputs from the multipliers 5a to 5g are input. The differential outputs output from the multipliers 5a to 5g in the current mode are converted into voltages by the load resistors 61 and 62 in the adder 6 and added to be output in the voltage mode. The peak of an output signal from the adder 6 is detected by the peak detector 7, and the resultant signal is output as a data signal (baseband signal).

Figure 8:
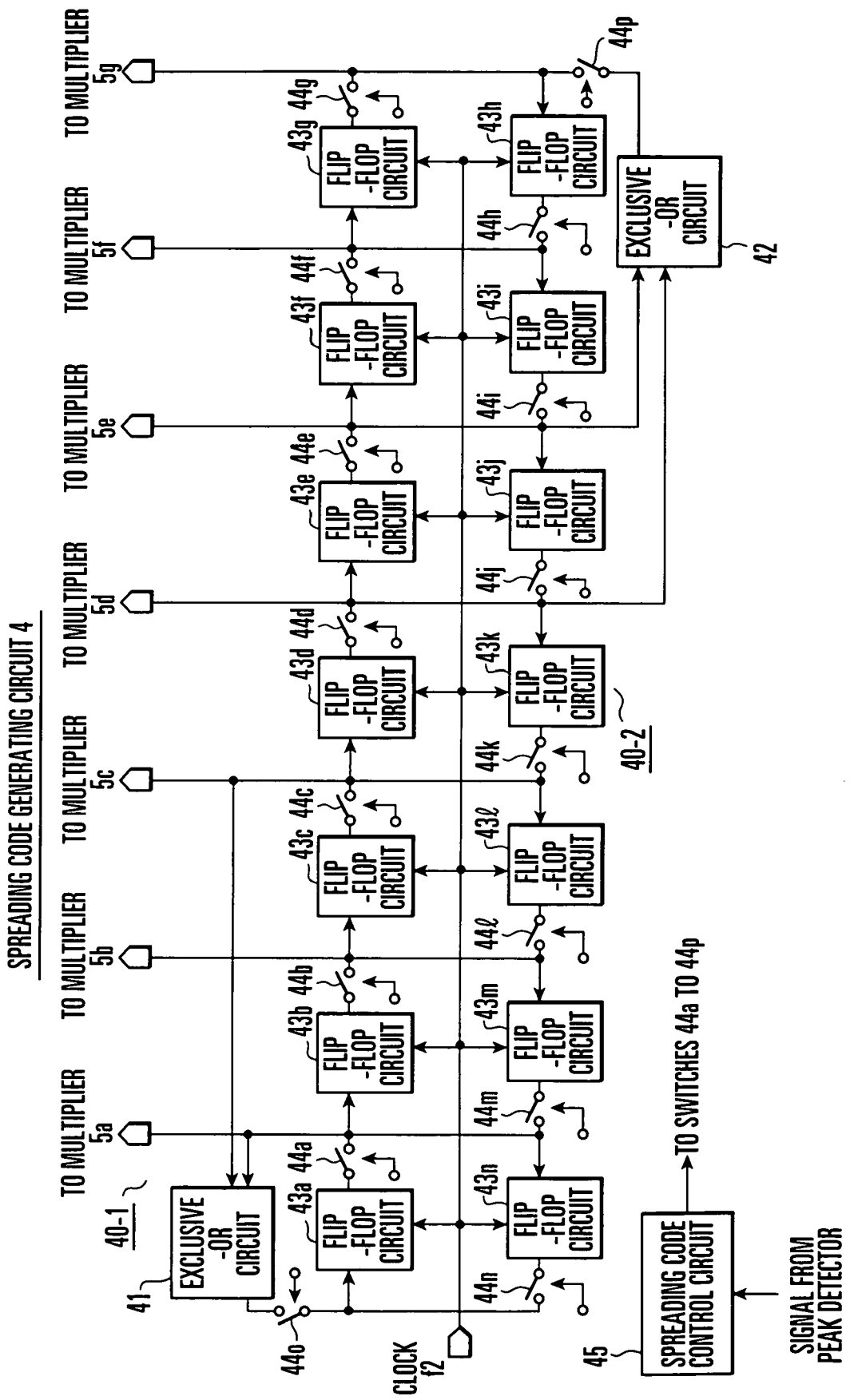
FIG. 8 is a block diagram showing an example of a spreading code generating circuit used in the spread-spectrum demodulator in FIG. 5.

FIG. 8 shows an example of the arrangement of the spreading code generating circuit 4. The spreading code generating circuit 4 is comprised of exclusive-OR circuits 41 and 42, flip-flop circuits 43a to 43n constituting a shift register which performs shifting operation in synchronism with the clock f2, switches 44a to 44p which turn on/off the output paths of the exclusive-OR circuits 41 and 42 and flip-flop circuits 43a to 43n, and a spreading code control circuit 45 which controls the switches 44a to 44p.

In this embodiment, outputs from the flip-flop circuits 43a and 43c are input to the exclusive-OR circuit 41, and the computation result obtained by the exclusive-OR circuit 41 is fed back to the input terminal of the flip-flop circuit 43a, thereby generating the first spreading codes. Outputs from the flip-flop circuits 43j and 43i are input to the exclusive-OR circuit 42, and the computation result obtained by the exclusive-OR circuit 42 is fed back to the input terminal of the flip-flop circuit 43h, thereby generating the second spreading codes which are equivalent to codes obtained by rearranging the first spreading codes in reverse order. That is, the first exclusive-OR circuit 41, the first flip-flop circuit group constituted by flip-flop circuits 43a to 43g, and the first switch group constituted by the switches 44a to 44g and 44o constitute a first spreading code generating circuit 40-1 which generates the first spreading codes. The second exclusive-OR circuit 42, the second flip-flop circuit group constituted by the flip-flop circuits 43h to 43n, and the second switch group constituted by the switches 44h to 44n and 44p constitute a second spreading code generating circuit 40-2 which generates the second spreading codes in which a signal shifts in the reverse direction relative to the first spreading codes.

In this embodiment, outputs from the flip-flop circuits 43a and 43c are input to the exclusive-OR circuit 41, and the resultant data is fed back to the input terminal of the flip-flop circuit 43a, thereby forming spreading codes (PN7 in this case). Meanwhile, outputs from the flip-flop circuits 43i and 43j are input to the exclusive-OR circuit 42, and the resultant data is fed back to the input terminal of the flip-flop circuit 43h, thereby forming spreading codes which are equivalent to codes obtained by rearranging the above spreading codes in reverse order.

By only changing the combinations of inputs to the exclusive-OR circuits 41 and 42 or the number of exclusive-OR circuits, various kinds of spreading codes can be formed. According to the above description of this embodiment, on one hand, outputs from the third and first flip-flop circuits are input to the exclusive-OR circuit, and its output is fed back to the first flip-flop circuit 43a to output the spreading code "31". To output the spreading code "5432", outputs from the fifth, fourth, third, and second flip-flop circuits are input to a 4-input exclusive-OR circuit, and its output is fed back to the first flip-flop circuit. However, these arrangements are the same in that a switch for ON/OFF control should be provided on a feedback path to the first flip-flop circuit. As described above, depending on the pattern of a spreading code to be output, three exclusive-OR circuits may receive inputs from four flip-flop circuits and compute them to output the resultant data.

In this embodiment, since spread signals are sequentially sampled/held by the sample/hold circuits 1a, 1b, 1c, 1d, 1e, 1f, and 1g in the order named, the signals sampled and held by the sample/hold circuits 1a to 1g are in reverse order to the input spread signals. In order to obtain the correlations between the spread signals input to the spread-spectrum demodulator and the spreading codes, the spreading codes may be rearranged in reverse order in accordance with the arrangement order of the spread signals sampled and held by the sample/hold circuits 1a to 1g. It therefore suffices if the first spreading codes output from the first spreading code generating circuit 40-1 are in reverse order to the spreading codes used to spread signals on the transmitting side.

The spreading code control circuit 45 controls the switches 44a to 44p in accordance with peak detection by the peak detector 7. When the switches 44a to 44g and 44o are ON, the switches 44h to 44n and 44p are OFF. Consequently, the first spreading codes generated by the first spreading code generating circuit 40-1 shift from left to right in FIG. 8. In contrast, when the switches 44a to 44g and 44o are OFF, the switches 44h to 44n and 44p are ON. Consequently, the second spreading codes generated by the second spreading code generating circuit 40-2 shift from right to left in FIG. 8.

The spreading code control circuit 45 changes the shifting direction of a spreading code by alternately switching the switches 44a to 44g and 44o of the first switch group and the switches 44h to 44n and 44p of the second switch group every time a peak is detected by the peak detector 7. The flip-flop circuits of one of the first and second spreading code generating circuits 40-1 and 40-2 in which the switches are ON input spreading codes to the corresponding multipliers 5a to 5g. The outputs from these flip-flop circuits are simultaneously input to the flip-flop circuits of the other spreading code generating circuit in which the switches are OFF. For this reason, when the switch groups are to be switched, spreading codes start shifting in the reverse direction while the spreading codes that have been output at this point of time are held.

Figures 9A, 9B:
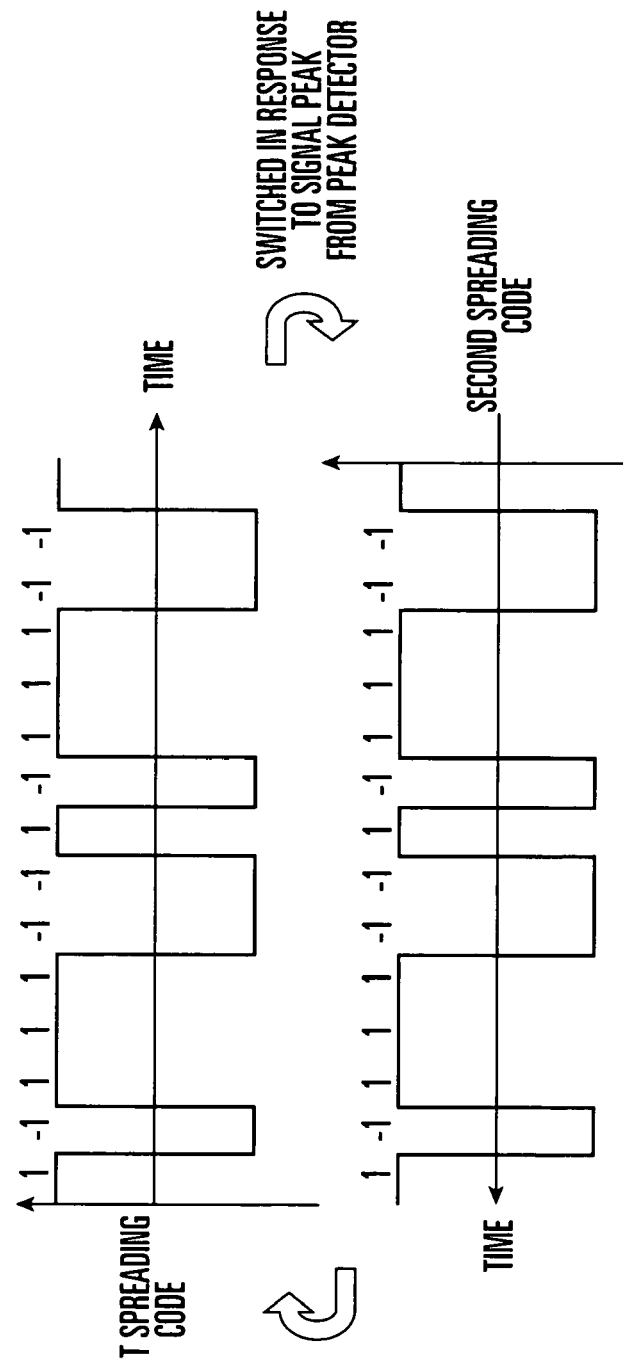

FIGS. 9A and 9B show the waveforms of spreading codes (PN7{1-1111-1-1}) in the spreading code generating circuit in FIG. 8 during operation. FIG. 9A shows the first spreading code generated when the first spreading code generating circuit 40-1 is in the ON state. FIG. 9B shows the second spreading code generated when the second spreading code generating circuit 40-2 is in the ON state.

The operation of the spread-spectrum demodulator according to this embodiment will be described in detail below.

The sample/hold control circuit 2 receives the first clock f1 and generates a sample/hold control signal for sampling/holding a spread signal corresponding to one clock every time clocks equal in number to multipliers 5a to 5g (N=7 clocks in this embodiment) are input.

While shifting the sample/hold control signal output from the sample/hold control circuit 2 to the right in FIG. 5 in synchronism with the clock f1, the flip-flop circuits 3a to 3f constituting the shift register output the signal to each of the sample/hold circuits 1a to 1g.

Assume that the sample/hold circuit 1a samples/holds a spread signal in accordance with the sample/hold control signal. In this case, the sample/hold circuit 1b samples/holds a spread signal with a delay corresponding to one period of the clock f1. Furthermore, the sample/hold circuit 1c samples/holds a spread signal with a delay corresponding to one period of the clock f1. In this manner, the respective sample/hold circuits 1a to 1g sequentially perform sample/hold operation in synchronism with the clock f1.

The received new spread signals are therefore updated and held at the input terminals of the multipliers 5a to 5g by the sample/hold control circuit 2 and flip-flop circuits 3a to 3f every time clocks equal in number to the multipliers are input. The spreading code generating circuit 4 generates spreading codes and inputs them to the multipliers 5a to 5g in synchronism with the clock f2.

The multipliers 5a to 5g multiply the spread signals output from the sample/hold circuits 1a to 1g and the spreading codes output from the spreading code generating circuit 4 for each corresponding signal. The adder 6 adds the respective multiplication results from the multipliers 5a to 5g and outputs the resultant signal.

A spreading code from the spreading code generating circuit 4 becomes in phase with a spread signal at least once in a time interval corresponding to the length of spreading code (code length), and a correlation peak signal is obtained from the adder 6. When the peak detector 7 detects this peak, the spreading code control circuit 45 switches the signal paths between the flip-flop circuits in the spreading code generating circuit 4 to change the shifting direction of spreading codes. If spreading codes shift in one direction, the next correlation peak signal appears when the spreading codes shift and identical spreading code patterns are input to the multipliers 5a to 5g. This occurs once in a time interval corresponding to the length of spreading code. This embodiment has an arrangement in which every time a peak is detected by the peak detector 7, the shifting direction of a spreading code is changed. For this reason, when a correlation peak signal is obtained, the spreading code control circuit 45 changes the shifting direction of spreading codes, and the spreading codes shifting in the reverse direction are input to the multipliers 5a to 5g.

In a delay time between the instant at which the peak detector 7 detects a correlation peak signal and the instant at which spreading codes begin to shift in the reverse direction, the spreading codes input to the multipliers 5a to 5g keep shifting in the shifting direction before the change of the shifting direction. For this reason, the spreading code patterns obtained when the correlation peak signal is detected become out of phase with the spreading codes input to the multipliers 5a to 5g when the shifting direction is changed. However, since the spreading codes input to the multipliers 5a to 5g begin to shift in the reverse direction, the spread signals become in phase with the spreading codes soon after the shifting direction is changed, and the next correlation peak signal can be obtained from the adder 6. When the next correlation peak signal is detected by the peak detector 7, the spreading code control circuit 45 changes the shifting direction of spreading codes to the reverse direction. Assume that the response speed of the control system is so high that the shifting direction of spreading codes is changed before spreading codes go out of phase with spreading code patterns at the time of acquisition of a signal peak. In this case, the spreading codes may be shifted in the reverse direction with a delay of a predetermined period of time.

By subsequently repeating similar control, correlation peak signals can be frequently obtained regardless of the length of spreading code to be used. In this arrangement, by changing the shifting direction of spreading codes in the spreading code generating circuit 4 in accordance with the detection of a peak by the peak detector 7, correlation peak signals can be obtained from the adder 6 independently of the clock signals f1 and f2 and the spreading codes to be used.

In this arrangement, positive and negative correlation value outputs can be obtained from the adder 6 in accordance with digital data "1" and "0" sent from the transmitting side. Upon detecting the peak of an output signal from the adder 6, the peak detector 7 outputs a digital data signal (baseband signal). The signal waveform at the output terminal (a point A in FIG. 5) of the adder 6 is the same as that shown in FIG. 3A. The signal waveform at the output terminal (a point B in FIG. 5) of the peak detector 7 is the same as that shown in FIG. 3B.

The spread-spectrum demodulator in FIG. 5 requires no external part and despreads/demodulates spread signals by using the spreading code generating circuit 4 which requires no synchronous control between spread signals and spreading codes. Therefore, a low-power spread-spectrum demodulator can be realized. This in turn makes it possible to achieve reductions in the power and cost of a portable radio incorporating the spread-spectrum demodulator. In addition, in this embodiment, the correlation peak signals output from the adder 6 are independent of the clocks f1 and f2 and spreading codes to be used. This allows despreading demodulation even if a data signal to be transmitted has a high data clock frequency, and hence makes it possible to increase the data clock frequency.

Second Embodiment

Figure 10:
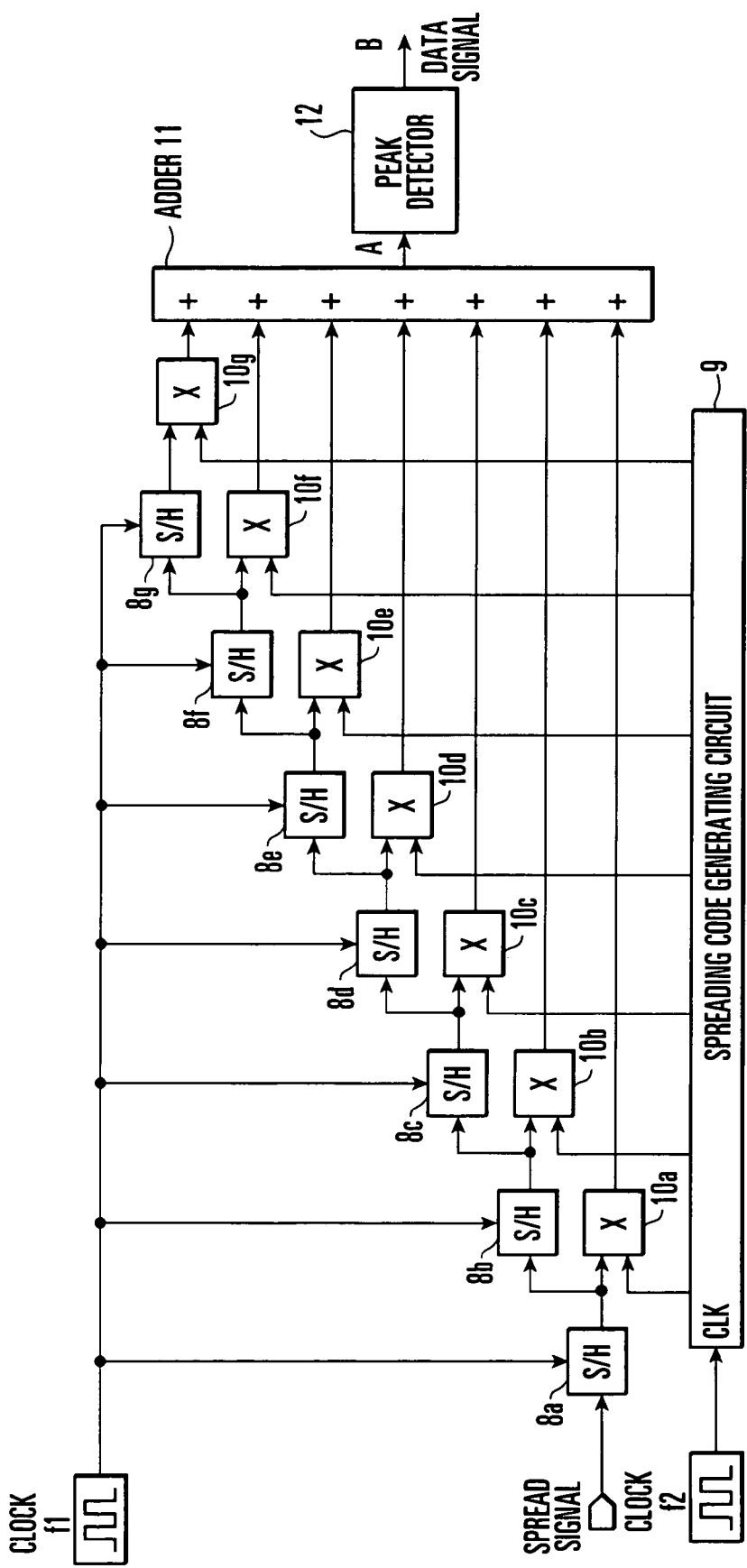
FIG. 10 is a block diagram showing a spread-spectrum demodulator according to the second embodiment of the present invention.

FIG. 10 shows a spread-spectrum demodulator according to the second embodiment of the present invention. The spread-spectrum demodulator in FIG. 10 is comprised of N (N=7 in this embodiment) sample/holds circuits 8a to 8g each of which samples/holds an input spread signal in synchronism with a first clock f1, a spreading code generating circuit 9 which generates N spreading codes in synchronism with a second clock f2, N multipliers 10a to 10g which multiply the signals output from the sample/hold circuits 8a to 8g by the spreading codes output from the spreading code generating circuit 9 for each corresponding signal, an adder 11 which adds the respective output signals from the multipliers 10a to 10g, and a peak detector 12 which detects the peak value of an output signal from the adder 11 and demodulates a data signal on the basis of the detected peak.

The sample/hold circuits 8a to 8g, multipliers 10a to 10g, and adder 11 constitute the correlation value computing section 1002. The spreading code generating circuit 9 forms the spreading code generating section 1001 and spreading code generation control section 1005. The peak detector 12 forms the data signal demodulating section 1003 and peak signal detecting section 1004.

This embodiment has exemplified the case wherein N=7 is set to set the number of sample/hold circuits to 7, and the number of multipliers to 7. However, N can be set to any integer equal to or more than 2.

FIG. 11 shows an example of the arrangement of the spreading code generating circuit 9 in this embodiment. The spreading code generating circuit 9 is comprised of an exclusive-OR circuit 91, flip-flop circuits 92a to 92g constituting a shift register which shifts an output from the exclusive-OR circuit 91 in synchronism with the clock f2, and a clock control circuit 93 which controls the inputting of the second clock f2 to the flip-flop circuits 92a to 92g in accordance with the detection of a peak by the peak detector 12. In this embodiment, outputs from the flip-flop circuits 92a and 92c are input to the exclusive-OR circuit 91, and the computation result by obtained by the exclusive-OR circuit 91 is fed back to the input terminal of the flip-flop circuit 92a, thereby generating spreading codes (PN7 in this embodiment).

By only changing the combinations of inputs to the exclusive-OR circuit or the number of exclusive-OR circuits, various kinds of spreading codes can be formed. According to the above description of this embodiment, outputs from the third and first flip-flop circuits are input to the exclusive-OR circuit, and its output is fed back to the first flip-flop circuit 92a to output the spreading code "31". To output the spreading code "5432", outputs from the fifth, fourth, third, and second flip-flop circuits are input to a 4-input exclusive-OR circuit, and its output is fed back to the first flip-flop circuit. As described above, depending on the pattern of a spreading code to be output, three exclusive-OR circuits may receive inputs from four flip-flop circuits and compute them to output the resultant data.

Note that when the numbers of sample/hold circuits 8a to 8g and multipliers 10a to 10g are to be increased, the number of flip-flop circuits 92 of the spreading code generating circuit 9 may be increased accordingly. In this embodiment, unlike in the first embodiment, the signals sampled/held by the sample/hold circuits 8a to 8g are arranged in the same order as that of input spread signals. Therefore, the spreading codes need not be rearranged in reverse order, and the spreading codes output from the spreading code generating circuit 9 may be arranged in the same order as that of the spreading codes used to spread signals on the transmitting side.

The operation of the spread-spectrum demodulator according to this embodiment will be described in detail below. A spread signal is sampled/held by the sample/hold circuits 8a to 8g, and the resultant signals are input to the multipliers 10a to 10g. At this time, the spread signals received/held by the sample/hold circuits 8a to 8g are input to the multipliers 10a to 10g, and the spread signal input and held by the sample/hold circuit on the next stage at the period of the clock f1 synchronized with the spread signal shifts at the period of the clock f1. With the above operation, the spread signals are sequentially supplied from the sample/hold circuits 8a to 8g to the multipliers 10a to 10g with a delay corresponding to one period of the clock f1. In this embodiment, spread signals each corresponding to a chip rate of 7 are always input from the sample/hold circuits 8a to 8g to the multipliers 10a to 10g. This 7-chip-rate spread signal is updated in synchronism with the clock f1. The arrangement of each multiplier 10 (10a to 10g) is the same as that of each multiplier 5 (5a to 5g) in the first embodiment.

The spreading code generating circuit 9 outputs a spreading code in synchronism with the clock f2 (f2>f1). The spreading codes output from the flip-flop circuits 92a to 92g of the spreading code generating circuit 9 are output to the multipliers 10a to 10g. The flip-flop circuits 92a to 92g are cascaded to form a shift register. Therefore, the spreading code is output to each of the multipliers 10a to 10g while shifting to the right in FIG. 11 in synchronism with the clock f2.

The multipliers 10a to 10g multiply the spread signals output from the sample/hold circuits 8a to 8g and the spreading codes output from the spreading code generating circuit 9 for each corresponding signal. The adder 11 adds the multiplication results from the multipliers 10a to 10g and outputs the resultant signal. The arrangement of the adder 11 is the same as that of the adder 6 in the first embodiment.

Upon detecting the peak of an output signal from the adder 11, the peak detector 12 outputs a digital data signal (baseband signal).

As described in the first embodiment, when a spread signal becomes in phase with a spreading code, a correlation peak signal (called the first correlation peak signal) can be obtained from the adder 11. When the peak detector 12 detects the first correlation peak signal, the clock control circuit 93 stops inputting the clock f2 to the flip-flop circuits 92a to 92g of the spreading code generating circuit 9. With this operation, spreading codes are held by the flip-flop circuits 92a to 92g without being shifted.

In a delay time between the instant at which the peak detector 12 detects the first correlation peak signal and the instant at which the spreading code actually stops shifting, the phases of the spread signal and spreading code keep change at the frequency difference between the clocks f1 and f2. For this reason, when the spreading code stops shifting, a phase difference occurs between the spread signal and the spreading code as compared with those at the time of detection of the first correlation peak signal. The spreading code slightly leads in phase with respect to the spread signal.

Since the spread signal shifts in synchronism with the clock f1 even after the spreading code stops shifting, the phases of the spread signal and spreading code change at the speed of f1, and the spread signal, which has lagged in phase with respect to the spreading code, changes in a direction to lead in phase. When the spreading code stops shifting, the spreading code slightly leads in phase with respect to the spread signal. Therefore, the spread signal becomes in phase with the spreading code soon after the spreading code stops shifting, and a correlation peak signal (called the second correlation peak signal) is obtained from the adder 11.

When the second correlation peak signal is detected by the peak detector 12 after the clock control circuit 93 stops inputting the clock f2 to the spreading code generating circuit 9 in accordance with the first correlation peak signal, the clock control circuit 93 resumes inputting the clock f2 to the flip-flop circuits 92a to 92g of the spreading code generating circuit 9. In a delay time between the instant at which the peak detector 12 detects the second correlation peak signal and the instant at which shifting of the spreading code is actually resumed, the phases of the spread signal and spreading code keep changing at the frequency of the clock f1. For this reason, when shifting of the spreading code is resumed, a phase difference has occurred between the spread signal and the spreading code as compared with those at the time of the detection of the second correlation peak signal. The spread signal slightly leads in phase with respect to the spreading code.

After shifting of the spreading code is resumed, the phases of the spread signal and spreading code begin to change again at the frequency difference between the clocks f1 and f2 such that the spread signal leads in phase with respect to the spreading code. When the spreading code resumes shifting, the spread signal slightly leads in phase with respect to the spreading code. Therefore, the spread signal becomes in phase with the spreading code again soon after the spreading code resumes shifting, and a correlation peak signal (called the third correlation peak signal) is obtained from the adder 11.

When the third correlation peak signal is detected by the peak detector 12 after the clock control circuit 93 resumes inputting the clock f2 to the spreading code generating circuit 9 in accordance with the second correlation peak signal, the clock control circuit 93 stops inputting the clock f2 to the spreading code generating circuit 9.

By subsequently repeating similar control, correlation peak signals can be frequently obtained. If the response speed of the control system is too high, delay times may be set in stopping and resuming the supply of the clock f2.

In the spread-spectrum demodulator in FIG. 10 without any clock control circuit, the obtained period of a correlation peak signal depends on the sum or difference frequency between the clocks f1 and f2 or the length of spreading code to be used. In this embodiment, however, a correlation peak signal can be obtained independently of the clocks f1 and f2 and the spreading code to be used. The signal waveform of an output (a point A in FIG. 10) of the adder 11 is the same as that shown in FIG. 3A. The signal waveform of an output (a point B in FIG. 10) from the peak detector 12 is the same as that shown in FIG. 3B.

The spread-spectrum demodulator in FIG. 10 requires no external part and despreads/demodulates spread signals by using the spreading code generating circuit 9 which requires no synchronous control between spread signals and spreading codes. Therefore, a low-power spread-spectrum demodulator can be realized. This in turn makes it possible to achieve reductions in the power and cost of a portable radio incorporating the spread-spectrum demodulator. In addition, in this embodiment, the correlation peak signals output from the adder 11 are independent of the clocks f1 and f2 and spreading codes to be used. This allows despreading demodulation even if a data signal to be transmitted has a high data clock frequency, and hence makes it possible to increase the data clock frequency.

This embodiment is configured to stop/resume inputting the clock f2 to the flip-flop circuits 92a to 92g of the spreading code generating circuit 9 every time a correlation peak signal from the adder 11 is detected. However, a similar effect can be obtained as follows. When a correlation peak signal is detected, inputting of the clock f2 to the flip-flop circuits 92a to 92g of the spreading code generating circuit 9 is stopped. After a predetermined period of time, inputting of the clock f2 is automatically resumed without detecting the next correlation peak signal.

In addition, in this embodiment, the phases of a spread signal and spreading code change at the difference frequency between the clocks f1 and f2. This is because the spread signal and spreading code shift in the same direction. If they shift in opposite directions, the phases of the spread signal and spreading code change at the sum frequency of the clocks f1 and f2.

Third Embodiment

In the third embodiment, the spreading code generating circuit 4 which receives the clock f2 and generates spreading codes and the spreading code control circuit 45 in the arrangement of the spread-spectrum demodulator according to the first embodiment are formed from devices such as a PLD (Programmable Logic Device) and DSP (Digital Signal Processor).

In this case, the length of spreading code to be used is 15 (PN15). When the length of spreading code (15) to be used greatly differs from the number (7) of multipliers in the spread-spectrum demodulator as in this embodiment, the following problem arises in the first embodiment. This problem will be described in detail with reference to FIGS. 12A and 12B. Sample/hold circuits 1a to 1g sample/hold that portion of a spreading code with a code length of 15 which corresponds to a code length of 7 at a period of f1×7. FIG. 12A shows how a spread signal changes. Referring to FIG. 12A, "1" indicates the first spread signal and "2" indicates the second spread signal, that is, each spreading code is expressed by a numeral. As shown in FIG. 12A, the spread signal sampled/held sequentially changes one by one at a period of f1×7, and the resultant signals are input to multipliers 5a to 5g.

A spreading code generating circuit 4 outputs that portion of the spreading code with a code length of 15 which corresponds to a code length of 7. The spreading code output at this time shifts in synchronism with the clock f2, as shown in FIG. 12B. In this case, as shown in FIGS. 12A and 12B, after spread signals "1" to "7" are input to the multipliers 5a to 5g, spread signals "8" to "7" are input to the multipliers 5a to 5g at the next clock timing. In contrast to this, after spreading codes "1" to "7" are input to the multipliers 5a to 5g, spreading codes "15" to "6" are input to the multipliers 5a to 5g at the next clock timing. That is, the codes change differently. For this reason, even when the shifting direction of the spreading code is changed upon detection of a signal peak, it takes much time for the spreading code and spread signal to coincide with each other. That is, the next signal peak does not appear soon.

This embodiment therefore has an arrangement in which corresponding spreading codes are generated by a DSP, PLD, and the like and are input to the multipliers 5a to 5g. In this arrangement, changes in the spread signal pattern to be sampled/held can be known from the length of spreading code to be used and the number of multipliers. Therefore, changes in spreading code patterns input to the multipliers are controlled by the DSP, PLD, and the like upon acquisition of a signal peak such that the spreading codes coincide with the spread signals, and the resultant spreading codes are input to the respective multipliers. With this operation, immediately after a signal peak is obtained, the next signal peak can be obtained. Even if spreading codes to be used differ in number from the multipliers, signal peaks can be frequently obtained by the above control method. This makes it possible to perform despreading demodulation even if the data clock frequency is high.

Note that the spreading code control circuit 45 and sample/hold control circuit 2 in the first embodiment and the flip-flop circuits and exclusive-OR circuits of the spreading code generating circuit 9 and the clock control circuit 93 in the second embodiment can be formed from DSPs, PLDs, and the like.

Fourth Embodiment

Figure 13:
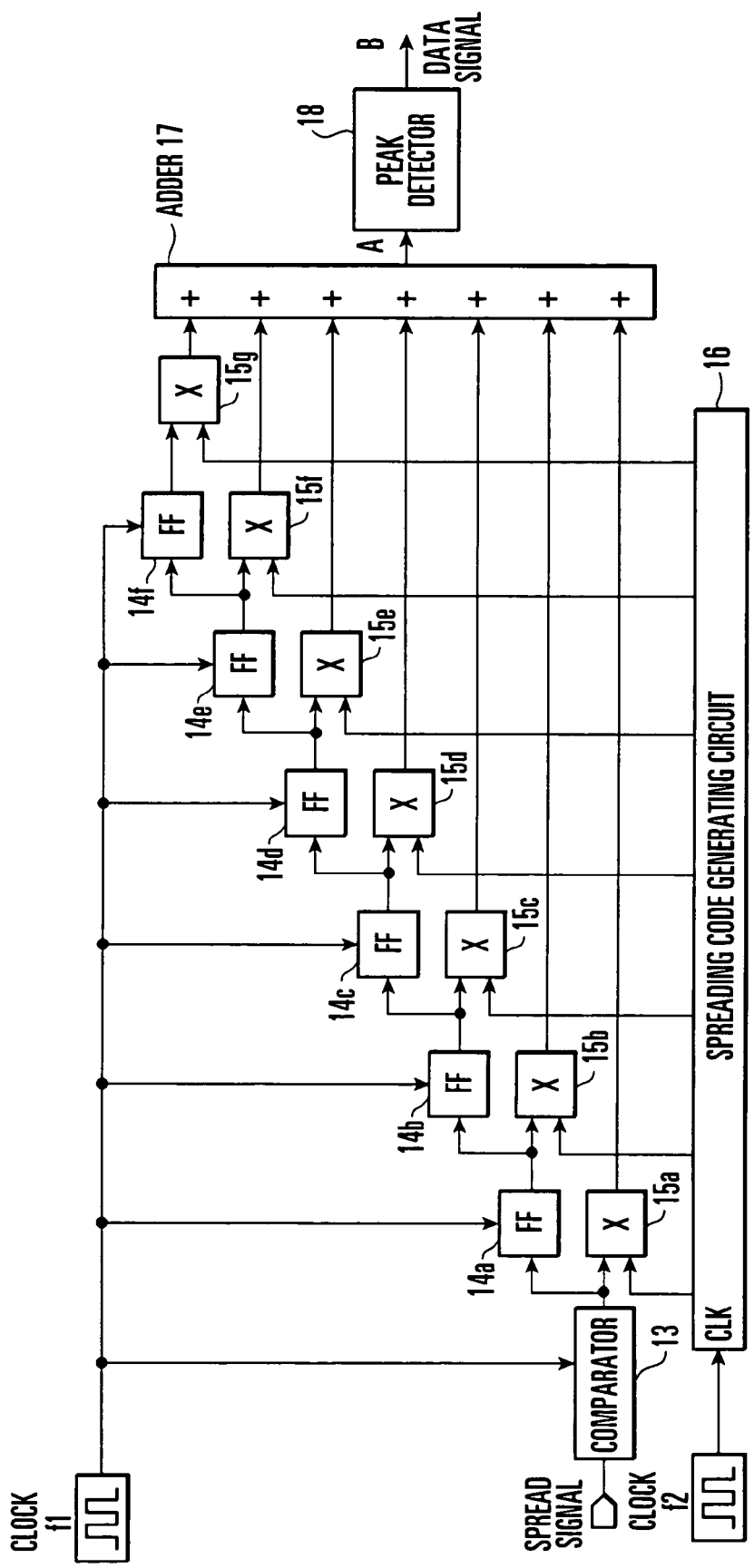
FIG. 13 is a block diagram showing a spread-spectrum demodulator according to the fourth embodiment of the present invention.

FIG. 13 shows a spread-spectrum demodulator according to the fourth embodiment of the present invention. In this embodiment, a comparator circuit 13 is added to the spread-spectrum demodulator according to the second embodiment. The spread-spectrum demodulator in FIG. 13 is comprised of the comparator circuit 13 which converts an input spread signal into a 1-bit digital signal in synchronism with a first clock f1, flip-flop circuits 14a to 14f which are register circuits for outputting (N−1) signals obtained by delaying an output signal from the comparator circuit 13 by one to (N−1) periods (N is an integer equal to or more than 2; 7 in this embodiment) of the clock f1, a spreading code generating circuit 16 which generates, in synchronism with a second clock f2, N spreading codes identical to those used to spread the baseband signal on the transmitting side, N multipliers 15a to 15g which multiply the signals output from the comparator circuit 13 and flip-flop circuits 14a to 14f and the spreading codes output from the spreading code generating circuit 16 for each corresponding signal, an adder 17 which adds the respective output signals from the multipliers 15a to 15g, and a peak detector 18 which detects the peak value of an output signal from the adder 17 and demodulates a data signal on the basis of the detected peak.

The comparator circuit 13, the flip-flop circuits 14a to 14f which are the register circuits, the multipliers 15a to 15g, and the adder 17 constitute the correlation value computing section 1002 in FIG. 1. The spreading code generating circuit 16 forms the spreading code generating section 1001 and spreading code generation control section 1005. The peak detector 18 forms the data signal demodulating section 1003 and peak signal detecting section 1004.

This embodiment has exemplified the case wherein N=7 is set to set the number of multipliers to N=7. However, N can be set to any integer equal to or more than 2.

The operation of the spread-spectrum demodulator according to this embodiment will be described in detail below. The comparator circuit 13 determines the signal level of an input spread signal at the period of the clock f1 on the basis of a predetermined threshold, and converts the spread signal into 1-bit digital data at High or Low level to output it. The signal output from the comparator circuit 13 is supplied to the flip-flop circuit 14a and multiplier 15a.

The flip-flop circuit 14a delays the output signal from the comparator circuit 13 by one period of the clock f1 and outputs the signal to the flip-flop circuit 14b and multiplier 15b. The flip-flop circuits 14b to 14e operate in the same manner as described above. The flip-flop circuit 14f delays the output signal from the flip-flop circuit 14e by one clock of the clock f1 and outputs the signal to the multiplier 15g.

With the above operation, the signal output from the comparator circuit 13 is supplied to the multiplier 15a, and is delayed by each of the flip-flop circuits 14a to 14f by one period of the clock f1. The resultant signals are then sequentially supplied to the multipliers 15a to 15g.

In this embodiment, spread signals each corresponding to a chip rate of 7 are always input from the comparator circuit 13 and the six flip-flop circuits 14a to 14f to the multipliers 15a to 15g. The 7-chip-rate spread signals output from the comparator circuit 13 and flip-flop circuits 14a to 14f are updated in synchronism with the clock f1. The comparator circuit 13 always outputs a new spread signal at the timing of the clock f1.

The arrangement of the spreading code generating circuit 16 is the same as that of the spreading code generating circuit 9 in the second embodiment shown in FIG. 11. Every time a correlation peak signal from the adder 17 is detected, inputting of the clock f2 to the flip-flop circuits (92a to 92g in FIG. 11) of the spreading code generating circuit 16 is stopped/resumed.

The multipliers 15a to 15g multiply the spread signals output from the comparator circuit 13 and flip-flop circuits 14a to 14f and the spreading codes output from the spreading code generating circuit 16 for each corresponding signal. The adder 17 adds the multiplication results from the multipliers 15a to 15g and outputs the resultant signal. The peak detector 18 detects the peak of the output signal from the adder 17 to output a digital data signal (baseband signal).

In this embodiment, providing the comparator circuit 13 allows the N multipliers 15a to 15g, the adder 17, the peak detector 18, and the flip-flop circuits 14a to 14f as the register circuits, to be formed by using digital circuits. This makes it possible to easily design a spread-spectrum demodulator and achieve a reduction in the size of the spread-spectrum demodulator.

This embodiment is configured to stop/resume inputting the clock f2 to the flip-flop circuits of the spreading code generating circuit 16 every time a correlation peak signal from the adder 17 is detected. However, a similar effect can be obtained as follows. When a correlation peak signal is detected, inputting of the clock f2 to the flip-flop circuits of the spreading code generating circuit 16 is stopped. After a predetermined period of time, inputting of the clock f2 is automatically resumed without detecting the next correlation peak signal.

In addition, as the arrangement of the spreading code generating circuit 16, the arrangement of the spreading code generating circuit 4 in the first embodiment shown in FIG. 8 may be used. In this case, if the length of spreading code differs from the register length, a DSP may be used as in the third embodiment. In this case, every time a peak is detected by the peak detector 18, inputting of the first spreading codes from the first spreading code generating circuit to the multipliers 15a to 15g and inputting of the second spreading codes from the second spreading code generating circuit to the multipliers 15a to 15g are alternately switched.

Fifth Embodiment

Figure 14:
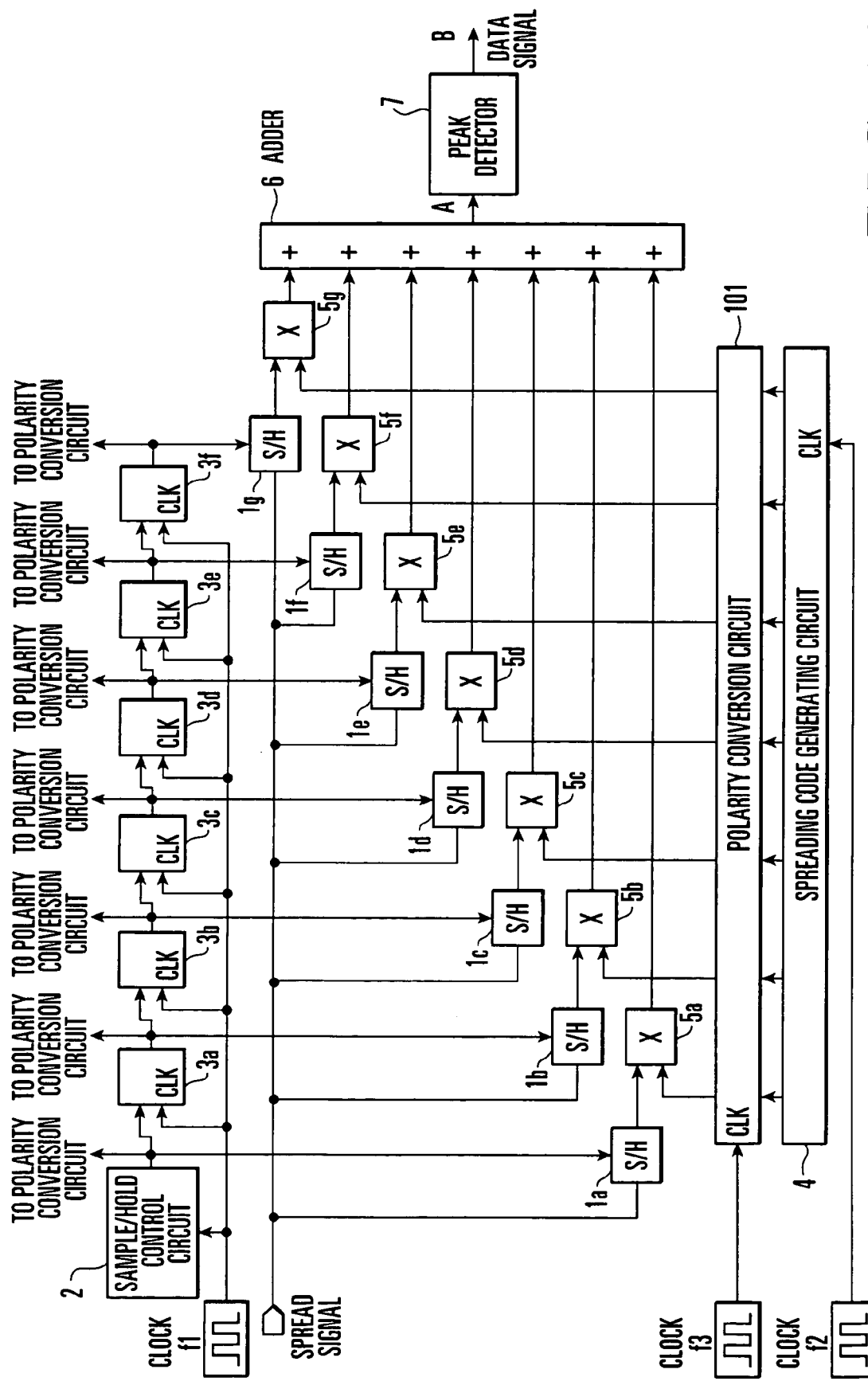
FIG. 14 is a block diagram showing a spread-spectrum demodulator according to the fifth embodiment of the present invention.

FIG. 14 shows a spread-spectrum demodulator according to the fifth embodiment of the present invention. In this embodiment, a polarity conversion circuit 101 is added to the spread-spectrum demodulator according to the first embodiment. The spread-spectrum demodulator in FIG. 14 is comprised of N (N is an integer equal to or more than 2; 7 in this embodiment) sample/hold circuits 1a to 1g each of which samples/holds an input spread signal, a sample/hold control circuit 2 which receives a first clock f1 and controls the sample/hold circuits 1a to 1g to sequentially perform sample/hold operation, flip-flop circuits 3a to 3f constituting a shift register which shifts an output signal from the sample/hold control circuit 2 in synchronism with the clock f1, a spreading code generating circuit 4 which generates N spreading codes in synchronism with a second clock f2, the polarity conversion circuit 101 which outputs nearly half of the N spreading codes output from the spreading code generating circuit 4 which correspond to either newer or older spread signals in the order in which they are received by the spread-spectrum demodulator upon performing polarity conversion such that each output spreading code exhibits two polarity states, i.e., inverted and noninverted states, during one period of the clock f2, and outputs the remaining nearly half of the codes without any change, N multipliers 5a to 5g which multiply the spread signals output from the sample/hold circuits 1a to 1g and the spreading codes output from the polarity conversion circuit 101 for each corresponding signal, an adder 6 which adds the respective output signals from the multipliers 5a to 5g, and a peak detector 7 which detects the peak value of an output signal from the adder 6 and demodulates a data signal (baseband signal) on the basis of the detected peak.

The sample/hold circuits 1a to 1g, sample/hold control circuit 2, flip-flop circuits 3a to 3f, and adder 6 constitute the correlation value computing section 1002 in FIG. 1. The spreading code generating circuit 4 and polarity conversion circuit 101 form the spreading code generating section 1001 and spreading code generation control section 1005. The peak detector 7 forms the data signal demodulating section 1003 and peak signal detecting section 1004.

This embodiment has exemplified the case wherein N=7 is set to set the number of sample/hold circuits 1a to 1g and the number of multipliers 5a to 5g to N=7, and the number of flip-flop circuits 3a to 3f to (N−1)=6. However, N can be set to any integer equal to or more than 2.

The operation of the spread-spectrum demodulator according to this embodiment will be described in detail below.

The operations of the sample/hold circuits 1a to 1g, sample/hold control circuit 2, and flip-flop circuits 3a to 3f are the same as those in the first embodiment.

The arrangement of the spreading code generating circuit 4 is the same as that in the first embodiment shown in FIG. 8. However, unlike in the first embodiment in which outputs from the switches 44a to 44g are directly input to the multipliers 5a to 5g, in this embodiment outputs from switches 44a to 44g are input to the multipliers 5a to 5g through the polarity conversion circuit 101.

The multipliers 5a to 5g multiply the spreading codes output from the sample/hold circuits 1a to 1g and the spreading codes output from the spreading code generating circuit 4 through the polarity conversion circuit 101 for each corresponding signal. The adder 6 adds the respective multiplication results obtained by the multipliers 5a to 5g and outputs the resultant signal. The peak detector 7 detects the peak of the output signal from the adder 6 to output a digital data signal (baseband signal).

Figures 15A, 15B:
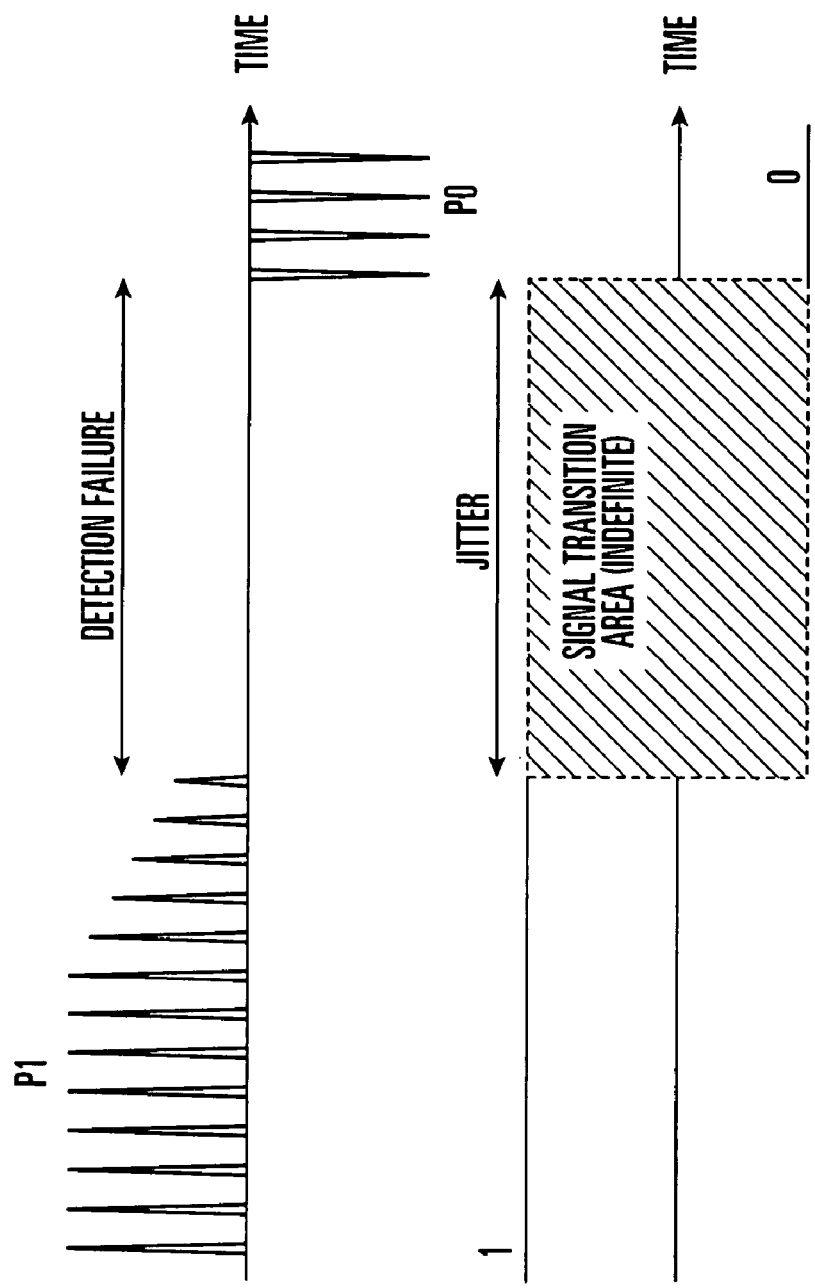

In the arrangement in which no polarity conversion is performed by the polarity conversion circuit 101, i.e., the spread-spectrum demodulator of the first embodiment, when transmission data makes a transition, a peak detection failure occurs, resulting in a detection failure period. That is, in the first embodiment, when a data signal makes a transition from "1" to "0" at the output terminal (the point B in FIG. 5) of the peak detector 7 as shown in FIG. 15B, a positive peak P1 corresponding to the data signal "1" which has appeared at the output terminal (the point A in FIG. 5) of the adder 6 is interrupted as shown in FIG. 15A, and it takes time for a negative peak P0 corresponding to the data signal "0" to appear. As a consequence, large jitter is produced in a demodulated data signal. This also hinders an increase in transmission capacity.

In contrast to this, in this embodiment, the polarity conversion circuit 101 is provided between the spreading code generating circuit 4 and the multipliers 5a to 5g. The polarity conversion circuit 101 outputs nearly half of the N spreading codes output from the spreading code generating circuit 4 which correspond to either newer or older spread signals in reception order upon performing polarity conversion such that each output spreading code exhibits two polarity states, i.e., inverted and noninverted states, during one period of the second clock f2, and outputs the remaining codes of the N spreading codes without any change.

The polarity conversion circuit 101 operates on the basis of a third clock f3. FIGS. 16A and 16B show an example of the timing of the second and third clocks f2 and f3. The clocks f2 and f3 are synchronized with each other. The states of the N spreading codes output from the spreading code generating circuit 4 change in synchronism with the clock f2. FIG. 16C shows a case wherein the states of the spreading codes change to "A", "B", "C", "D", "E", "F", "G", "H", ... in synchronism with the clock f2.

The polarity conversion circuit 101 changes the polarity states of the nearly half of the spreading codes from the noninverted state ("+" in FIG. 16D) to the inverted state ("−" in FIG. 16D) when the clock f3 changes from "0" to "1", and changes the polarity states of the nearly half of the spreading codes from the inverted state to the noninverted state when the clock f3 changes from "1" to "0". That is, in order to make the nearly half of the spreading codes exhibit two polarity states, i.e., the inverted state and noninverted state, in one period of the clock f2, the timings of the clocks f2 and f3 are so set as to change the clock f3 from "0" to "1" or "1" to "0" in one period of the clock f2.

In this embodiment, the clock f3 is ½ the clock f2. However, the clock f3 may be equal to the clock f2 or larger than the clock f2 as long as each of the nearly half of the spreading codes exhibits two polarity states, i.e., the inverted state and noninverted state, in one period of the clock f2.

The number of the above nearly half may be the integral quotient of N divided by 2 when N is an even number. If, however, N is an odd number, the number of the nearly half may be the value obtained by adding 1 to the quotient of N divided by 2 or the value obtained by subtracting 1 from the quotient. If, for example, N=7, the number of the nearly half is 3 or 4.

When the newest spread signal is held by the sample/hold circuit 1d, the sample/hold circuits can be arranged in the order of 1d, 1c, 1b, 1a, 1g, 1f, and 1e if they are arranged in reverse chronological order of spread signals. Therefore, the nearly half of the spreading codes which correspond to the newer spread signals are spreading codes corresponding to the multipliers 5d, 5c, 5b, and 5a (when the number of the nearly half is 4) or spreading codes corresponding to the multipliers 5d, 5c, and 5b (when the number of the nearly half is 3). When the newest spread signal is held by the sample/hold circuit 1a, the above spreading codes are spreading codes corresponding to the multipliers 5a, 5g, 5f, and 5e (when the number of the nearly half is 4) or spreading codes corresponding to the multipliers 5a, 5g, and 5f (when the number of the nearly half is 3).

When the newest spread signal is held by the sample/hold circuit 1d, the sample/hold circuits can be arranged in the order of 1e, if, 1g, 1a, 1b, 1c, and 1d if they are arranged in chronological order of spread signals. Therefore, the nearly half of the spreading codes which correspond to the older spread signals are spreading codes corresponding to the multipliers 5e, 5f, 5g, and 5a (when the number of the nearly half is 4) or spreading codes corresponding to the multipliers 5e, 5f, and 5g (when the number of the nearly half is 3). When the newest spread signal is held by the sample/hold circuit 1a, the above spreading codes are spreading codes corresponding to the multipliers 5b, 5c, 5d, and 5e (when the number of the nearly half is 4) or spreading codes corresponding to the multipliers 5b, 5c, and 5d (when the number of the nearly half is 3).

In this manner, the nearly half of the spreading codes which are subjected to polarity conversion by the polarity conversion circuit 101 are determined by the position of a sample/hold circuit in which the newest spread signal is held. The polarity conversion circuit 101 therefore checks the position of a sample/hold circuit in which the newest spread signal is held, on the basis of the sample/hold control signals output from the sample/hold control circuit 2 and sample/hold circuits 3a to 3f, and determines nearly half of the spreading codes which correspond to newer or older spread signals on the basis of this position.

Figures 17A, 17B:
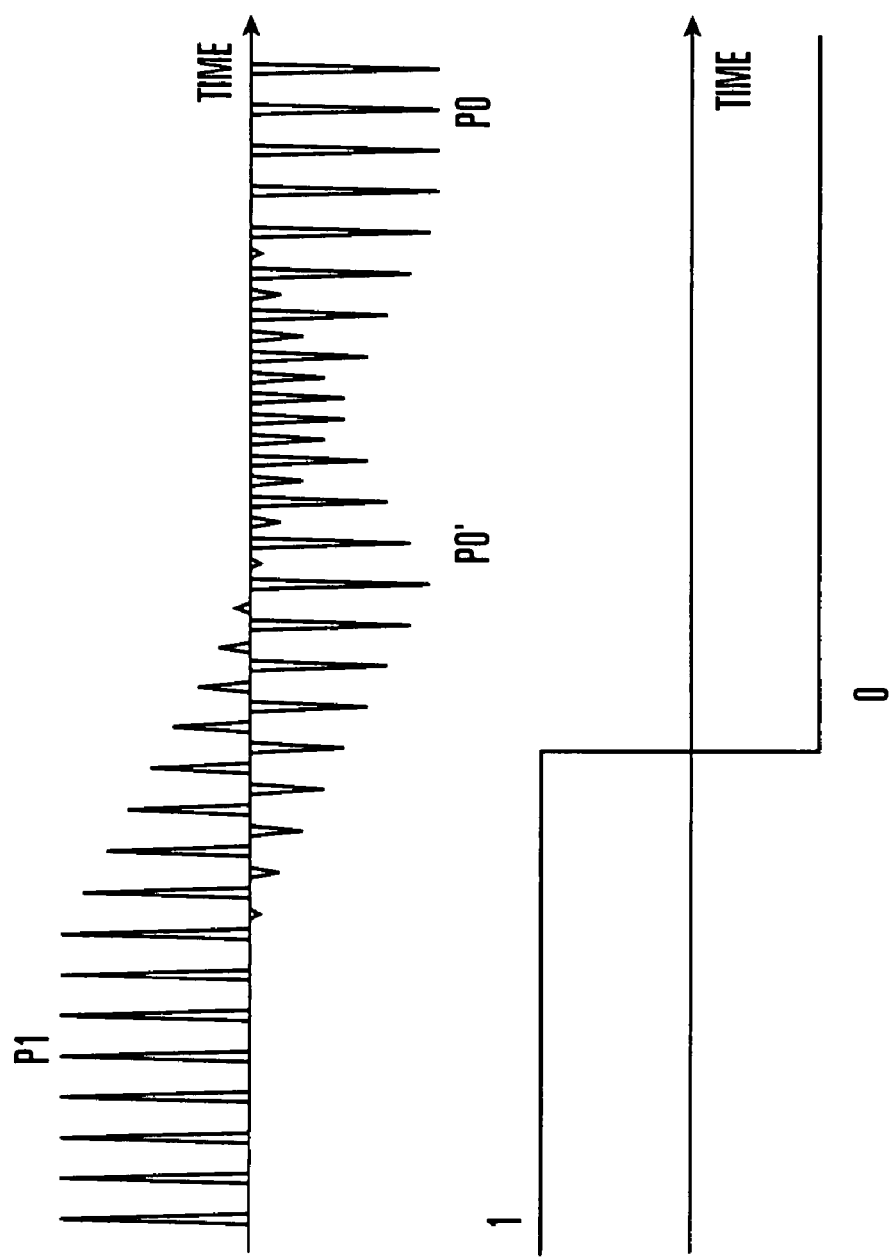
FIG. 17A is a view showing the waveform of an example of the output from an adder in the spread-spectrum demodulator in FIG. 14.
FIG. 17B is a view showing the waveform of an example of the output from a peak detector.

FIGS. 17A and 17B show characteristic signal waveforms at points A and B in FIG. 14. FIGS. 17A and 17B show a case wherein the nearly half of the spreading codes which are polarity-converted by the polarity conversion circuit 101 correspond to the nearly older half of the spread signals. As shown in FIG. 17B, when a data signal from the output terminal (the point B in FIG. 14) of the peak detector 7 makes a transition from "1" to "0", a negative peak P0' corresponding to the data signal "0" appears early at the output terminal (the point A in FIG. 14) of the adder 6 as compared with the case shown in FIGS. 15A and 15B wherein no polarity conversion is performed by the polarity conversion circuit 101 (FIG. 17A). The following is the reason. While the data signal is making a transition from "1" to "0", the nearly newer half of the spread signals have already changed to "0", whereas the nearly older half of the spread signals remain "1". However, performing polarity inversion of spreading codes corresponding to the nearly older half of the spread signals will substantially change the nearly older half of the spread signals to "0". For the same reason, when a data signal makes a transition from "0" to "1", a positive peak corresponding to the data signal "1" appears early at the outer terminal of the adder 6 as compared with the case wherein no polarity conversion is performed by the polarity conversion circuit 101.

Figures 18A, 18B:
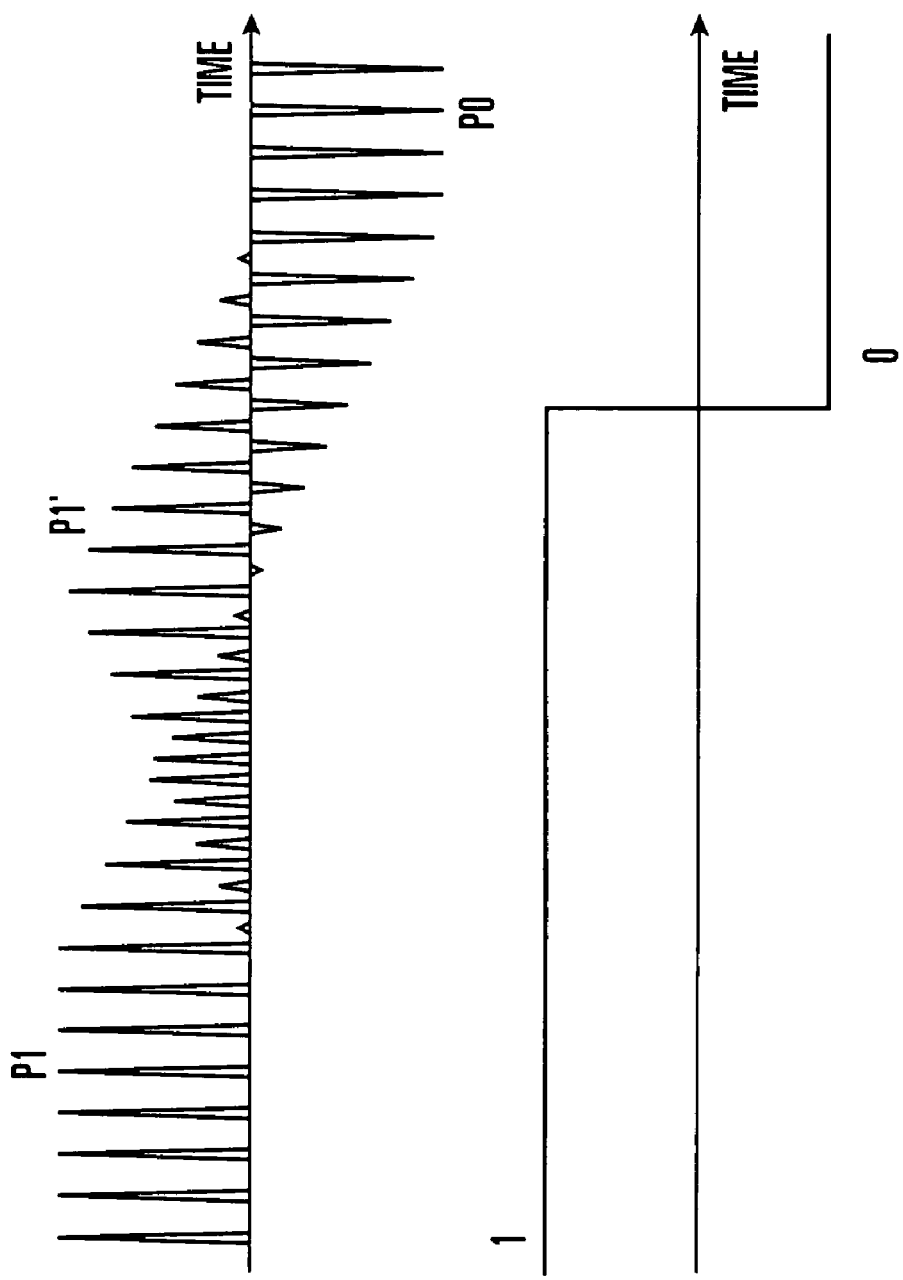
FIG. 18A is a view showing the waveform of another example of the output from the adder in the spread-spectrum demodulator in FIG. 14.
FIG. 18B is a view showing the waveform of another example of the output from the peak detector.

FIGS. 18A and 18B show signal waveforms in a case wherein the nearly half of spreading codes which are polarity-converted by the polarity conversion circuit 101 correspond to the nearly newer half of spread signals. As shown in FIG. 18B, when the data signal output from the peak detector 7 makes a transition from "1" to "0", a new positive peak P1' corresponding to the data signal "1" appears at the output terminal of the adder 6 unlike in the case wherein no polarity conversion is performed by the polarity conversion circuit 101 (FIG. 18A). This is because when the spreading codes corresponding to the nearly newer half of the spread signals are polarity-inverted, the nearly newer half of the spread signals substantially change to "1". For the same reason, when the data signal makes a transition from "0" to "1", a new negative peak corresponding to the data signal "0" appears at the output terminal of the adder 6 unlike in the case wherein no polarity conversion is performed by the polarity conversion circuit 101.

The spread-spectrum demodulator in FIG. 14 requires no external part and despreads/demodulates spread signals by using the spreading code generating circuit 4 which requires no synchronous control between spread signals and spreading codes. Therefore, a low-power spread-spectrum demodulator can be realized. This in turn makes it possible to achieve reductions in the power and cost of a portable radio incorporating the spread-spectrum demodulator. In addition, in this embodiment, the correlation peak signals output from the adder 6 are independent of the clocks f1 and f2 and spreading codes to be used. This allows despreading demodulation even if a data signal to be transmitted has a high data clock frequency, and hence makes it possible to increase the data clock frequency. Furthermore, in this embodiment, the provision of the polarity conversion circuit 101 makes a peak always appear at the output terminal of the adder 6 even when a data signal changes from "1" to "0" or from "0" to "1", and hence no detection failure occurs. As a consequence, in the embodiment, jitter in the data signal can be greatly reduced.

Sixth Embodiment

Figure 19:
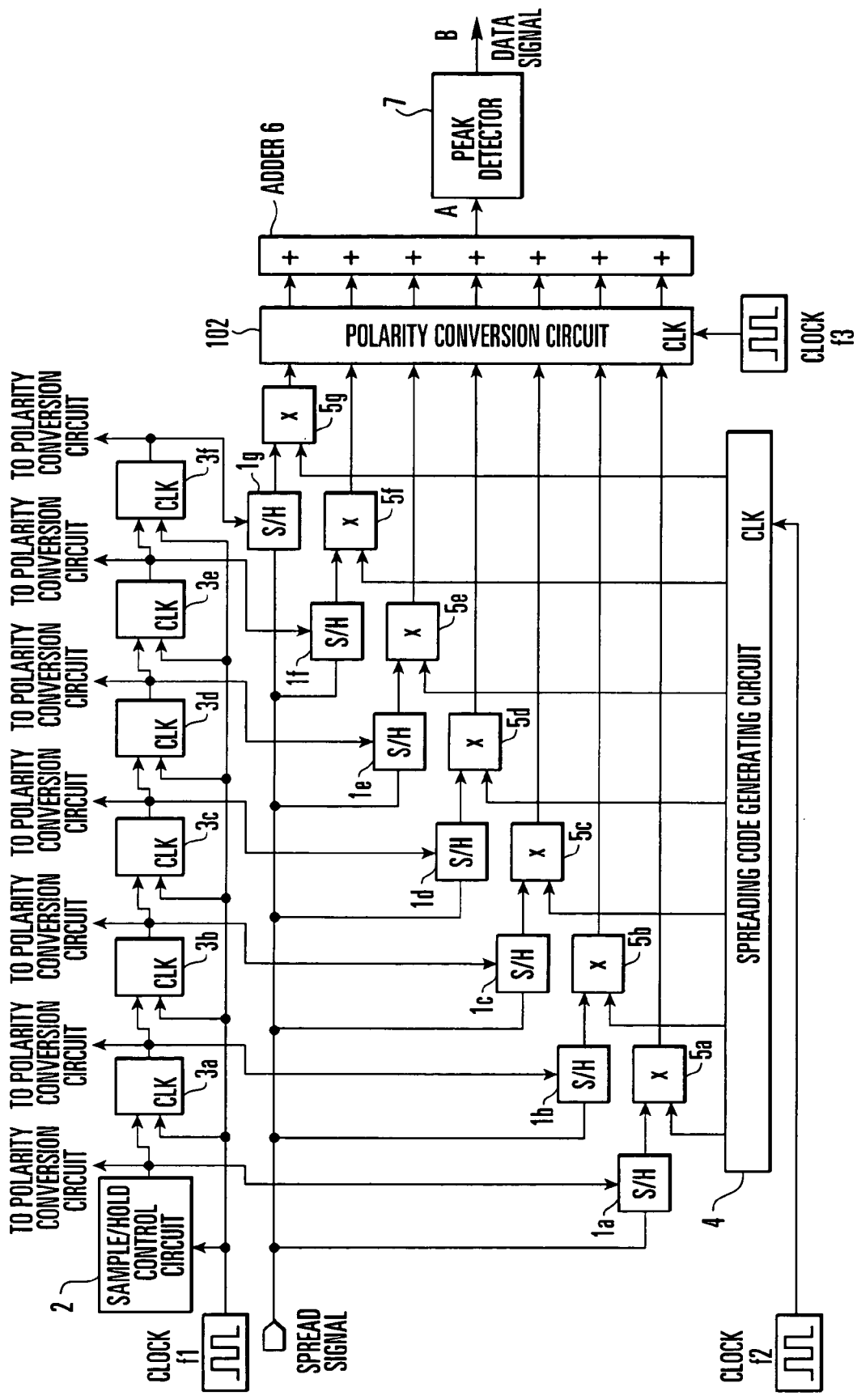
FIG. 19 is a block diagram showing a spread-spectrum demodulator according to the sixth embodiment of the present invention.

FIG. 19 shows a spread-spectrum demodulator according to the sixth embodiment of the present invention. The same reference numerals as in FIG. 14 denote the same parts in FIG. 19. In this embodiment, the installation position of the polarity conversion circuit in the spread-spectrum demodulator of the fifth embodiment is changed. In this embodiment, a polarity conversion circuit 102 is provided between multipliers 5a to 5g and an multiplier 6.

Sample/hold circuits 1a to 1g, a sample/hold control circuit 2, flip-flop circuits 3a to 3f, the multipliers 5a to 5g, the multiplier 6, and the polarity conversion circuit 102 constitute the correlation value computing section 1002 in FIG. 1. A spreading code generating circuit 4 forms the spreading code generating section 1001 and spreading code generation control section 1005. A peak detector 7 forms the data signal demodulating section 1003 and peak signal detecting section 1004.

The polarity conversion circuit 102 outputs nearly half of N multiplier output signals from the multipliers 5a to 5g which correspond to newer or older spread signals in the order in which they are received by the spread-spectrum demodulator upon performing polarity conversion such that each of the output signals exhibits two polarity states, i.e., the inverted state and noninverted state, in one period of a second clock f2, and outputs the remaining signals of the N multiplier output signals without any change. As in the fifth embodiment, the polarity conversion circuit 102 operates on the basis of a third clock f3, and checks the position of a sample/hold circuit in which the newest spread signal is held, on the basis of the sample/hold control signals output from the sample/hold control circuit 2 and flip-flop circuits 3a to 3f, and determines nearly half of multiplier output signals which correspond to newer or older spread signals on the basis of the position.

In this embodiment, therefore, the same effects as those in the fifth embodiment can be obtained.

Seventh Embodiment

Figure 20:
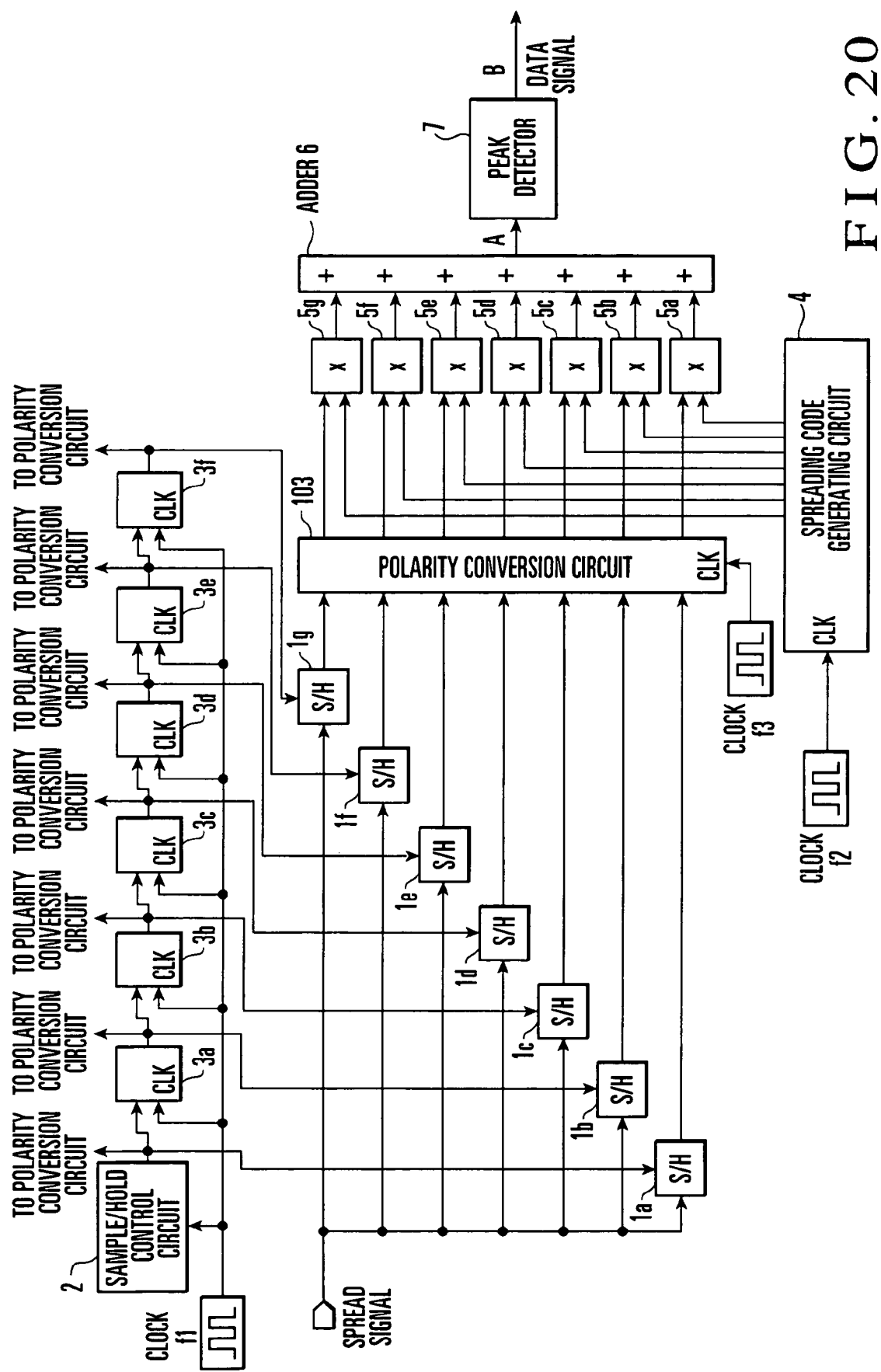
FIG. 20 is a block diagram showing a spread-spectrum demodulator according to the seventh embodiment of the present invention.

FIG. 20 shows a spread-spectrum demodulator according to the seventh embodiment of the present invention. The same reference numerals as in FIG. 14 denote the same parts in FIG. 20. In this embodiment, the installation position of the polarity conversion circuit in the spread-spectrum demodulator of the fifth embodiment is changed. In this embodiment, a polarity conversion circuit 103 is provided between sample/hold circuits 1a to 1g and multipliers 5a to 5g.

The sample/hold circuits 1a to 1g, a sample/hold control circuit 2, flip-flop circuits 3a to 3f, the multipliers 5a to 5g, a multiplier 6, and the polarity conversion circuit 102 constitute the correlation value computing section 1002 in FIG. 1. A spreading code generating circuit 4 forms the spreading code generating section 1001 and spreading code generation control section 1005. A peak detector 7 forms the data signal demodulating section 1003 and peak signal detecting section 1004.

The polarity conversion circuit 103 outputs nearly half of N sample/hold output signals from the sample/hold circuits 1a to 1g which correspond to newer or older spread signals in the order in which they are received by the spread-spectrum demodulator upon performing polarity conversion such that each of the output signals exhibits two polarity states, i.e., the inverted state and noninverted state, in one period of a second clock f2, and outputs the remaining signals of the N sample/hold output signals without any change. As in the fifth embodiment, the polarity conversion circuit 103 operates on the basis of a third clock f3, and checks the position of a sample/hold circuit in which the newest spread signal is held, on the basis of the sample/hold control signals output from the sample/hold control circuit 2 and flip-flop circuits 3a to 3f, and determines nearly half of sample/hold output signals which correspond to newer or older spread signals on the basis of the position. In this embodiment, therefore, the same effects as those in the fifth embodiment can be obtained.

In the fifth to seventh embodiments, in order to obtain the correlations between spread signals and spreading codes, the arrangement order of the spreading codes is reversed in accordance with the arrangement order of the spread signals sampled/held by the sample/hold circuits 1a to 1g. However, the signals sampled/held by the sample/hold circuits 1a to 1g may be arranged in the same arrangement order of the input spread signals. In order to arrange the sampled/held signals in the same arrangement order of the input spread signals, the circuits shown in FIGS. 14, 19, and 20 may be connected to each other in such a manner that an output from the sample/hold control circuit 2 is input to the flip-flop circuit 3f, an output from the flip-flop circuit 3f to the flip-flop circuit 3e, an output from the flip-flop circuit 3e to the flip-flop circuit 3d, an output from the flip-flop circuit 3d to the flip-flop circuit 3c, an output from the flip-flop circuit 3c to the flip-flop circuit 3b, and an output from the flip-flop circuit 3b to the flip-flop circuit 3a. In this case, the arrangement order of the spreading codes need not be reversed, and the arrangement order of the first spreading codes output from a first spreading code generating circuit 40-1 may be the same as that of the spreading codes used to spread a baseband signal on the transmitting side.

Eighth Embodiment

Figure 21:
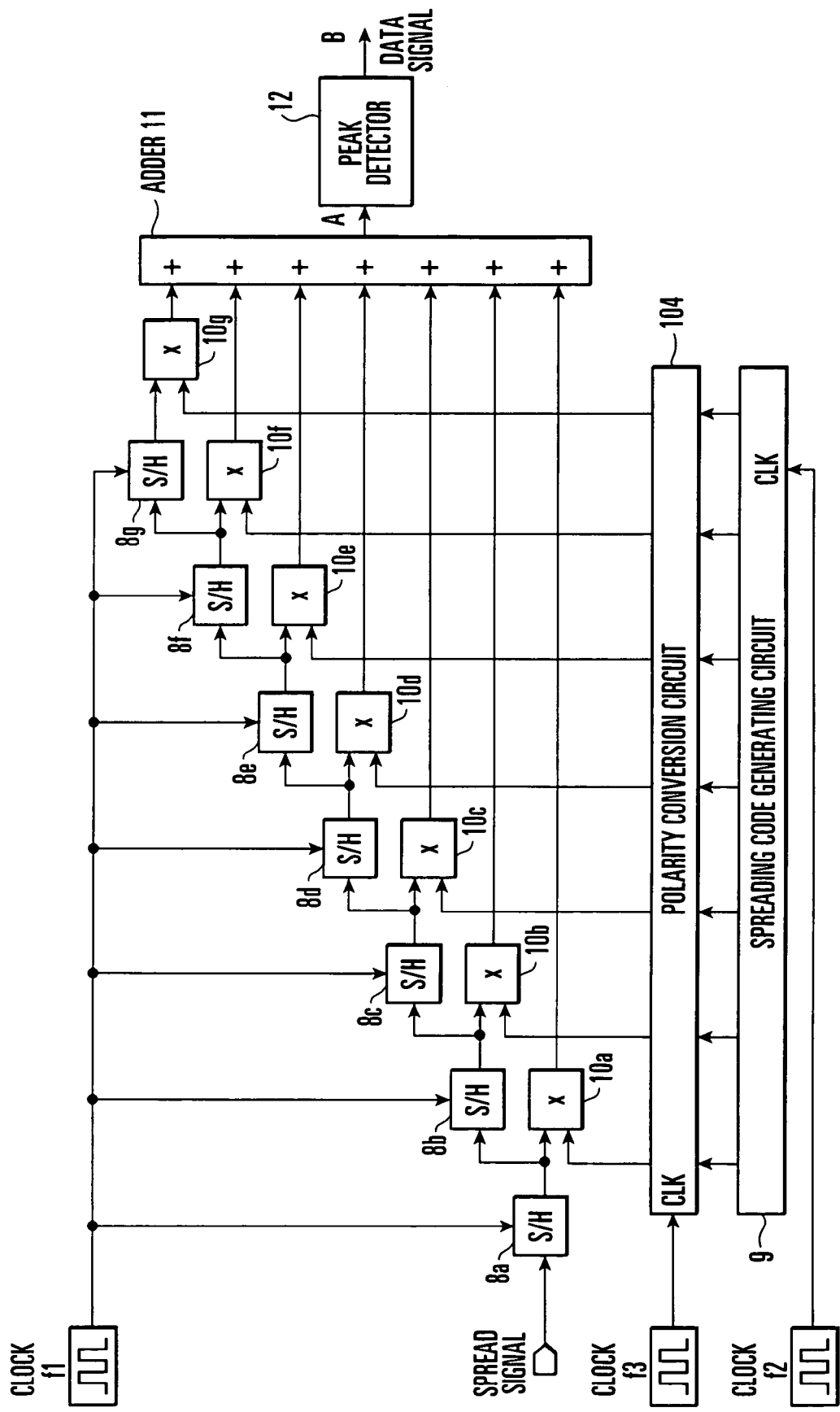
FIG. 21 is a block diagram showing a spread-spectrum demodulator according to the eighth embodiment of the present invention.

FIG. 21 shows a spread-spectrum demodulator according to the eighth embodiment of the present invention. In this embodiment, a polarity conversion circuit 104 is added to the spread-spectrum demodulator of the second embodiment. The spread-spectrum demodulator in FIG. 21 is comprised of N (N=7 in this embodiment) sample/hold circuits 8a to 8g each of which samples/holds an input spread signal in synchronism with a first clock f1, a spreading code generating circuit 9 which generates N spreading codes in synchronism with a second clock f2, the polarity conversion circuit 104 which outputs nearly half of the N spreading codes output from the spreading code generating circuit 9 which correspond to newer or older spread signals in the order in which they are received by the spread-spectrum demodulator upon performing polarity conversion such that each of the output signals exhibits two polarity states, i.e., the inverted state and noninverted state, in one period of the clock f2, and outputs the remaining nearly half of the codes without any change, N multipliers 10a to 10g which multiply the signals output from the sample/hold circuits 8a to 8g and the spreading codes output from the polarity conversion circuit 104 for each corresponding signal, an adder 11 which adds the respective output signals from the multipliers 10a to 10g, and a peak detector 12 which detects the peak value of the output signal from the adder 11 and demodulates a data signal on the basis of the detected peak.

The sample/hold circuits 8a to 8g, multipliers 10a to 10g, adder 11 constitute the correlation value computing section 1002 in FIG. 1. The spreading code generating circuit 9 and polarity conversion circuit 104 form the spreading code generating section 1001 and spreading code generation control section 1005. The peak detector 12 forms the data signal demodulating section 1003 and peak signal detecting section 1004.

This embodiment has exemplified the case wherein N=7 is set to set the number of sample/hold circuits and the number of multipliers to 7. However, N can be set to any integer equal to or more than 2.

The operation of the spread-spectrum demodulator of this embodiment will be described in detail below. The operation of the sample/hold circuits 8a to 8g is the same as that in the second embodiment.

The arrangement of the spreading code generating circuit 9 is the same as that in the second embodiment shown in FIG. 11. However, unlike in the second embodiment in which outputs from the flip-flop circuits 92a to 92g are directly input to the multipliers 10a to 10g, in this embodiment outputs from the flip-flop circuits 92a to 92g are input to the multipliers 10a to 10g through the polarity conversion circuit 104. In this embodiment, unlike in the fifth to seventh embodiments, the signals sampled/held by the sample/hold circuits 8a to 8g are arranged in the same order as input spread signals. Therefore, the arrangement order of the spreading codes need not be reversed, and the arrangement order of the spreading codes output from the spreading code generating circuit 9 may be the same as that of the spreading codes used to spread a baseband signal on the transmitting side.

The polarity conversion circuit 104 outputs nearly half of the N spreading codes output from the spreading code generating circuit 9 which correspond to newer or older spread signals in the order in which they are received by the spread-spectrum demodulator upon performing polarity conversion such that each of the output signals exhibits two polarity states, i.e., the inverted state and noninverted state, in one period of the clock f2, and outputs the remaining codes of the N spreading codes without any change.

In this embodiment, the newest spread signal is always held in the sample/hold circuit 8a, and the oldest spread signal is always held in the sample/hold circuit 8g. Therefore, the nearly half of the spreading codes which correspond to newer spread signals are spreading codes corresponding to the multipliers 10a, 10b, 10c, and 10d (when the number of the nearly half is 4) or spreading codes corresponding to the multipliers 10a, 10b, and 10c (when the number of the nearly half is 3). The nearly half of the spreading codes which correspond to older spread signals are spreading codes corresponding to the multipliers 10g, 10f, 10e, and 10d (when the number of the nearly half is 4) or spreading codes corresponding to the multipliers 10g, 10f, and 10e (when the number of the nearly half is 3). As in the fifth embodiment, the polarity conversion circuit 104 operates on the basis of a third clock f3.

The multipliers 10a to 10g multiply the spread signals output from the sample/hold circuits 8a to 8g and the spreading codes output from the polarity conversion circuit 104 for each corresponding signal. The adder 11 adds the respective multiplication results from the multipliers 10a to 10g and outputs the resultant signal. The peak detector 12 detects the peak of the output signal from the adder 11 to output a digital data signal (baseband signal). The characteristic signal waveform at the output terminal (a point A in FIG. 21) of the adder 11 is the same as that shown in FIGS. 17A and 18A, and the characteristic signal waveform at the output terminal (a point B in FIG. 21) of the peak detector 12 is the same as that shown in FIGS. 17B and 18B.

According to this embodiment, as in the fifth embodiment, despreading demodulation can be performed without performing synchronous control between spread signals and spreading codes. In addition, in this embodiment, since a correlation peak signal from the adder 11 is independent of the clocks f1 and f2 and the spreading codes to be used, the data rate of a signal to be transmitted can be increased. Furthermore, in this embodiment, since a peak always appears at the output terminal of the adder 11 even when a data signal changes from "1" to "0" or from "0" to "1", no detection failure occurs. As a consequence, in the embodiment, jitter in the data signal can be greatly reduced.

Ninth Embodiment

Figure 22:
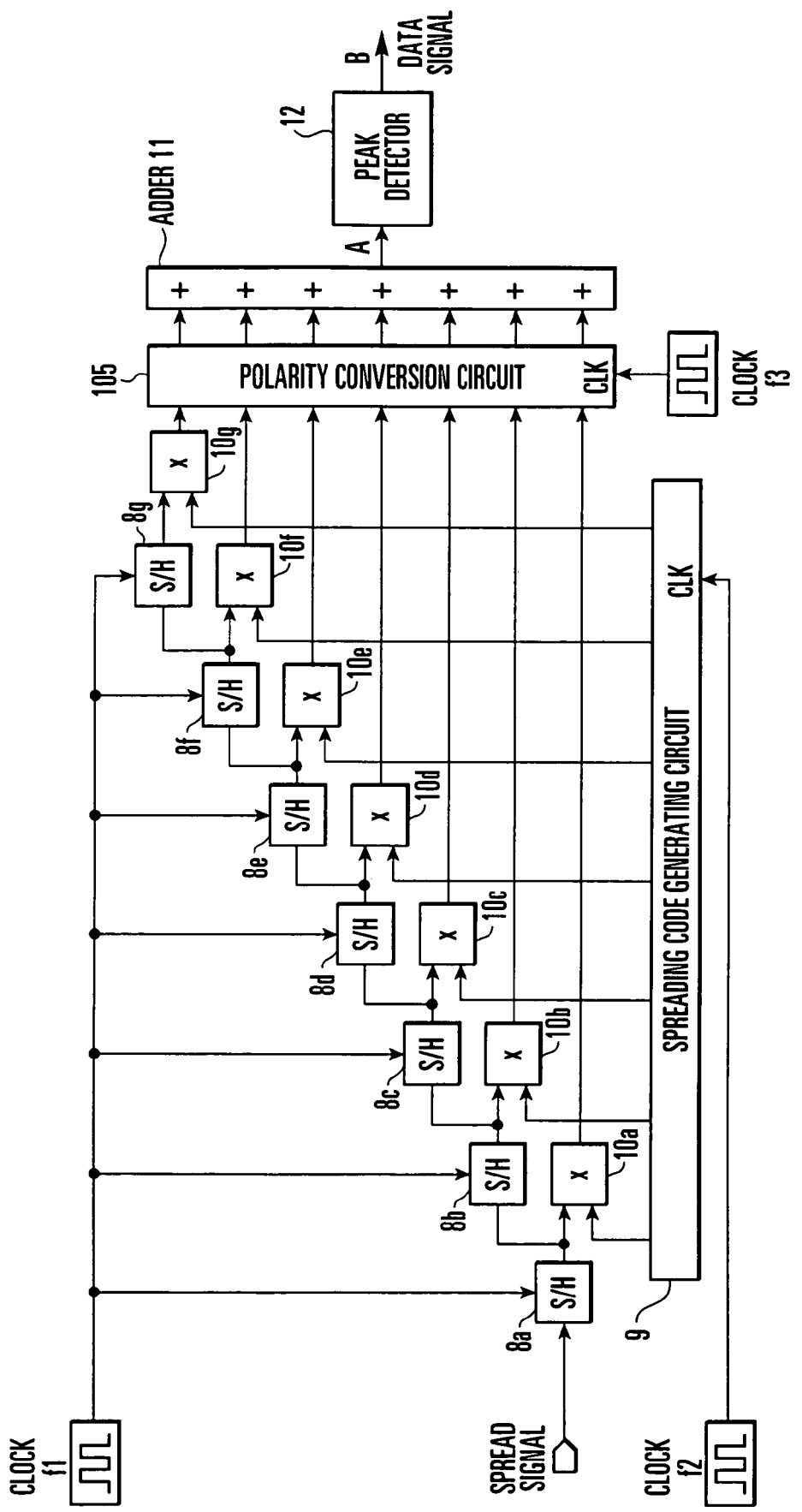
FIG. 22 is a block diagram showing a spread-spectrum demodulator according to the ninth embodiment of the present invention.

FIG. 22 shows a spread-spectrum demodulator according to the ninth embodiment of the present invention. The same reference numerals as in FIG. 21 denote the same parts in FIG. 22. In this embodiment, the installation position of the polarity conversion circuit in the spread-spectrum demodulator of the eighth embodiment is changed. In this embodiment, a polarity conversion circuit 105 is provided between multipliers 10a to 10g and an adder 11.

Sample/hold circuits 8a to 8g, the multipliers 10a to 10g, the adder 11, and the polarity conversion circuit 105 constitute the correlation value computing section 1002 in FIG. 1. A spreading code generating circuit 9 forms the spreading code generating section 1001 and spreading code generation control section 1005. A peak detector 12 forms the data signal demodulating section 1003 and peak signal detecting section 1004.

The polarity conversion circuit 105 outputs nearly half of N multiplier output signals from the multipliers 10a to 10g which correspond to newer or older spread signals in the order in which they are received by the spread-spectrum demodulator upon performing polarity conversion such that each of the output signals exhibits two polarity states, i.e., the inverted state and noninverted state, in one period of a second clock f2, and outputs the remaining signals of the N multiplier output signals without any change. As in the eighth embodiment, the polarity conversion circuit 105 operates on the basis of a third clock f3. The nearly half of the N multiplier output signals from the multipliers 10a to 10g which correspond to newer spread signals are the output signals from the multipliers 10a, 10b, 10c, and 10d (when the number of the nearly half is 4) or the output signals from the multipliers 10a, 10b, and 10c (when the number of the nearly half is 3). The nearly half of the multiplier output signals which correspond to older spread signals are the output signals from the multipliers 10g, 10f, 10e, and 10d (when the number of the nearly half is 4) or the output signals from the multipliers 10g, 10f, and 10e (when the number of the nearly half is 3).

In this manner, as in this embodiment, the same effects as those in the eighth embodiment can be obtained.

10th Embodiment

Figure 23:
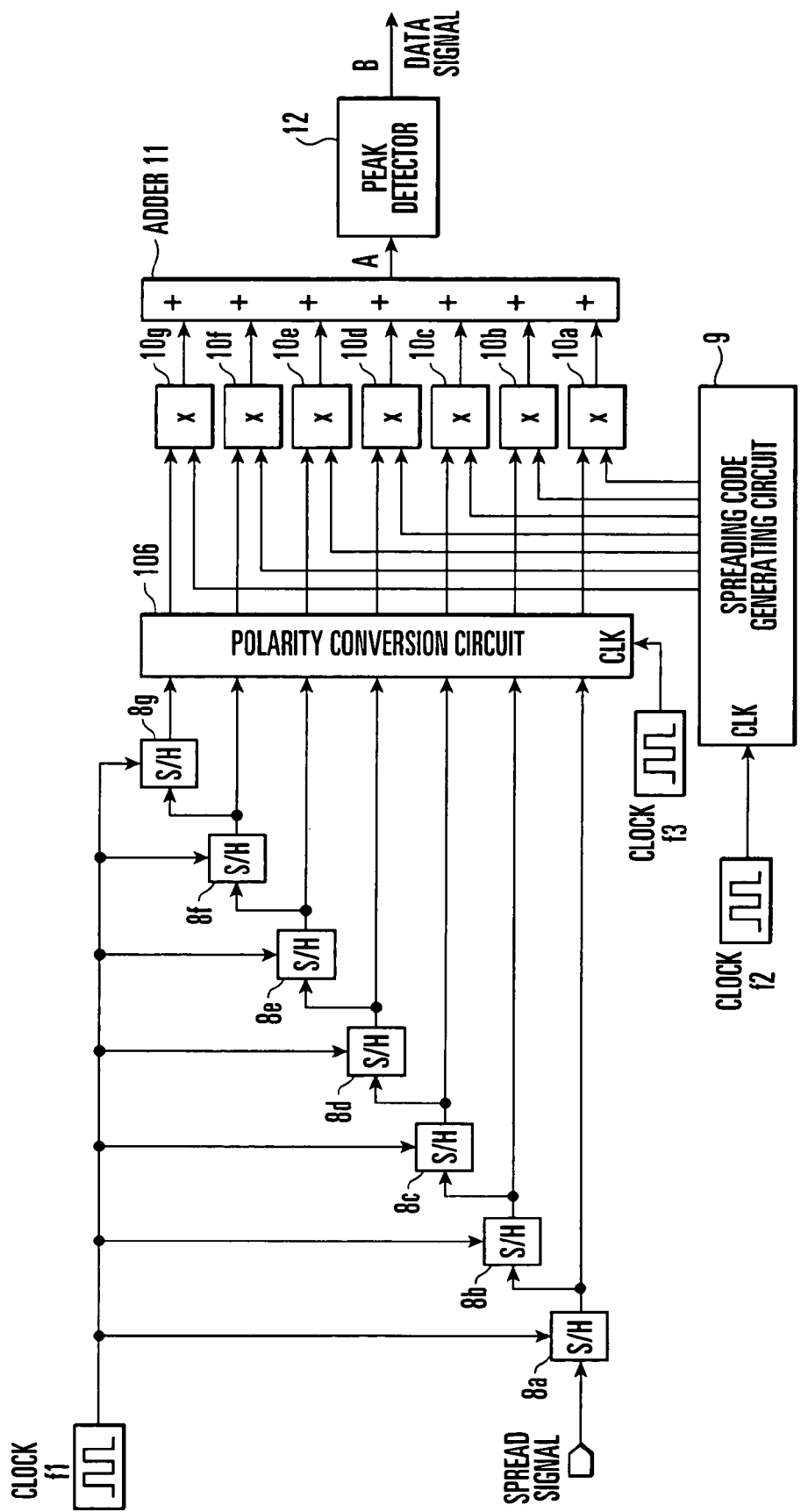
FIG. 23 is a block diagram showing a spread-spectrum demodulator according to the 10th embodiment of the present invention.

FIG. 23 shows a spread-spectrum demodulator according to the 10th embodiment of the present invention. The same reference numerals as in FIG. 21 denote the same parts in FIG. 23. In this embodiment, the installation position of the polarity conversion circuit in the spread-spectrum demodulator of the eighth embodiment is changed. In this embodiment, a polarity conversion circuit 106 is provided between sample/hold circuits 8a to 8g and multipliers 10a to 10g.

The sample/hold circuits 8a to 8g, the multipliers 10a to 10g, an adder 11, and the polarity conversion circuit 106 constitute the correlation value computing section 1002 in FIG. 1. A spreading code generating circuit 9 forms the spreading code generating section 1001 and spreading code generation control section 1005. A peak detector 12 forms the data signal demodulating section 1003 and peak signal detecting section 1004.

The polarity conversion circuit 106 outputs nearly half of N sample/hold output signals from the sample/hold circuits 8a to 8g which correspond to newer or older spread signals in the order in which they are received by the spread-spectrum demodulator upon performing polarity conversion such that each of the output signals exhibits two polarity states, i.e., the inverted state and noninverted state, in one period of a second clock f2, and outputs the remaining signals of the N sample/hold output signals without any change. As in the eighth embodiment, the polarity conversion circuit 106 operates on the basis of a third clock f3. The nearly half of the N sample/hold output signals from the sample/hold circuits 8a to 8g which correspond to newer spread signals are the output signals from the sample/hold circuits 8a, 8b, 8c, and 8d (when the number of the nearly half is 4) or the output signals from the sample/hold circuits 8a, 8b, and 8c (when the number of the nearly half is 3). The nearly half of the sample/hold output signals which correspond to older spread signals are the output signals from the sample/hold circuits 8g, 8g, 8e, and 8d (when the number of the nearly half is 4) or the output signals from the sample/hold circuits 8g, 8f, and 8e (when the number of the nearly half is 3).

In this manner, as in this embodiment, the same effects as those in the eighth embodiment can be obtained.

If the length of spreading code differs from the register length, DSPs may be used as the spreading code generating circuit 9 and clock control circuit 93 in the fifth to seventh embodiments as in the third embodiment.

11th Embodiment

Figure 24:
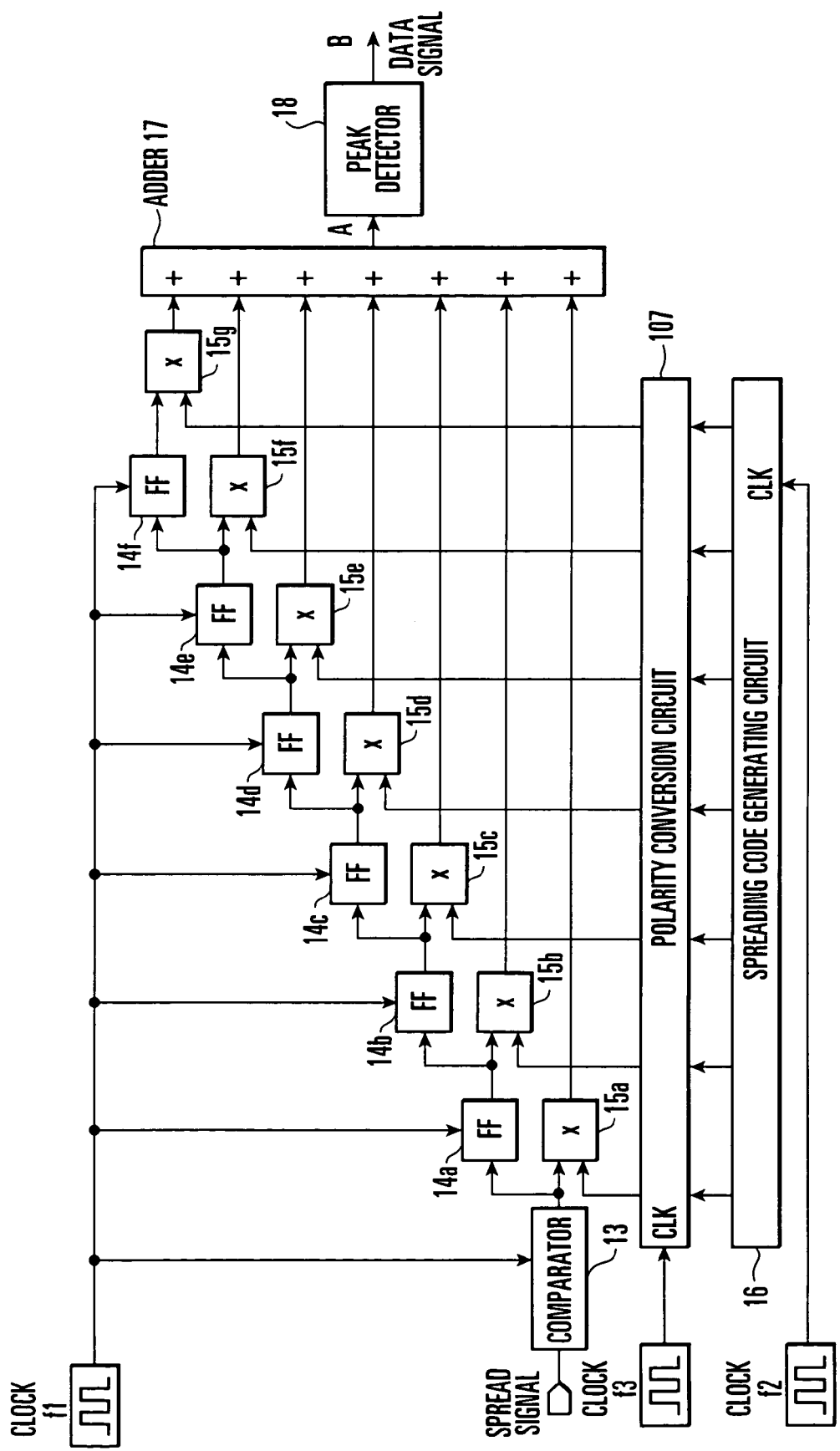
FIG. 24 is a block diagram showing a spread-spectrum demodulator according to the 11th embodiment of the present invention.

FIG. 24 shows a spread-spectrum demodulator according to the 11th embodiment of the present invention. In this embodiment, a polarity conversion circuit 107 is added to the spread-spectrum demodulator of the fourth embodiment. The spread-spectrum demodulator in FIG. 24 is comprised of a comparator circuit 13 which converts an input spread signal into a 1-bit digital signal in synchronism with a first clock f1, flip-flop circuits 14a to 14f which are register circuits for outputting (N−1) signals obtained by delaying an output signal from the comparator circuit 13 by one to (N−1) periods (N is an integer equal to or more than 2; 7 in this embodiment) of the clock f1, a spreading code generating circuit 16 which generates, in synchronism with a second clock f2, N spreading codes identical to those used to spread the baseband signal on the transmitting side, the polarity conversion circuit 107 which outputs nearly half of the N spreading codes output from the spreading code generating circuit 16 which correspond to newer or older spread signals in the order in which they are received by the spread-spectrum demodulator upon performing polarity conversion such that each of the output signals exhibits two polarity states, i.e., the inverted state and noninverted state, in one period of the clock f2, and outputs the remaining nearly half of the codes without any change, N multipliers 15a to 15g which multiply the signals output from the comparator circuit 13 and flip-flop circuits 14a to 14f and the spreading codes output from the polarity conversion circuit 107, an adder 17 which adds the respective output signals from the multipliers 15a to 15g, and a peak detector 18 which detects the peak value of an output signal from the adder 17 and demodulates a data signal on the basis of the detected peak.

The comparator circuit 13, the flip-flop circuits 14a to 14f, the multipliers 15a to 15g, and the adder 17 constitute the correlation value computing section 1002 in FIG. 1. The spreading code generating circuit 16 and polarity conversion circuit 107 form the spreading code generating section 1001 and spreading code generation control section 1005. The peak detector 18 forms the data signal demodulating section 1003 and peak signal detecting section 1004.

This embodiment has exemplified the case wherein N=7 is set to set the number of multipliers to N=7. However, N can be set to any integer equal to or more than 2.

The operation of the spread-spectrum demodulator of this embodiment will be described in detail below. The operations of the comparator 13 and flip-flop circuits 14a to 14f are the same as those in the fourth embodiment.

As in the fourth embodiment, the arrangement of the spreading code generating circuit 16 may be the same as that of the spreading code generating circuit 9 in the second embodiment shown in FIG. 11 or that of the spreading code generating circuit 4 in the first embodiment shown in FIG. 8.

The multipliers 15a to 15g multiply the spread signals output from the comparator 13 and flip-flop circuits 14a to 14f and the spreading codes output from the spreading code generating circuit 16 through the polarity conversion circuit 107 for each corresponding signal. The adder 17 adds the respective multiplication results from the multipliers 15a to 15g and outputs the resultant signal. The peak detector 18 detects the peak of the output signal from the adder 17 to output a digital data signal (baseband signal).

In an arrangement in which no polarity conversion is performed by the polarity conversion circuit 107, i.e., the spread-spectrum demodulator of the fourth embodiment, when transmission data makes a transition, a peak detection failure occurs, resulting in a detection failure period, as in the first embodiment.

In contrast to this, in this embodiment, the polarity conversion circuit 107 is provided between the spreading code generating circuit 16 and the multipliers 15a to 15g. The polarity conversion circuit 107 outputs nearly half of the N spreading codes output from the spreading code generating circuit 16 which correspond to either newer or older spread signals in reception order upon performing polarity conversion such that each output spreading code exhibits two polarity states, i.e., inverted and noninverted states, during one period of the second clock f2, and outputs the remaining codes of the N spreading codes without any change. This operation of the polarity conversion circuit 107 is the same as that of the polarity conversion circuit 104 in the eighth embodiment shown in FIG. 21.

In this embodiment, the comparator 13 always outputs the newest spread signal, and the flip-flop circuit 14f always outputs the oldest spread signal. Therefore, the nearly half of the spreading codes which correspond to newer spread signals are spreading codes corresponding to the multipliers 15a, 15b, 15c, and 15d (when the number of the nearly half is 4) or spreading codes corresponding to the multipliers 15a, 15b, and 15c (when the number of the nearly half is 3). The nearly half of the spreading codes which correspond to older spread signals are spreading codes corresponding to the multipliers 15g, 15f, 15e, and 15d (when the number of the nearly half is 4) or spreading codes corresponding to the multipliers 15g, 15f, and 15e (when the number of the nearly half is 3).

Figures 25A, 25B:
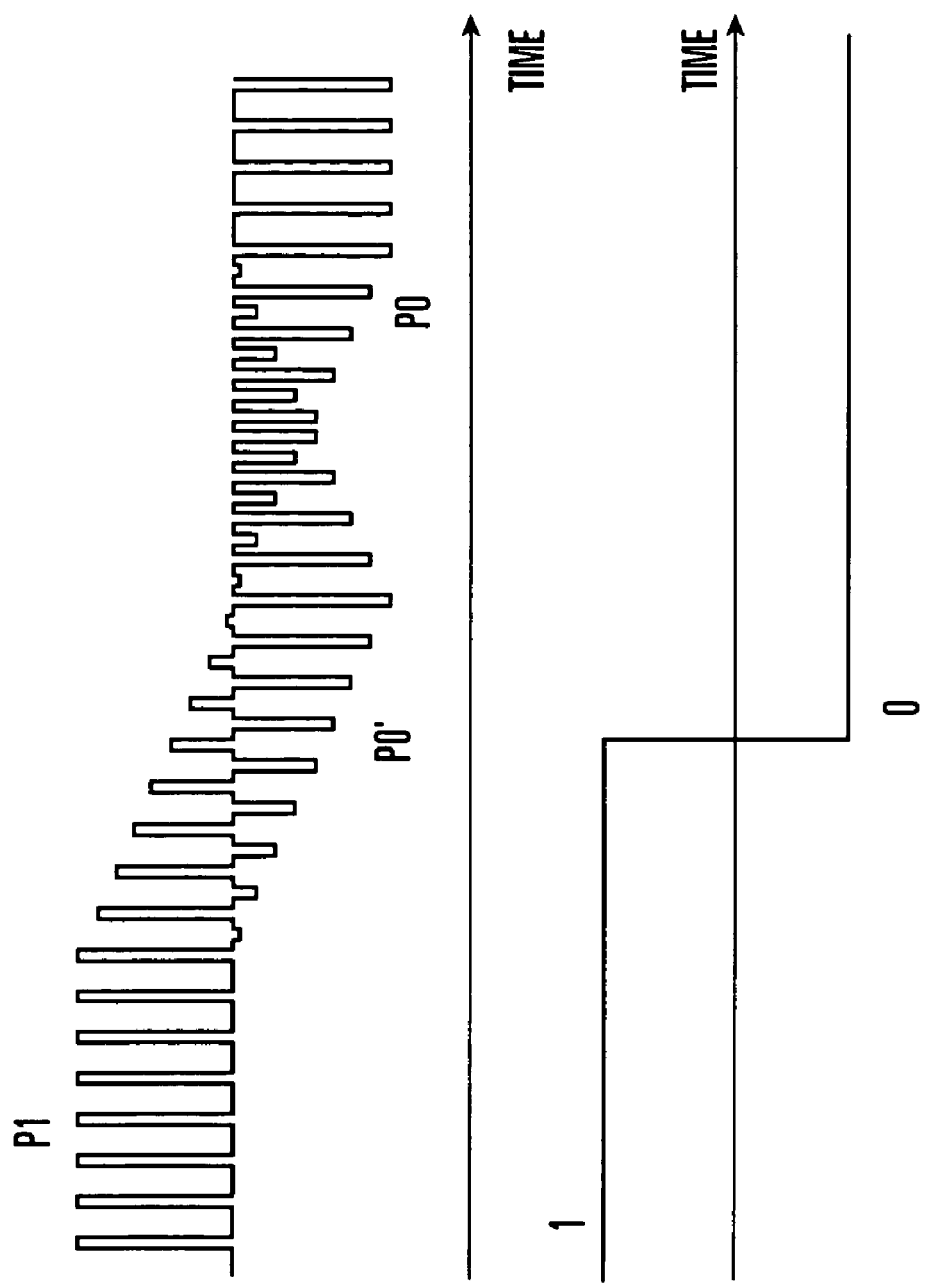
FIG. 25A is a view showing the waveform of an example of the output from an adder in the spread-spectrum demodulator in FIG. 24.
FIG. 25B is a view showing the waveform of an example of the output from a peak detector.

FIGS. 25A and 25B show characteristic signal waveforms at points A and B in FIG. 24. FIGS. 25A and 25B show a case wherein the nearly half of spreading codes which are polarity-converted by the polarity conversion circuit 107 correspond to the nearly older half of spread signals. As shown in FIG. 25B, when a data signal from the output terminal (the point B in FIG. 24) of the peak detector 18 makes a transition from "1" to "0", a negative peak P0' corresponding to the data signal "0" appears early at the output terminal (the point A in FIG. 24) of the adder 17 as compared with the case shown in FIGS. 15A and 15B wherein no polarity conversion is performed by the polarity conversion circuit 107 (FIG. 25A). Likewise, when a data signal makes a transition from "0" to "1", a positive peak corresponding to the data signal "1" appears early at the outer terminal of the adder 17 as compared with the case wherein no polarity conversion is performed by the polarity conversion circuit 107.

Figures 26A, 26B:
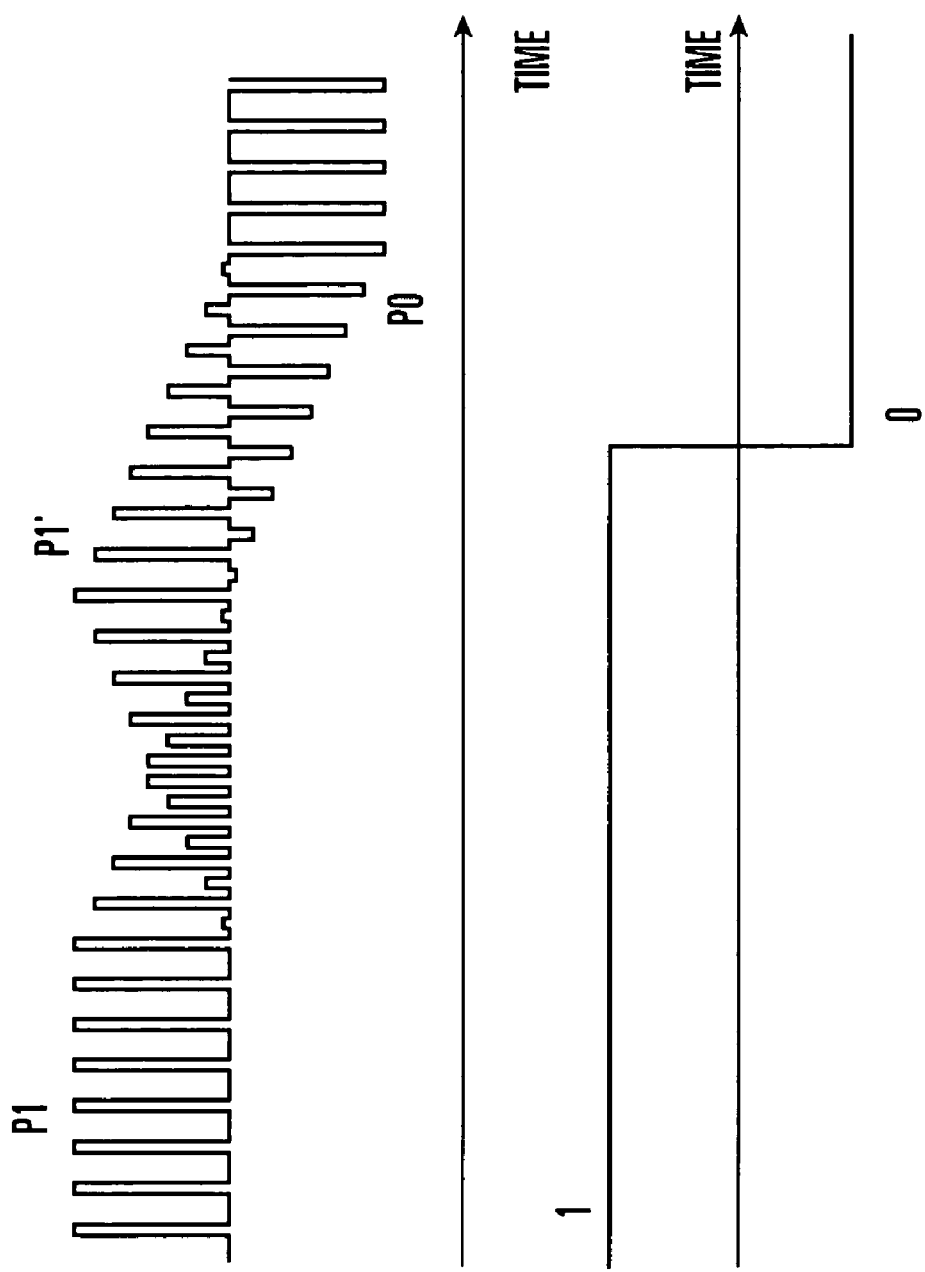
FIG. 26A is a view showing the waveform of another example of the output from the adder in the spread-spectrum demodulator in FIG. 24.
FIG. 26B is a view showing the waveform of another example of the output from the peak detector.

FIGS. 26A and 26B show signal waveforms in a case wherein the nearly half of spreading codes which are polarity-converted by the polarity conversion circuit 107 correspond to the nearly newer half of spread signals. As shown in FIG. 26B, when the data signal output from the peak detector 18 makes a transition from "1" to "0", a new positive peak P1' corresponding to the data signal "1" appears at the output terminal of the adder 6 unlike in the case wherein no polarity conversion is performed by the polarity conversion circuit 107 (FIG. 26A). Likewise, when the data signal makes a transition from "0" to "1", a new negative peak corresponding to the data signal "0" appears at the output terminal of the adder 17 unlike in the case wherein no polarity conversion is performed by the polarity conversion circuit 107.

According to the spread-spectrum demodulator in FIG. 24, despreading demodulation can be performed without performing synchronous control between spread signals and spreading codes. In addition, in this embodiment, since a correlation peak signal from the adder 17 is independent of the clocks f1 and f2 and the spreading codes to be used, the data rate of a signal to be transmitted can be increased. In addition, providing the comparator circuit 13 allows the N multipliers 15a to 15g, adder 17, peak detector 18, and register circuits to be formed by using digital circuits. This makes it possible to easily design a spread-spectrum demodulator and achieve a reduction in the size of the spread-spectrum demodulator. Furthermore, in this embodiment, the provision of the polarity conversion circuit 107 makes a peak always appear at the output terminal of the adder 17 even when a data signal changes from "1" to "0" or from "0" to "1", and hence no detection failure occurs. As a consequence, in the embodiment, jitter in the data signal can be greatly reduced.

12th Embodiment

Figure 27:
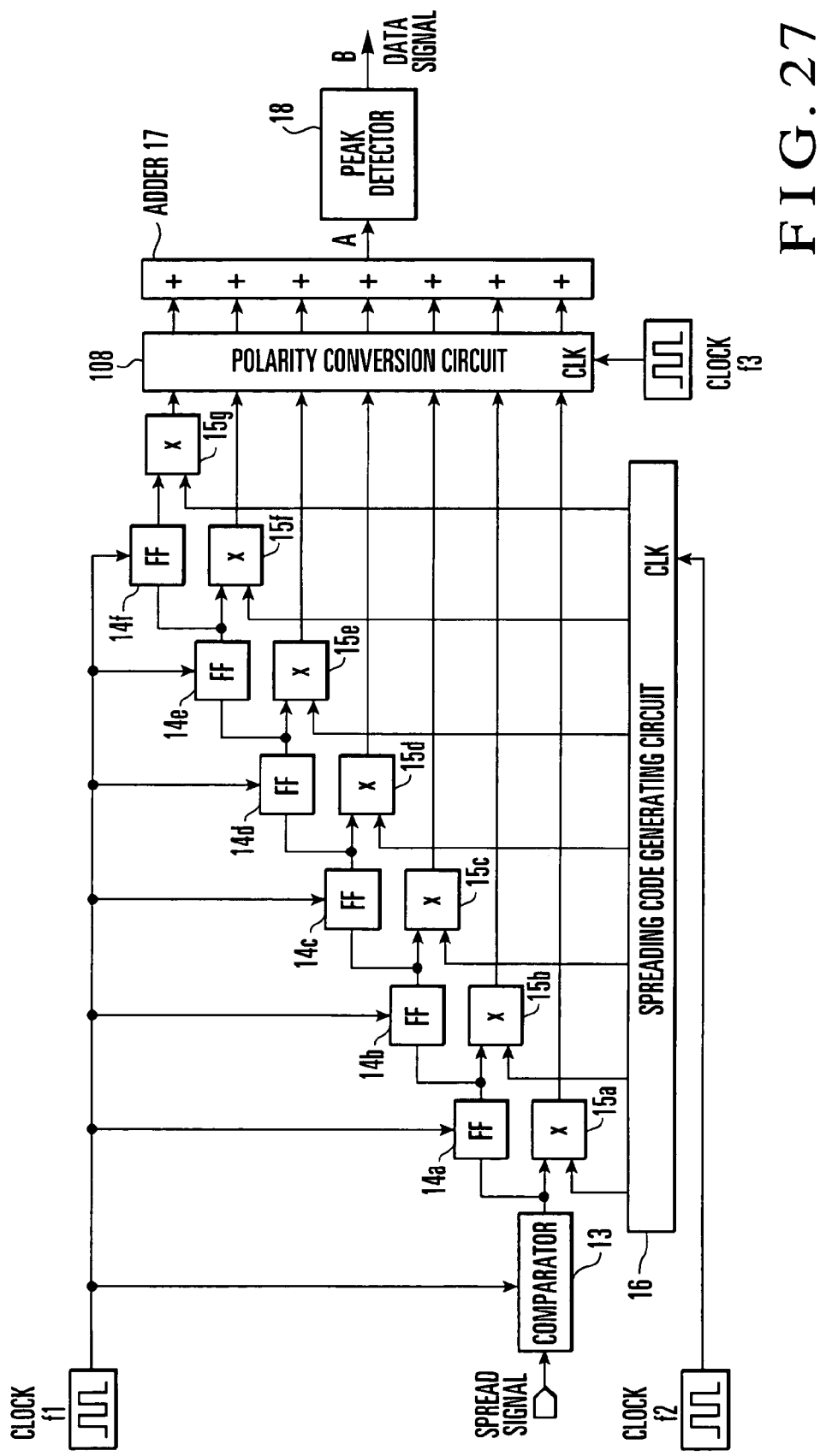
FIG. 27 is a block diagram showing a spread-spectrum demodulator according to the 12th embodiment of the present invention.

FIG. 27 shows a spread-spectrum demodulator according to the 12th embodiment of the present invention. The same reference numerals as in FIG. 24 denote the same parts in FIG. 27. In this embodiment, the installation position of the polarity conversion circuit of the spread-spectrum demodulator of the 11th embodiment is changed. A polarity conversion circuit 108 in this embodiment is provided between multipliers 15a to 15g and an adder 17.

A comparator 13, flip-flop circuits 14a to 14f as register circuits, the multipliers 15a to 15g, the adder 17, and polarity conversion circuit 108 constitute the correlation value computing section 1002 in FIG. 1. A spreading code generating circuit 16 forms the spreading code generating section 1001 and spreading code generation control section 1005. A peak detector 18 forms the data signal demodulating section 1003 and peak signal detecting section 1004.

The polarity conversion circuit 108 outputs nearly half of the N multiplier output signals from the multipliers 15a to 15g which correspond to newer or older spread signals in the order in which they are received by the spread-spectrum demodulator upon performing polarity conversion such that each of the output signals exhibits two polarity states, i.e., the inverted state and noninverted state, in one period of the clock f2, and outputs the remaining signals of the N multiplier output signals without any change. As in the 11th embodiment, the polarity conversion circuit 108 operates on the basis of a third clock f3.

The nearly half of the N multiplier output signals from the multipliers 15a to 15g which correspond to newer spread signals are the output signals from the multipliers 15a, 15b, 15c, and 15d (when the number of the nearly half is 4) or the output signals from the multipliers 15a, 15b, and 15c (when the number of the nearly half is 3). The nearly half of the multiplier output signals which correspond to older spread signals are the output signals from the multipliers 15g, 15f, 15e, and 15d (when the number of the nearly half is 4) or the output signals from the multipliers 15g, 15f, and 15e (when the number of the nearly half is 3).

In this manner, as in this embodiment, the same effects as those in the 11th embodiment can be obtained.

13th Embodiment

Figure 28:
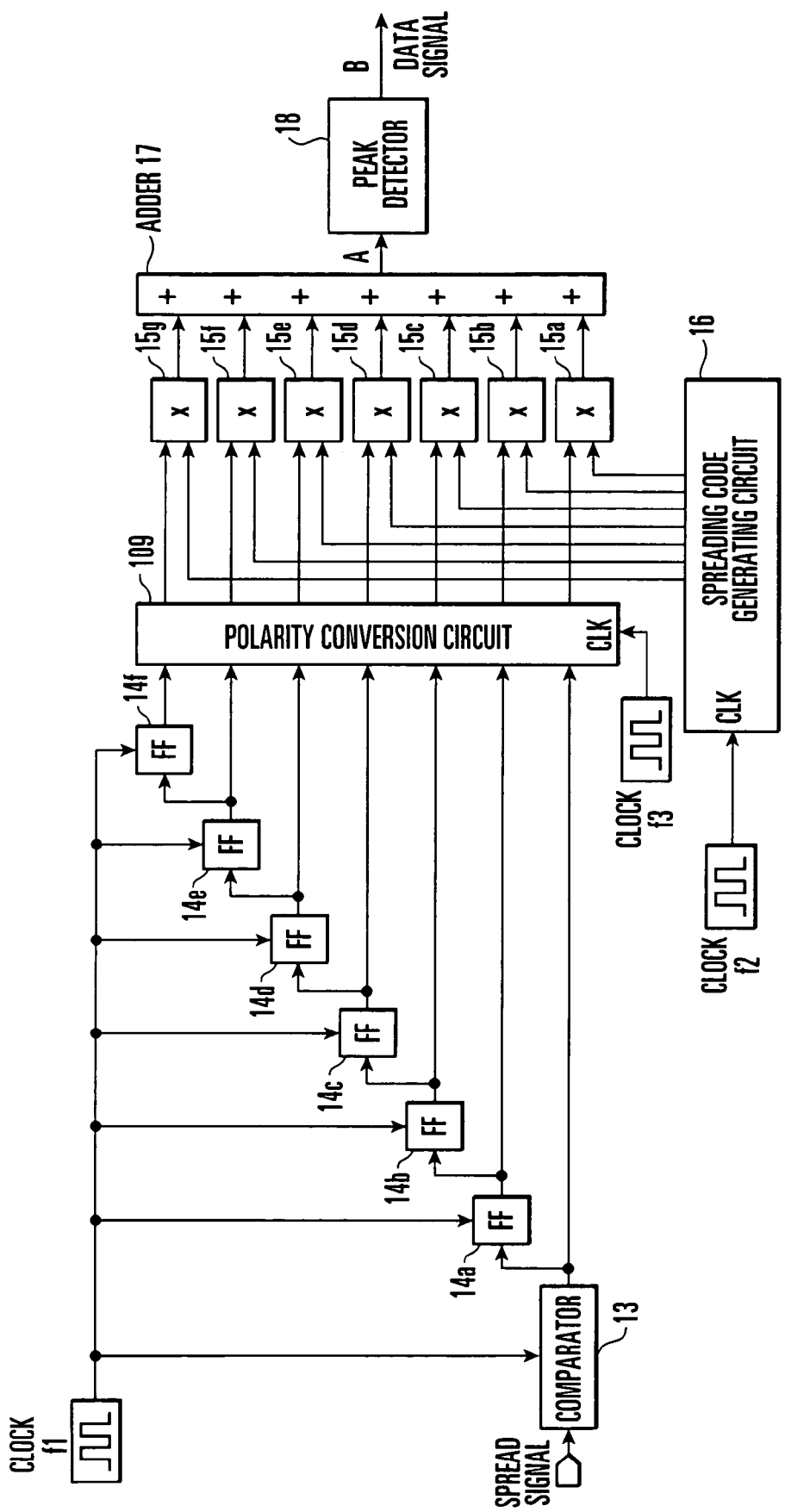
FIG. 28 is a block diagram showing a spread-spectrum demodulator according to the 13th embodiment of the present invention.

FIG. 28 shows a spread-spectrum demodulator according to the 13th embodiment of the present invention. The same reference numerals as in FIG. 24 denote the same parts in FIG. 28. In this embodiment, the installation position of the polarity conversion circuit in the spread-spectrum demodulator of the 11th embodiment is changed. In this embodiment, a polarity conversion circuit 109 is provided between a comparator 13 and flip-flop circuits 14a to 14f as register circuits and multipliers 15a to 15g.

The comparator 13, the flip-flop circuits 14a to 14f, the multipliers 15a to 15g, an adder 17, and the polarity conversion circuit 108 constitute the correlation value computing section 1002 in FIG. 1. A spreading code generating circuit 16 forms the spreading code generating section 1001 and spreading code generation control section 1005. A peak detector 18 forms the data signal demodulating section 1003 and peak signal detecting section 1004.

The polarity conversion circuit 109 outputs nearly half of N output signals from the comparator 13 and flip-flop circuits 14a to 14f which correspond to newer or older spread signals in the order in which they are received by the spread-spectrum demodulator upon performing polarity conversion such that each of the nearly half of the output signals from the flip-flop circuits exhibits two polarity states, i.e., the inverted state and noninverted state, in one period of a second clock f2, and outputs the remaining signals of the N output signals without any change. As in the 11th embodiment, the polarity conversion circuit 109 operates on the basis of a third clock f3.

The nearly half of the N output signals from the comparator 13 and flip-flop circuits 14a to 14f which correspond to the newer spread signals are the output signals from the comparator 13 and flip-flop circuits 14a, 14b, and 14c (when the number of the nearly half is 4) or the output signals from the comparator 13 and flip-flop circuits 14a and 14b (when the number of the nearly half is 3). The nearly half of the output signals which correspond to the older spread signals are the output signals from the flip-flop circuits 14f, 14e, 14d, and 14c (when the number of the nearly half is 4) or the output signals from the flip-flop circuits 14f, 14e, and 14d (when the number of the nearly half is 3).

In this manner, in this embodiment, the same effects as those in the 11th embodiment can be obtained.

14th Embodiment

The 14th embodiment of the present invention will be described next. A spread-spectrum demodulator according to this embodiment is characterized in that the multipliers 15a to 15g which multiply spread signals and spreading codes, the adder 17 which adds the respective outputs from the multipliers 15a to 15g, and the peak detector 18 which detects the peak of an output from the adder 17 in the 11th to 13th embodiments are formed by using digital circuits.

Both spread signals and spreading codes input to multipliers 15a to 15g are the digital signals output from flip-flop circuits. Therefore, despreading demodulation can be performed by digital computation using digital circuits instead of analog computation using circuits like those shown in FIGS. 6 and 7.

Consider a case wherein the multipliers 15a to 15g, adder 17, and peak detector 18 of the spread-spectrum demodulator of the fourth embodiment are formed by digital circuits. Assume that the multipliers 15a to 15g are formed from EXORs (Exclusive-ORs) and NOTs. In this case, if a spread signal and spreading code become in phase with each other with the same polarity, the digital signal output from each of the multipliers 15a to 15g becomes "1". If the number of multipliers is 7, the addition result becomes "7". In contrast, if a spread signal and spreading code become in phase with each other with opposite polarities, the digital signal output from each of the multipliers 15*a* to 15*g* becomes "0". The addition result also becomes "0".

If a spread signal and spreading code are out of phase with each other by one chip rate or more, the result output from an adder 17 becomes about "3" or "4" intermediate between "0" and "7". A correlation peak signal with the value "7" output from the adder 17 corresponds to "1" of a transmitted baseband signal. A correlation peak signal with the value "0" output from the adder 17 corresponds to "0" of the transmitted baseband signal. Therefore, the transmitted baseband signal can be demodulated by detecting a correlation peak signal near "0" and a correlation peak signal near "7" which are output from the adder 17.

In this embodiment, therefore, despreading demodulation can be performed without synchronous control between spread signals and spreading codes, and all the circuits other than the comparator circuit can be implemented by digital circuits. This facilitates the design of a spread-spectrum demodulator and can achieve a reduction in the size of the spread-spectrum demodulator.

15th Embodiment

The 15th embodiment of the present invention will be described next. This embodiment is directed to solve the problems in the first and fourth embodiments (the arrangement of the spreading code generating circuit 4 is used as the arrangement of the spreading code generating circuit 16), the fifth to seventh embodiments and 11th embodiment (the arrangement of the spreading code generating circuit 4 is used as the arrangement of the spreading code generating circuit 16), the 12th embodiment (the arrangement of the spreading code generating circuit 4 is used as the arrangement of the spreading code generating circuit 16), the 13th embodiment (the arrangement of the spreading code generating circuit 4 is used as the arrangement of the spreading code generating circuit 16), and the 14th embodiment (the arrangement of the spreading code generating circuit 4 is used as the arrangement of the spreading code generating circuit 16). The problems in these embodiments will be described with reference to FIG. 8.

Consider the initial state of a spreading code generating circuit 4 in which first switches 44*a* to 44*g* and 44*o* are closed, and the second switches 44*h* to 44*n* and 44*p* are open. Consider a flip-flop circuit 43*d*. The signal output from the flip-flop circuit 43*d* is supplied to a multiplier 5*d* through the switch 44*d*, and at the same time input to a flip-flop circuit 43*k*.

Assume that in this state, a peak detector 7 detects a correlation peak signal, and a spreading code control circuit 45 immediately controls the switches to reverse the ON/OFF states of the first switches 44*a* to 44*g* and 44*o* and second switches 44*h* to 44*n* and 44*p* (the first switches 44*a* to 44*g* and 44*o* are turned off, and the second switches 44*h* to 44*n* and 44*p* are turned on). In this case, the above signal input to the flip-flop circuit 43*k* is supplied to a multiplier 5*c* through the switch 44*k*. Since the peak detector 7 detects the correlation peak signal when the signal supplied to the multiplier 5*c* is supplied to the multiplier 5*d*, no correlation peak signal is generated while this signal is supplied to the multiplier 5*c*. That is, after a correlation peak signal is generated, the next correlation peak signal cannot be immediately obtained.

The spreading code generating circuit 4 shown in FIG. 8 is based on the premise that there is a delay time between the instant at which the peak detector 7 or 18 detects a correlation peak signal and the instant at which the shifting direction of a spreading code is changed. If this delay time is so short that the shifting direction of a spreading code is changed before a spreading code deviates from the spreading code pattern at the time of acquisition of a correlation peak signal, correlation peak signals cannot be frequently obtained.

If, therefore, the delay time is too short, a circuit for setting a proper delay for control on the switches of the spreading code generating circuit 4 is required. This delay amount changes depending on the chip rate of a spreading code (the frequency of a second clock f2 supplied to the spreading code generating circuit 4). In addition, this arrangement must cope with a change in the spreading ratio of a spreading code (a change in the frequency of a first clock f1). If, therefore, the spread-spectrum demodulator is configured to set a predetermined value in advance, a delay time is uselessly produced.

In this embodiment, a spreading code generating circuit and peak detector are provided, which can obtain a correlation peak signal with the minimum delay amount (one period of the second clock f2). In the arrangement of this embodiment, a correlation peak signal can always be obtained with the minimum delay amount regardless of the frequency of the second clock f2 supplied to the flip-flop circuits in the spreading code generating circuit.

Figure 29:
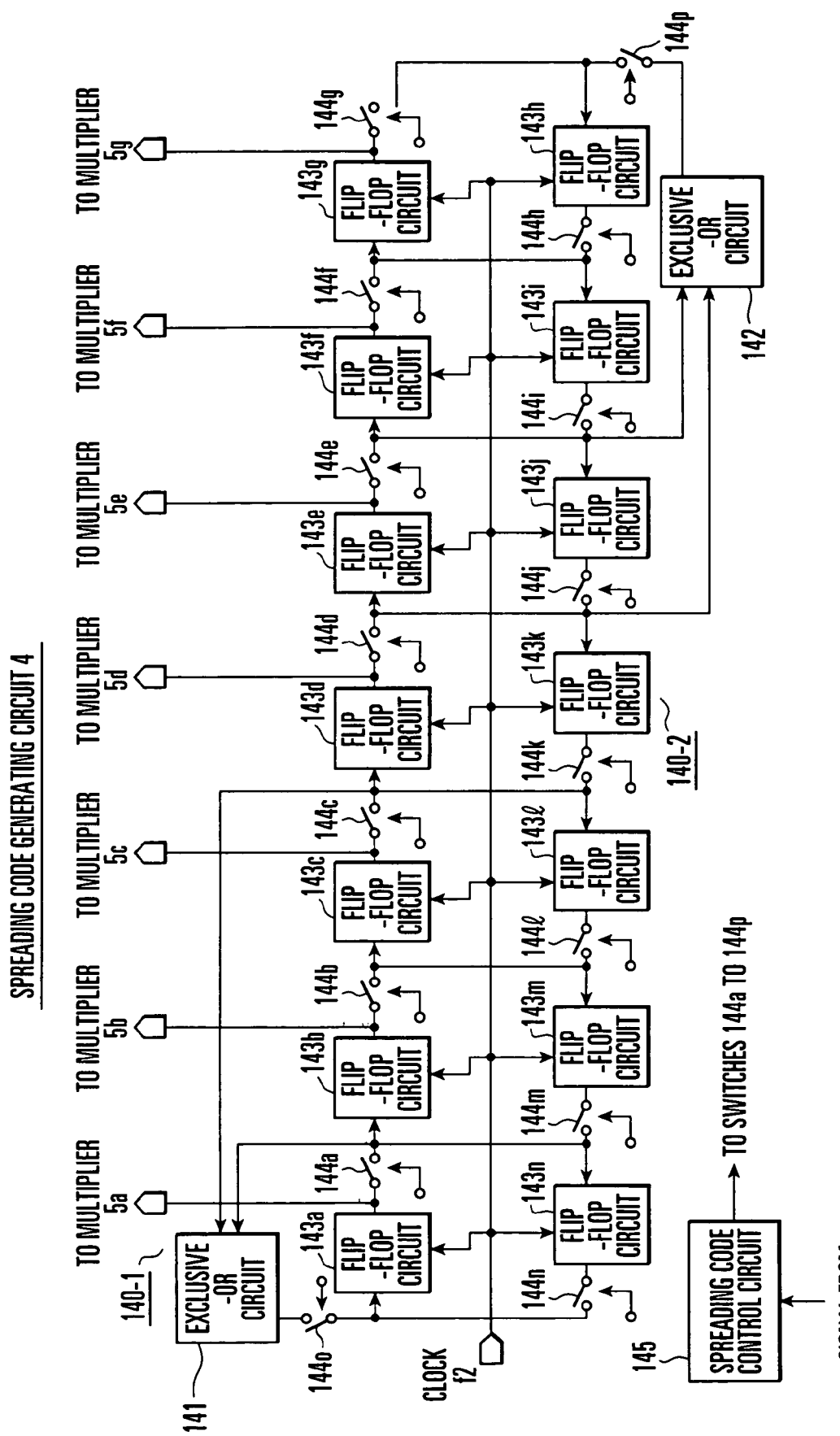
FIG. 29 is a block diagram showing a spread-spectrum demodulator according to the 15th embodiment of the present invention.

FIG. 29 shows the arrangement of the spreading code generating circuit 4 in this embodiment. The spreading code generating circuit 4 in this embodiment is comprised of exclusive-OR circuits 141 and 142, flip-flop circuits 143*a* to 143*n* constituting a shift register which performs shifting operation in synchronism with the second clock f2, switches 144*a* to 144*p* which turn on/off output paths to the exclusive-OR circuits 141 and 142 or flip-flop circuits 143*a* to 143*n*, and a spreading code control circuit 145 which controls the switches 144*a* to 144*p*. The spreading code generating circuit 4 in this embodiment is equivalent to the spreading code generating circuit shown in FIG. 8 in which the positions of the output terminals for spreading codes are changed. Referring to FIG. 8, spreading codes are output from the flip-flop circuits 43*a* to 43*g* through the switches 44*a* to 44*g*. In contrast to this, in this embodiment, spreading codes are directly output from the flip-flop circuits 143*a* to 143*g*.

In this embodiment, outputs from the flip-flop circuits 143*a* and 143*c* are input to the exclusive-OR circuit 141, and the computation result obtained by the exclusive-OR circuit 141 is fed back to the input terminal of the flip-flop circuit 143*a*, thereby generating the first spreading codes. Outputs from the flip-flop circuits 143*j* and 143*i* are input to the exclusive-OR circuit 142, and the computation result obtained by the exclusive-OR circuit 142 is fed back to the input terminal of the flip-flop circuit 143*h*, thereby generating the second spreading codes which are equivalent to codes obtained by rearranging the first spreading codes in reverse order. That is, the first exclusive-OR circuit 141, the first flip-flop circuit group constituted by flip-flop circuits 143*a* to 143*g*, and the first switch group constituted by the switches 144*a* to 144*g* and 144*o* constitute a first spreading code generating circuit 140-1 which generates the first spreading codes. The second exclusive-OR circuit 142, the second flip-flop circuit group constituted by the flip-flop circuits 143*h* to 143*n*, and the second switch group constituted by the switches 144*h* to 144*n* and 144*p* constitute a second spreading code generating circuit 140-2 which generates the second spreading codes in which a signal shifts in the reverse direction relative to the first spreading codes. As described in the first embodiment, various kinds of spreading codes can be formed by only changing the combinations of inputs to the exclusive-OR circuits 141 and 142 or the number of exclusive-OR circuits.

The spreading code control circuit 145 controls the switches 144*a* to 144*p* in accordance with peak detection by the peak detector 7. When the switches 144*a* to 144*g* and 144*o* are ON, the switches 144*h* to 144*n* and 144*p* are OFF. Consequently, the first spreading codes generated by the first spreading code generating circuit 140-1 shift from left to right in FIG. 29. In contrast, when the switches 144*a* to 144*g* and 144*o* are OFF, the switches 144*h* to 144*n* and 144*p* are ON. Consequently, the second spreading codes generated by the second spreading code generating circuit 140-2 shift from right to left in FIG. 29. The spreading code control circuit 145 changes the shifting direction of a spreading code by alternately switching the switches 144*a* to 144*g* and 144*o* of the first switch group and the switches 144*h* to 144*n* and 144*p* of the second switch group every time a peak is detected by the peak detector 7.

Figure 30:
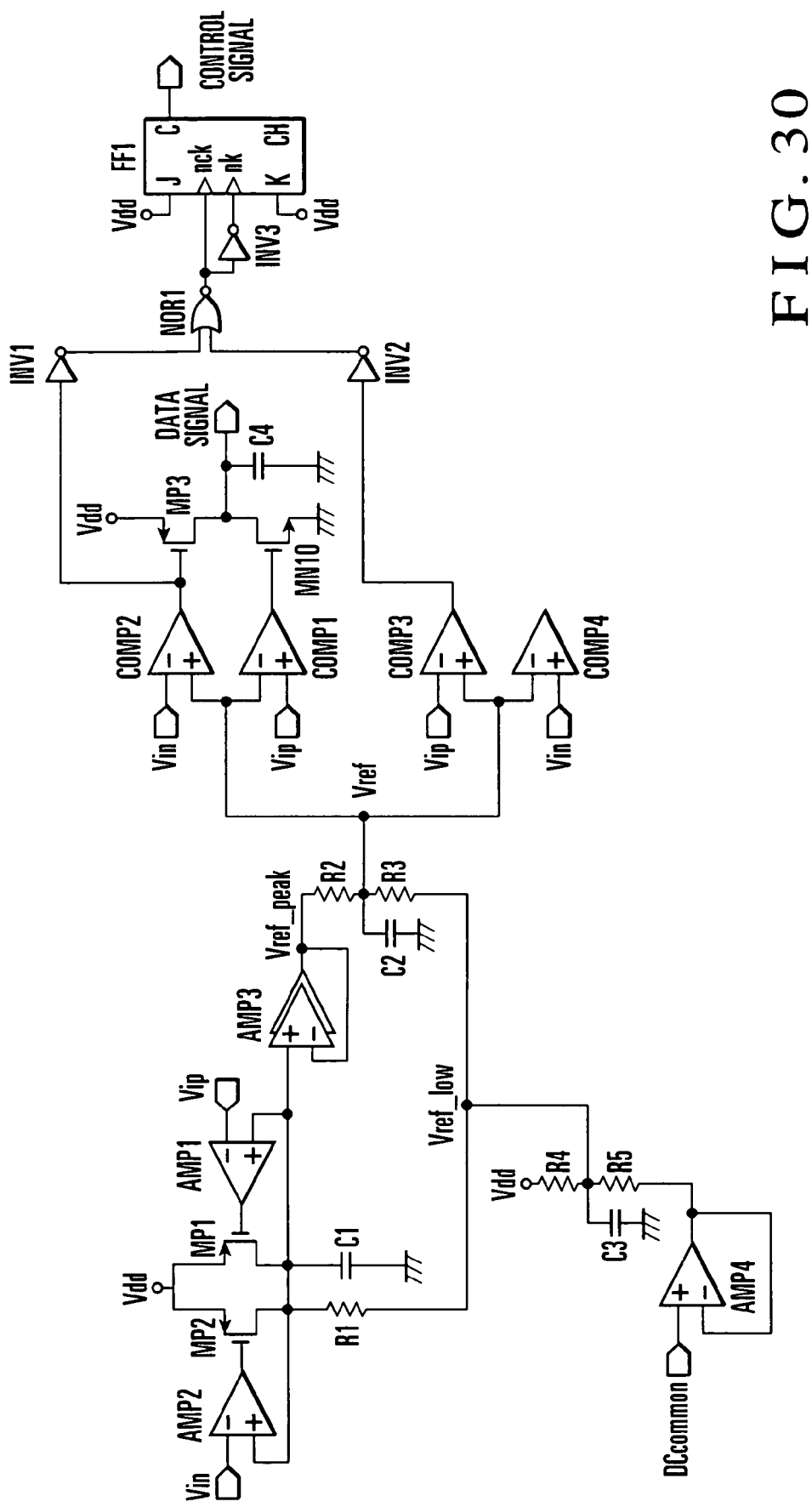
FIG. 30 is a circuit diagram showing the arrangement of a peak detector used in the spread-spectrum demodulator according to the 15th embodiment of the present invention.

FIG. 30 shows the arrangement of the peak detector 7 in this embodiment (the peak detectors 18 in the fourth embodiment and the 11th to 14th embodiments).

The peak detector 7 in FIG. 30 determines a reference level Vref on the basis of outputs from adders 6 and 17, and detects a correlation peak signal by comparing the reference level Vref with outputs from the adders 6 and 17. The peak detector 7 in FIG. 30 also detects the trailing edge of the correlation peak signal.

Differential amplifiers AMP1 to AMP3, PMOS transistors MP1 and MP2, resistors R1 to R3, and capacitors C1 and C2 constitute a circuit which determines the reference level Vref on the basis of the peak levels of outputs from the adders 6 and 17 and a predetermined lower limit level. As described with reference to FIG. 7, correlation signals are output in the differential form from the adders 6 and 17. A correlation signal Vip and a complementary correlation signal Vin output from the adders 6 and 17 are input to the differential amplifiers AMP1 and AMP2, respectively. The differential amplifier AMP3 outputs a peak level Vref_peak of the outputs from the adders 6 and 17. The resistors R2 and R3 and capacitor C2 then set the reference level Vref between the peak level Vref_peak and a lower limit level Vref_low.

Outputs from the adders 6 and 17 contain spike noise near the common mode, and hence there is a need to prevent this noise from being mistakenly detected as a peak signal. For this purpose, the differential amplifier AMP4, resistors R4 and R5, and capacitor C3 are used to set a level between a power supply voltage Vdd and a common mode level DCcommon as the lower limit level Vref_low of the reference level Vref.

Figure 31:
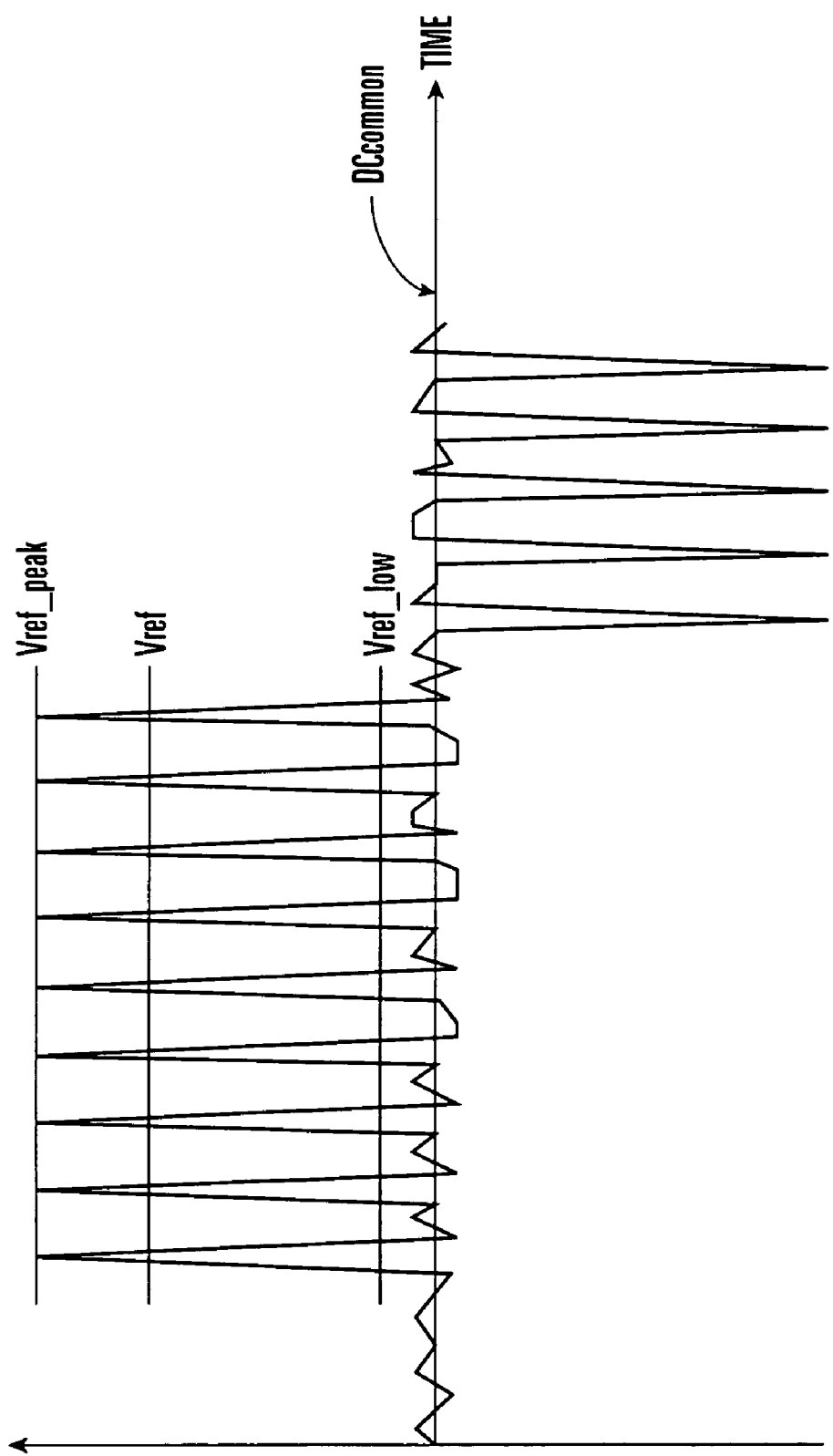
FIG. 31 is a view showing the relationship between the peak level of an adder output, the lower level, the reference level, and the common mode level.

FIG. 31 shows the relationship between the peak level Vref_peak, lower limit level Vref_low, reference level Vref, and common mode level DCcommon.

Comparators COMP1 and COMP2, a PMOS transistor MP3, an MNOS transistor MN10, and a capacitor C4 constitute a circuit which detects a correlation peak signal by comparing the reference level Vref with outputs from the adders 6 and 17, and demodulates the data signal "1" or "0".

Comparators COMP3 and COMP4, inverters INV1 to INV3, a NOR circuit NOR1, and a JK flip-flop FF1 constitute a circuit which compares the reference level Vref with outputs from the adders 6 and 17 to generate a control signal synchronized with the trailing edge of the peak signal of the outputs from the adders 6 and 17. In this circuit, outputs from the comparators COMP2 and COMP3 are respectively inverted by the inverters INV1 and INV2 and input to the NOR circuit NOR1. An output from the NOR circuit NOR1 is then inverted by the inverter INV3 and input to the clock input terminal of the JK flip-flop FF1. In addition, an output from the NOR circuit NOR1 is input to the inverted clock input terminal of the JK flip-flop FF1. Note that the comparator COMP4 is provided to achieve load balancing on the comparator COMP1/COMP2 side and the comparator COMP3 side.

Figures 32A, 32B:
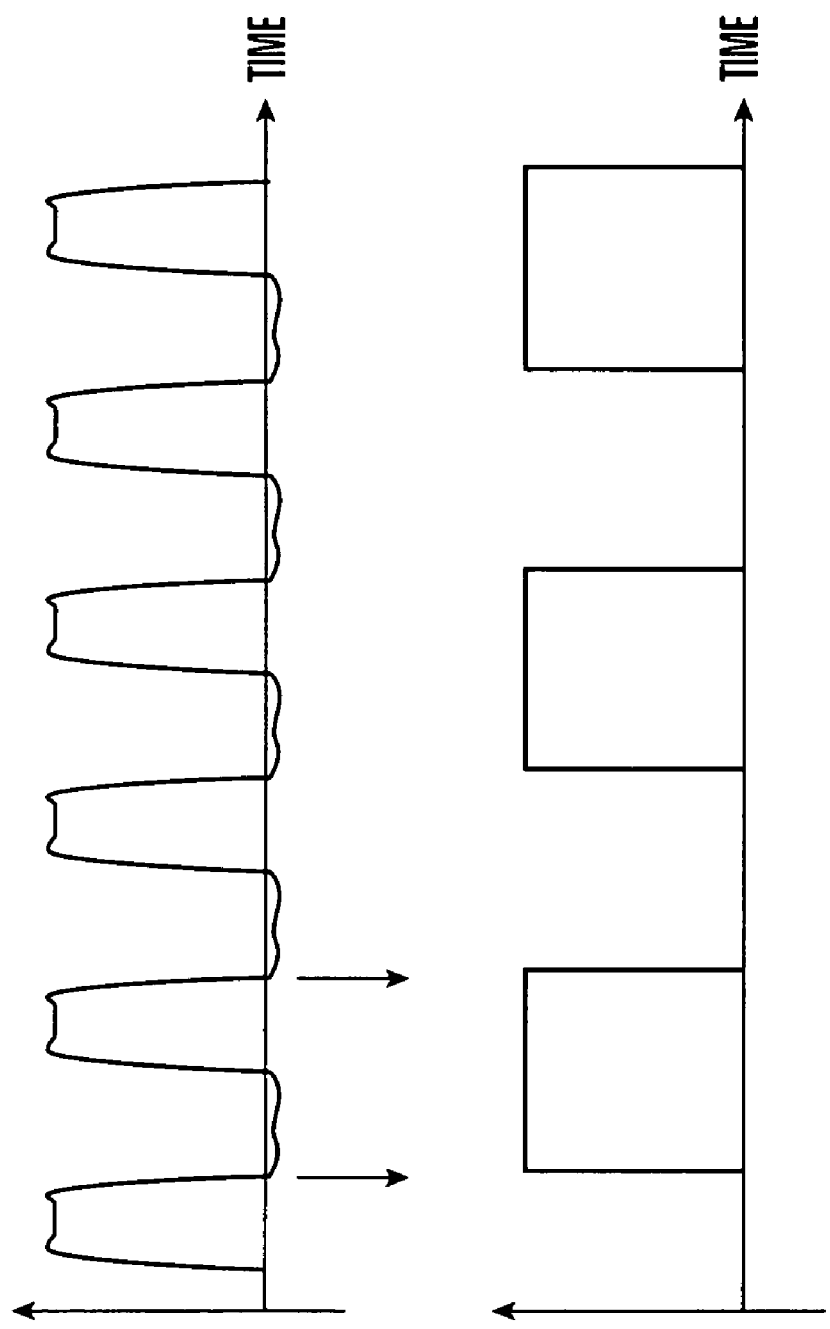

Outputs from the comparators COMP2 and COMP3 go to High or Low level every time a correlation peak signal is detected. The JK flip-flop FF1 operates as a 1-bit counter for counting such correlation peak signals. FIG. 32A shows the waveform of each of outputs from the adders 6 and 17. FIG. 32B shows the waveform of the control signal output from the JK flip-flop FF1. As shown in FIGS. 32A and 32B, an output from the JK flip-flop FF1 changes in synchronism with the trailing edge of the correlation peak signal output from each of the adders 6 and 17.

FIGS. 33A to 33F explain the operation of the spreading code generating circuit 4 in FIG. 29. FIG. 33A shows the waveform of the second-clock f2. FIG. 33B shows the waveform of an output from the flip-flop circuit 143*c*. FIG. 33C shows the waveform of an output from the flip-flop circuit 143*l*. FIG. 33D shows the waveform of an output from the flip-flop circuit 143*m*. FIG. 33E shows the waveform of an output from the flip-flop circuit 143*b*. FIG. 33F shows the waveform of the control signal output from the JK flip-flop FF1 of each of the peak detectors 7 and 18.

Consider first the initial state of the spreading code generating circuit 4 in which the switches 44*a* to 44*g* and 44*o* of the first switch group are closed, and the switches 44*h* to 44*n* and 44*p* of the second switch group are open, i.e., the first spreading code generated by the first spreading code generating circuit 140-1 shifts from left to right in FIG. 29.

Assume that when the flip-flop circuit 143*c* outputs a given signal as shown in FIG. 33B at time t1 in FIG. 33A, the signal pattern of a spread signal input to the spread-spectrum demodulator coincides with the signal pattern of a spreading code output from the spreading code generating circuit 4, and a correlation peak signal is obtained from outputs from the adders 6 and 17. At this time, an output signal from the flip-flop circuit 143*c* is also supplied to the input terminal of the flip-flop circuit 143*l* on the lower stage.

When the flip-flop circuit 143*c* makes a state transition upon reception of the second clock f2 at time t2 in FIG. 33A, and the spreading code shifts by one code, the signal pattern of the spread signal shifts from that of the spreading code. As a consequence, the correlation peak signals output from the adders 6 and 17 decrease to the common level DCcommon. The JK flip-flop FF1 of the peak detectors 7 and 18 outputs a control signal like that shown in FIG. 33F in synchronism with the trailing edge of this correlation peak signal.

The spreading code control circuit 145 changes the shifting direction of a spreading code by alternately switching the switches 144*a* to 144*g* and 144*o* of the first switch group and the switches 144*h* to 144*n* and 144*p* of the second switch group every time a high-level control signal is output from each of the peak detectors 7 and 18. As a consequence, the switches 144*a* to 144*g* of the first switch group are open, and the switches 144*h* to 144*n* and 144*p* of the second switch group are closed.

At this time, the flip-flop circuit 143*l* outputs a signal before the state transition of the flip-flop circuit 143*c* (FIG. 33C). This signal is the signal that has been output from the flip-flop circuit 143*c* when the correlation peak signal was obtained from each of the adders 6 and 17 at time t1. Since the switch 144*l* is closed, the signal output from the flip-flop circuit 143*l* is immediately input to the flip-flop circuit 143*c*. At the same time, this signal is supplied to the input terminal of the flip-flop circuit 143*m*.

When the flip-flop circuit 143*c* makes a state transition upon reception of the second clock f2 at time t3 in FIG. 33A, the flip-flop circuit 143c outputs an input signal (FIG. 33B). The signal output from the flip-flop circuit 143c is the signal that has been output from the flip-flop circuit 143c when a correlation peak signal was obtained from each of the adders 6 and 17 at time t1. Therefore, a correlation peak signal is obtained from outputs from the adders 6 and 17. In addition, the same signal is also output from the flip-flop circuit 143m and supplied to the input terminal of the flip-flop circuit 143b.

When the flip-flop circuit 143c makes a state transition upon reception of the second clock f2 at time t4 in FIG. 33A, and a spreading code shifts by one code, the correlation signals output from the adders 6 and 17 decrease to the common mode level DCcommon. The JK flip-flop FF1 of the peak detectors 7 and 18 outputs a control signal in synchronism with the trailing edge of this correlation peak signal.

The spreading code control circuit 145 controls the switches 144a to 144g and 144o of the first switch group and the switches 144h to 144n and 144p of the second switch group. With this operation, the switches 44a to 44g and 44o of the first switch group are closed, and the switches 44h to 44n and 44p of the second switch group are open.

At this time, the flip-flop circuit 143b outputs the same signal as that output from the flip-flop circuit 143c when the correlation peak signal was obtained from the adder 6 or 17 at time t3 (FIG. 33E). Since the switch 144b is closed, the signal output from the flip-flop circuit 143b is immediately supplied to the input terminal of the flip-flop circuit 143c.

When the flip-flop circuit 143c makes a state transition upon reception of the second clock f2 at time t5 in FIG. 33A, the flip-flop circuit 143c outputs the input signal (FIG. 33B). The signal output from the flip-flop circuit 143c is the signal output from the flip-flop circuit 143c when the correlation peak signal was obtained from the adder 6 or 17 at time t3. Therefore, a correlation peak signal is obtained again from outputs from the adders 6 and 17.

Subsequently, similar control is repeated. According to this embodiment, a correlation peak signal can be obtained from the adder 6 or 17 with the shortest delay time, i.e., a delay time corresponding to one period of the second clock f2 supplied to the spreading code generating circuit 4. In addition, this embodiment can be implemented by only changing the positions of the output terminals of the spreading code generating circuit 4 in the first embodiment, the fourth to seventh embodiments, and the 11th to 14th embodiments, and hence the spreading code generating circuit 4 need not have any new circuit for setting delays in control on the switch groups.

16th Embodiment

FIG. 34 shows a spread-spectrum demodulator according to the 16th embodiment of the present invention. The spread-spectrum demodulator in FIG. 34 is comprised of an asynchronous despreading demodulation means 1006, a low-pass filter 1007 which passes only a signal, of the signal output from the asynchronous despreading demodulation means 1006, which falls within the data frequency band, and a waveform shaper 1008 which receives a signal from the low-pass filter 1007 and shapes its waveform. As the asynchronous despreading demodulation means 1006, the spread-spectrum demodulator shown in FIG. 1 and based on the basic concept of the present invention or the spread-spectrum demodulator described one of the first to 15th embodiments may be used.

This embodiment is configured to use the waveform shaper 1008 to shape an output from the low-pass filter 1007. However, an output from the low-pass filter 1007 may be directly A/D-converted into a baseband signal, and waveform shaping may be performed by digital signal processing of the baseband signal. That is, the waveform shaper 1008 is not necessarily required.

Figure 35A:
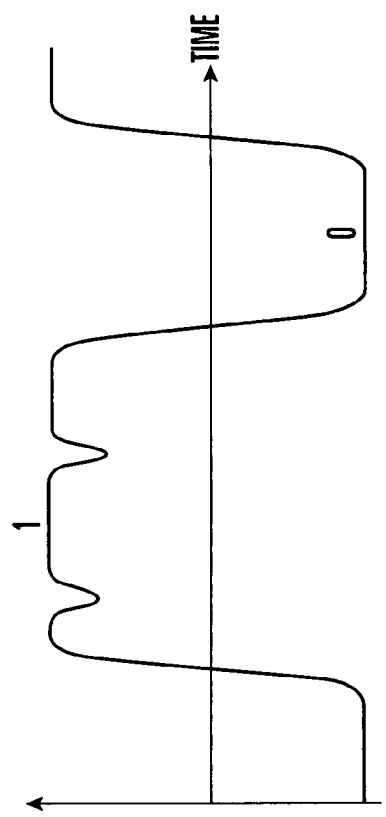
Figure 35B:
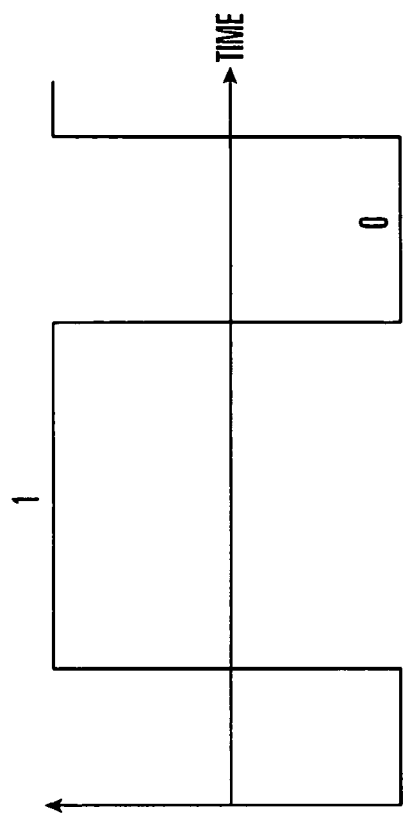
Figure 35C:
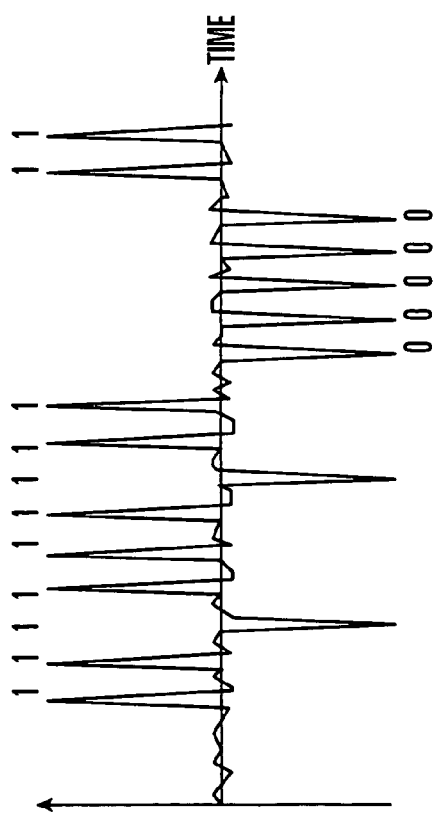
Figure 35D:
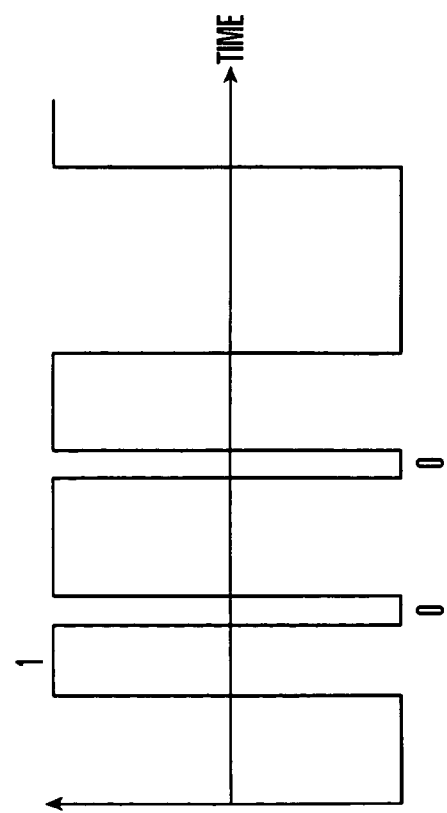
Figure 38:
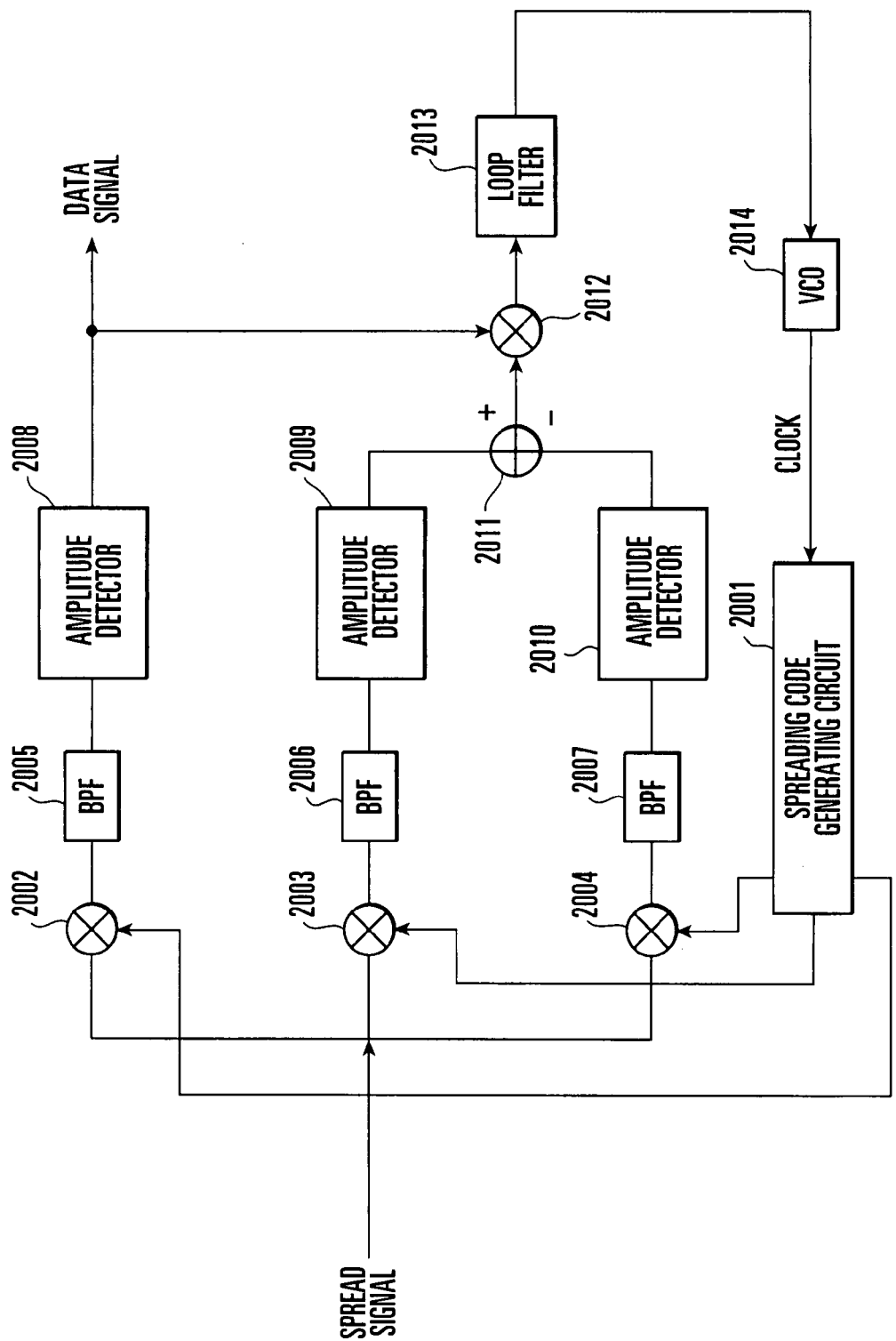
FIG. 38 is a block showing an example of a conventional spread-spectrum demodulator.
Figure 39:
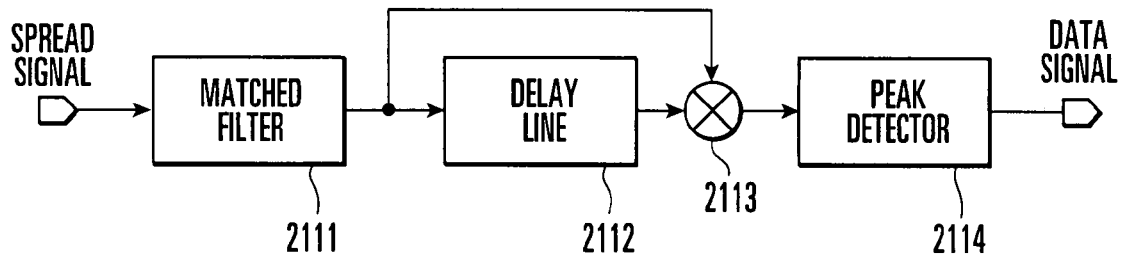
FIG. 39 is a block diagram showing another example of the conventional spread-spectrum demodulator.
Figure 40A:
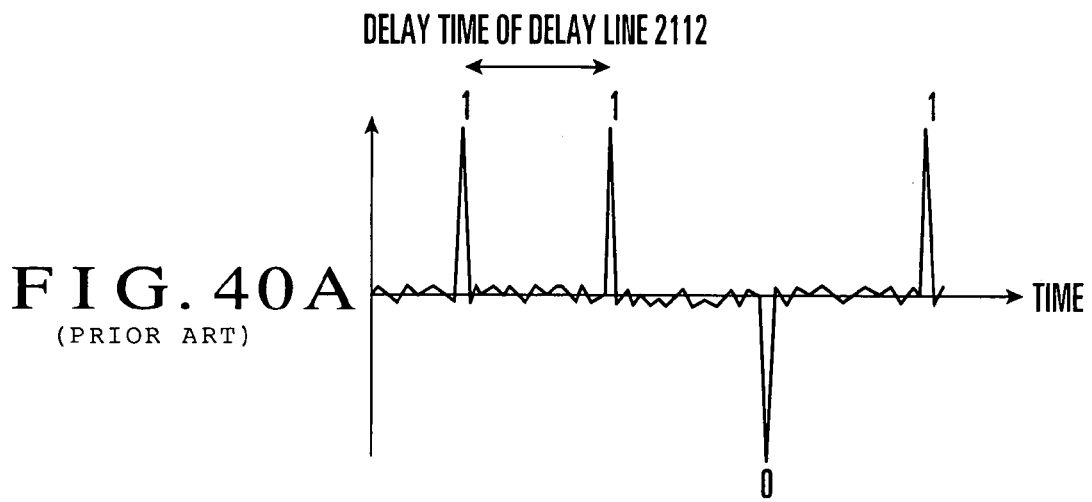
FIG. 40A is a view showing the waveform of an output from an adder in the spread-spectrum demodulator in FIG. 39.
Figure 40B:
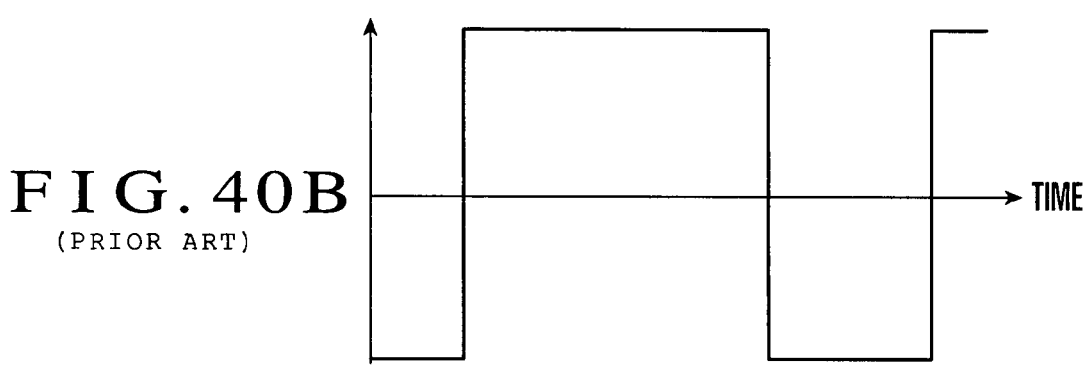
FIG. 40B is a view showing the waveform of an output from a peak detector.

FIGS. 35A to 35D explain the operation of the spread-spectrum demodulator in FIG. 34. FIG. 35A shows the waveform of an output from an adder in the asynchronous despreading demodulation means 1006. FIG. 35B shows the waveform of an output from the asynchronous despreading demodulation means 1006. FIG. 35C shows the waveform of an output from the low-pass filter 1007. FIG. 35D shows the waveform of an output from the waveform shaper 1008.

As the noise power contained in a received spread signal increases, in the asynchronous despreading demodulation means 1006, a peak signal based on a noise component appears in a correlation peak signal obtained when a spread signal is correlated with a spreading code, in addition to a peak signal obtained only when the spreading code is in phase with the spread signal. This peak signal based on the noise component randomly appears independently of transmission data. If, therefore, this peak signal is detected and demodulated, an erroneous data signal may be obtained. FIG. 35A shows how peak signal components having a polarity opposite to a peak signal that should be obtained are contained in an adder output in the asynchronous despreading demodulation means 1006 due to noise. When these signal components are detected and demodulated, the signal shown in FIG. 35B is obtained. That is, part of data which should represent "1" is inverted, and the resultant signal is erroneously output.

This embodiment is configured to filter the signal output from the asynchronous despreading demodulation means 1006 and shown in FIG. 35B with the low-pass filter 1007 and shape the waveform of the signal by using the waveform shaper 1008. FIG. 35C shows the signal obtained by filtering the signal in FIG. 35B. FIG. 35D shows the result obtained by shaping the waveform of the signal in FIG. 35C.

As shown in FIG. 35C, by filtering the signal in FIG. 35B, high-frequency signal components higher than the data rate are removed. As is obvious, the signal shown in FIG. 35D, which is obtained by shaping the waveform of this signal, indicates that the transmission data is properly demodulated. That is, this embodiment suppresses noise and improves the sensitivity characteristics of the spread-spectrum demodulator.

According to the spread-spectrum demodulator in FIG. 34, erroneous demodulation due to noise can be prevented by providing the low-pass filter 1007 for suppressing noise outside the frequency band of data signals from the asynchronous despreading demodulation means 1006. This makes it possible to realize a spread-spectrum demodulator with high reliability, a simple arrangement, and low power consumption. This in turn can achieve reductions in the power and cost of a portable radio.

17th Embodiment

FIG. 36 shows a spread-spectrum demodulator according to the 17th embodiment of the present invention. The spread-spectrum demodulator in FIG. 36 is comprised of an asynchronous despreading demodulation means 1009 and a counter circuit 1010 serving as a demodulation means which demodulates a data signal by counting correlation peak signals output from the asynchronous despreading demodulation means 1009.

As the asynchronous despreading demodulation means 1009, the spread-spectrum demodulator shown in FIG. 1 and based on the basic concept of the present invention or the spread-spectrum demodulator described in one of the first to 15th embodiments may be used. In this embodiment, however, an output from a correlation value computing section 1002 or an adder 6, 11, or 17 is input to the counter circuit 1010. If, therefore, the spread-spectrum demodulator shown in FIG. 1 is to be used, a data signal demodulating section 1003 is not required.

FIGS. 37A and 37B explain the operation of the spread-spectrum demodulator in FIG. 36. FIG. 37A shows the waveform of an output from the asynchronous despreading demodulation means 1009. FIG. 37B shows the waveform of an output from the counter circuit 1010.

As the noise power contained in a received spread signal increases, in the asynchronous despreading demodulation means 1009 a peak signal based on a noise component appears in a correlation peak signal obtained when a spread signal is correlated with a spreading code, in addition to a peak signal obtained only when the spreading code is in phase with the spread signal. This peak signal based on the noise component randomly appears independently of transmission data. If, therefore, this peak signal is detected and demodulated, an erroneous data signal may be obtained.

In this embodiment, therefore, the counter circuit 1010 counts the peak signals shown in FIG. 37A and output from the asynchronous despreading demodulation means 1009. When peak signals with the same polarity (opposite to the polarity in the preceding counting operation) are consecutively obtained M (M is an integer equal to or more than 2) times, the polarity of transmission data is determined, and data is demodulated. FIG. 37B shows a typical signal waveform in a case wherein a data signal is obtained by determining the polarity of transmission data when peak signals with the same polarity are consecutively obtained two times.

Obviously, as shown in FIG. 37B, a correct data signal is obtained by performing demodulation upon counting peak signals in FIG. 37A, and hence the same effects as those in the 17th embodiment can be obtained. In this arrangement, the polarity of transmission data is determined and the data is demodulated when peak signals with the same polarity are consecutively obtained two times. However, this number of times is not limited to two. Although with an arrangement designed to count many peak signals, no demodulated data may be obtained, the number of times of counting may be arbitrarily set within the range in which no problem occurs in demodulation. In this embodiment, the counter circuit 1010 is used as a demodulation means for demodulating data by counting peak signals with the same polarity which are output from the asynchronous despreading demodulation means 1009. However, the modulation means is not limited to the counter circuit as long as an equivalent function can be obtained.

What is claimed is:

1. A spread-spectrum demodulator comprising:
   N (N is an integer not less than 2) sample/hold circuits each of which samples/holds a received spread signal;
   a sample/hold control circuit which receives a first clock having the same frequency as that of a clock used to spread a baseband signal, and performs control to make said N sample/hold circuits sequentially perform sample/hold operation in synchronism with the first clock;
   a first spreading code generating circuit which generates N first spreading codes in synchronism with a second clock;
   a second spreading code generating circuit which generates N second spreading codes obtained by rearranging the first spreading codes in reverse order in synchronism with the second clock;
   N multipliers which multiply signals output from said sample/hold circuits and spreading codes output from said first spreading code generating circuit or said second spreading code generating circuit for each corresponding signal;
   an adder which adds outputs from said N multipliers;
   a peak detector which detects a peak of an output from said adder and demodulates a data signal on the basis of the detected peak; and
   a spreading code control circuit which alternately switches inputting of the first spreading codes from said first spreading code generating circuit to said multipliers and inputting of the second spreading codes from said second spreading code generating circuit to said multipliers every time the peak is detected by said peak detector.

2. A demodulator according to claim 1, wherein
   said first spreading code generating circuit comprises N flip-flop circuits of a first flip-flop circuit group each of which shifts the N first spreading codes in synchronism with the second clock, a first exclusive-OR circuit which receives outputs from a plurality of flip-flop circuits of said first flip-flop circuit group, and a first switch group which cascades the flip-flop circuits of said first flip-flop circuit group and connects an output of said first exclusive-OR circuit to an input of a first-stage flip-flop circuit in said first flip-flop circuit group,
   said second spreading code generating circuit comprises N flip-flop circuits of a second flip-flop circuit group each of which shifts the N second spreading codes in a reverse direction relative to the N first spreading codes in synchronism with the second clock, a second exclusive-OR circuit which receives outputs from a plurality of flip-flop circuits in said second flip-flop circuit group, and a second switch group which cascades the flip-flop circuits of said second flip-flop circuit group and connects an output of said second exclusive-OR circuit to an input of a first-stage flip-flop circuit in said second flip-flop circuit group, and
   said spreading code control circuit alternately switches control operation of said first switch group and said second switch group every time the peak is detected by said peak detector.

3. A demodulator according to claim 2, wherein inputs of the respective flip-flop circuits of said first flip-flop circuit group excluding the first-stage flip-flop circuit, are connected to inputs of the respective flip-flop circuits of said second flip-flop circuit group excluding the first-stage flip-flop circuit, for each corresponding circuit, to output the first spreading codes or second spreading codes from the respective flip-flop circuits of said first flip-flop circuit group.

4. A demodulator according to claim 3, wherein
   said peak detector comprises means for determining a reference level from a peak level of an output from said adder and a predetermined lower limit level, and means for comparing the reference level with an output from said adder to generate a control signal synchronized with a trailing edge of a peak signal of an output from said adder, and
   said spreading code control circuit alternately switches control operation of turning on said first switch group and control operation of turning on said second switch group every time the control signal is output.

5. A demodulator according to claim 3, wherein said peak detector comprises means for determining the lower limit level on the basis of a power supply voltage and a common mode level.

6. A spread-spectrum demodulator comprising:
N (N is an integer not less than 2) sample/hold circuits each of which samples/holds a received spread signal in synchronism with a first clock having the same frequency as that of a clock used to spread the data signal;
a spreading code generating circuit which generates N spreading codes in synchronism with a second clock;
N multipliers which multiply signals output from said sample/hold circuits and spreading codes output from said spreading code generating circuit for each corresponding signal;
an adder which adds outputs from said N multipliers;
a peak detector which detects a peak of an output from said adder and demodulates a data signal on the basis of the detected peak; and
a clock control circuit which controls inputting of the second clock to said spreading code generating circuit in accordance with detection of the peak by said peak detector, wherein said clock control circuit alternately switches stoppage and resumption of inputting of the second clock to said spreading code generating circuit every time the peak is detected by said peak detector.

7. A spread-spectrum demodulator comprising:
N (N is an integer not less than 2) sample/hold circuits each of which samples/holds a received spread signal in synchronism with a first clock having the same frequency as that of a clock used to spread the data signal;
a spreading code generating circuit which generates N spreading codes in synchronism with a second clock;
N multipliers which multiply signals output from said sample/hold circuits and spreading codes output from said spreading code generating circuit for each corresponding signal;
an adder which adds outputs from said N multipliers;
a peak detector which detects a peak of an output from said adder and demodulates a data signal on the basis of the detected peak; and
a clock control circuit which controls inputting of the second clock to said spreading code generating circuit in accordance with detection of the peak by said peak detector,
wherein said clock control circuit stops inputting the second clock to said spreading code generating circuit for a predetermined period of time when the peak is detected by said peak detector.

8. A spread-spectrum demodulator comprising:
a comparator which converts a received spread signal into a digital signal in synchronism with a first clock having the same frequency as that of a clock used to spread a baseband signal;
(N−1) (N is an integer not less than 2) register circuits which output (N−1) signals by delaying an output signal from said comparator circuit by one period to (N−1) periods of the first clock, respectively;
a spreading code generating circuit which generates N spreading codes in synchronism with a second clock;
N multipliers which multiply signals output from said comparator circuit and said register circuits and spreading codes output from said spreading code generating circuit for each corresponding signal;
an adder which adds outputs from said N multipliers;
a peak detector which detects a peak of an output from said adder and demodulates a data signal on the basis of the detected peak; and
a clock control circuit which controls inputting of the second clock to said spreading code generating circuit in accordance with detection of the peak by said peak detector.

9. A demodulator according to claim 8, wherein said clock control circuit alternately switches stoppage and resumption of inputting of the second clock to said spreading code generating circuit every time the peak is detected by said peak detector.

10. A demodulator according to claim 8, wherein said clock control circuit stops inputting the second clock to said spreading code generating circuit for a predetermined period of time when the peak is detected by said peak detector.

11. A spread-spectrum demodulator comprising:
a comparator which converts a received spread signal into a digital signal in synchronism with a first clock having the same frequency as that of a clock used to spread a baseband signal;
(N−1) (N is an integer not less than 2) register circuits which output (N−1) signals by delaying an output signal from said comparator circuit by one period to (N−1) periods of the first clock, respectively;
a first spreading code generating circuit which generates N first spreading codes in synchronism with a second clock;
a second spreading code generating circuit which generates N second spreading codes obtained by rearranging the first spreading codes in reverse order in synchronism with the second clock;
N multipliers which multiply signals output from said comparator circuit and said register circuits and spreading codes output from said first spreading code generating circuit or
said second spreading code generating circuit for each corresponding signal;
an adder which adds outputs from said N multipliers;
a peak detector which detects a peak of an output from said adder and demodulates a data signal on the basis of the detected peak; and
a spreading code control circuit which alternately switches inputting of the first spreading codes from said first spreading code generating circuit to said multipliers and inputting of the second spreading codes from said second spreading code generating circuit to said multipliers every time the peak is detected by said peak detector.

12. A demodulator according to claim 11, wherein
said register circuit comprises a flip-flop circuit,
said first spreading code generating circuit comprises N flip-flop circuits of a first flip-flop circuit group each of which shifts the N first spreading codes in synchronism with the second clock, a first exclusive-OR circuit which receives outputs from a plurality of flip-flop circuits of said first flip-flop circuit group, and a first switch group which cascades the flip-flop circuits of said first flip-flop circuit group and connects an output of said first exclusive-OR circuit to an input of a first-stage flip-flop circuit in said first flip-flop circuit group,
said second spreading code generating circuit comprises N flip-flop circuits of a second flip-flop circuit group each of which shifts the N second spreading codes in a reverse direction relative to the N first spreading codes in synchronism with the second clock, a second exclusive-OR circuit which receives outputs from a plurality of flip-flop circuits in said second flip-flop circuit group, and a second switch group which cascades the flip-flop circuits of said second flip-flop circuit group and connects an output of said second exclusive-OR circuit to an input of a first-stage flip-flop circuit in said second flip-flop circuit group, and said spreading code control circuit alternately switches control operation of said first switch group and said second switch group every time the peak is detected by said peak detector.

13. A demodulator according to claim 12, wherein inputs of the respective flip-flop circuits of said first flip-flop circuit group excluding the first-stage flip-flop circuit, are connected to inputs of the respective flip-flop circuits of said second flip-flop circuit group excluding the first-stage flip-flop circuit, for each corresponding circuit, to output the first spreading codes or second spreading codes from the respective flip-flop circuits of said first flip-flop circuit group.

14. A demodulator according to claim 13, wherein said peak detector comprises means for determining a reference level from a peak level of an output from said adder and a predetermined lower limit level, and means for comparing the reference level with an output from said adder to generate a control signal synchronized with a trailing edge of a peak signal of an output from said adder, and said spreading code control circuit alternately switches control operation of turning on said first switch group and control operation of turning on said second switch group every time the control signal is output.

15. A demodulator according to claim 13, wherein said peak detector comprises means for determining the lower limit level on the basis of a power supply voltage and a common mode level.

16. A spread-spectrum demodulator comprising:

N (N is an integer not less than 2) sample/hold circuits each of which samples/holds a received spread signal;

a sample/hold control circuit which receives a first clock having the same frequency as that of a clock used to spread a baseband signal, and performs control to make said N sample/hold circuits sequentially perform sample/hold operation in synchronism with the first clock;

a first spreading code generating circuit which generates N first spreading codes in synchronism with a second clock;

a second spreading code generating circuit which generates N second spreading codes obtained by rearranging the first spreading codes in reverse order in synchronism with the second clock;

a polarity conversion circuit which outputs nearly half of the N spreading codes output from said first spreading code generating circuit or said second spreading code generating circuit which correspond to either newer or older spread signals in a reception order upon performing polarity conversion such that each of the spreading codes exhibits two polarity states, i.e., inverted and non-inverted states, during one period of the second clock, and outputs remaining nearly half of the codes without any change, N multipliers which multiply signals output from said sample/hold circuits and spreading codes output from said polarity conversion circuit for each corresponding signal;

an adder which adds outputs from said N multipliers;

a peak detector which detects a peak of an output from said adder and demodulates a data signal on the basis of the detected peak; and a spreading code control circuit which alternately switches inputting of the first spreading codes from said first spreading code generating circuit to said polarity conversion circuit and inputting of the second spreading codes from said second spreading code generating circuit to said polarity conversion circuit every time the peak is detected by said peak detector.

17. A demodulator according to claim 16, wherein said first spreading code generating circuit comprises N flip-flop circuits of a first flip-flop circuit group each of which shifts the N first spreading codes in synchronism with the second clock, a first exclusive-OR circuit which receives outputs from a plurality of flip-flop circuits of said first flip-flop circuit group, and a first switch group which cascades the flip-flop circuits of said first flip-flop circuit group and connects an output of said first exclusive-OR circuit to an input of a first-stage flip-flop circuit in said first flip-flop circuit group, said second spreading code generating circuit comprises N flip-flop circuits of a second flip-flop circuit group each of which shifts the N second spreading codes in a reverse direction relative to the N first spreading codes in synchronism with the second clock, a second exclusive-OR circuit which receives outputs from a plurality of flip-flop circuits in said second flip-flop circuit group, and a second switch group which cascades the flip-flop circuits of said second flip-flop circuit group and connects an output of said second exclusive-OR circuit to an input of a first-stage flip-flop circuit in said second flip-flop circuit group, and said spreading code control circuit alternately switches control operation of said first switch group and said second switch group every time the peak is detected by said peak detector.

18. A demodulator according to claim 17, wherein inputs of the respective flip-flop circuits of said first flip-flop circuit group excluding the first-stage flip-flop circuit, are connected to inputs of the respective flip-flop circuits of said second flip-flop circuit group excluding the first-stage flip-flop circuit, for each corresponding circuit, to output the first spreading codes or second spreading codes from the respective flip-flop circuits of said first flip-flop circuit group.

19. A demodulator according to claim 18, wherein said peak detector comprises means for determining a reference level from a peak level of an output from said adder and a predetermined lower limit level, and means for comparing the reference level with an output from said adder to generate a control signal synchronized with a trailing edge of a peak signal of an output from said adder, and said spreading code control circuit alternately switches control operation of turning on said first switch group and control operation of turning on said second switch group every time the control signal is output.

20. A demodulator according to claim 18, wherein said peak detector comprises means for determining the lower limit level on the basis of a power supply voltage and a common mode level.

21. A spread-spectrum demodulator comprising:

N (N is an integer not less than 2) sample/hold circuits each of which samples/holds a received spread signal;

a sample/hold control circuit which receives a first clock having the same frequency as that of a clock used to spread a baseband signal, and performs control to make said N sample/hold circuits sequentially perform sample/hold operation in synchronism with the first clock;

a first spreading code generating circuit which generates N first spreading codes in synchronism with a second clock;

a second spreading code generating circuit which generates N second spreading codes obtained by rearranging the first spreading codes in reverse order in synchronism with the second clock;

N multipliers which multiply signals output from said sample/hold circuits and spreading codes output from said first spreading code generating circuit or said second spreading code generating circuit;

a polarity conversion circuit which outputs nearly half of multiplier output signals from said N multipliers which correspond to either newer or older spread signals in a reception order upon performing polarity conversion such that each of the multiplier output signals exhibits two polarity states, i.e., inverted and noninverted states, during one period of the second clock, and outputs remaining nearly half of the multiplier output signals without any change, an adder which adds outputs from said polarity conversion circuit;

a peak detector which detects a peak of an output from said adder and demodulates a data signal on the basis of the detected peak; and a spreading code control circuit which alternately switches inputting of the first spreading codes from said first spreading code generating circuit to said multipliers and inputting of the second spreading codes from said second spreading code generating circuit to said multipliers every time the peak is detected by said peak detector.

22. A demodulator according to claim 21, wherein said first spreading code generating circuit comprises N flip-flop circuits of a first flip-flop circuit group each of which shifts the first spreading code in synchronism with the second clock, a first exclusive-OR circuit which receives outputs from a plurality of flip-flop circuits of said first flip-flop circuit group, and a first switch group which cascades the flip-flop circuits of said first flip-flop circuit group and connects an output of said first exclusive-OR circuit to an input of a first-stage flip-flop circuit in said first flip-flop circuit group, said second spreading code generating circuit comprises N flip-flop circuits of a second flip-flop circuit group each of which shifts the second spreading code in a reverse direction relative to the N first spreading codes in synchronism with the second clock, a second exclusive-OR circuit which receives outputs from a plurality of flip-flop circuits in said second flip-flop circuit group, and a second switch group which cascades the flip-flop circuits of said second flip-flop circuit group and connects an output of said second exclusive-OR circuit to an input of a first-stage flip-flop circuit in said second flip-flop circuit group, and said spreading code control circuit alternately switches control operation of said first switch group and said second switch group every time the peak is detected by said peak detector.

23. A demodulator according to claim 22, wherein inputs of the respective flip-flop circuits of said first flip-flop circuit group excluding the first-stage flip-flop circuit, are connected to inputs of the respective flip-flop circuits of said second flip-flop circuit group excluding the first-stage flip-flop circuit, for each corresponding circuit, to output the first spreading codes or second spreading codes from the respective flip-flop circuits of said first flip-flop circuit group.

24. A demodulator according to claim 23, wherein said peak detector comprises means for determining a reference level from a peak level of an output from said adder and a predetermined lower limit level, and means for comparing the reference level with an output from said adder to generate a control signal synchronized with a trailing edge of a peak signal of an output from said adder, and said spreading code control circuit alternately switches control operation of turning on said first switch group and control operation of turning on said second switch group every time the control signal is output.

25. A demodulator according to claim 23, wherein said peak detector comprises means for determining the lower limit level on the basis of a power supply voltage and a common mode level.

26. A spread-spectrum demodulator comprising:

N (N is an integer not less than 2) sample/hold circuits each of which samples/holds a received spread signal;

a sample/hold control circuit which receives a first clock having the same frequency as that of a clock used to spread a baseband signal, and performs control to make said N sample/hold circuits sequentially perform sample/hold operation in synchronism with the first clock;

a first spreading code generating circuit which generates N first spreading codes in synchronism with a second clock;

a second spreading code generating circuit which generates N second spreading codes obtained by rearranging the first spreading codes in reverse order in synchronism with the second clock;

a polarity conversion circuit which outputs nearly half of sample/hold output signals from said N sample/hold circuits which correspond to either newer or older spread signals in a reception order upon performing polarity conversion such that each of the sample/hold output signals exhibits two polarity states, i.e., inverted and noninverted states, during one period of the second clock, and outputs remaining nearly half of the sample/hold signals without any change, N multipliers which multiply signals output from said polarity conversion circuit and spreading codes output from said first spreading code generating circuit or said second spreading code generating circuit;

an adder which adds outputs from said N multipliers;

a peak detector which detects a peak of an output from said adder and demodulates a data signal on the basis of the detected peak; and a spreading code control circuit which alternately switches inputting of the first spreading codes from said first spreading code generating circuit to said multipliers and inputting of the second spreading codes from said second spreading code generating circuit to said multipliers every time the peak is detected by said peak detector.

27. A demodulator according to claim 26, wherein said first spreading code generating circuit comprises N flip-flop circuits of a first flip-flop circuit group each of which shifts the N first spreading codes in synchronism with the second clock, a first exclusive-OR circuit which receives outputs from a plurality of flip-flop circuits of said first flip-flop circuit group, and a first switch group which cascades the flip-flop circuits of said first flip-flop circuit group and connects an output of said first exclusive-OR circuit to an input of a first-stage flip-flop circuit in said first flip-flop circuit group, said second spreading code generating circuit comprises N flip-flop circuits of a second flip-flop circuit group each of which shifts the N second spreading codes in a reverse direction relative to the first spreading code in synchronism with the second clock, a second exclusive-OR circuit which receives outputs from a plurality of flip-flop circuits in said second flip-flop circuit group, and a second switch group which cascades the flip-flop circuits of said second flip-flop circuit group and connects an output of said second exclusive-OR circuit to an input of a first-stage flip-flop circuit in said second flip-flop circuit group, and said spreading code control circuit alternately switches control operation of said first switch group and said second switch group every time the peak is detected by said peak detector.

28. A demodulator according to claim 27, wherein inputs of the respective flip-flop circuits of said first flip-flop circuit group excluding the first-stage flip-flop circuit, are connected to inputs of the respective flip-flop circuits of said second flip-flop circuit group excluding the first-stage flip-flop circuit, for each corresponding circuit, to output the first spreading codes or second spreading codes from the respective flip-flop circuits of said first flip-flop circuit group.

29. A demodulator according to claim 28, wherein said peak detector comprises means for determining a reference level from a peak level of an output from said adder and a predetermined lower limit level, and means for comparing the reference level with an output from said adder to generate a control signal synchronized with a trailing edge of a peak signal of an output from said adder, and said spreading code control circuit alternately switches control operation of turning on said first switch group and control operation of turning on said second switch group every time the control signal is output.

30. A demodulator according to claim 28, wherein said peak detector comprises means for determining the lower limit level on the basis of a power supply voltage and a common mode level.

31. A spread-spectrum demodulator comprising:

N (N is an integer not less than 2) sample/hold circuits each of which samples/holds a received spread signal in synchronism with a first clock having the same frequency as that of a clock used to spread a baseband signal;

a spreading code generating circuit which generates N spreading codes in synchronism with a second clock;

a polarity conversion circuit which outputs nearly half of the N spreading codes output from said spreading code generating circuit which correspond to either newer or older spread signals in a reception order upon performing polarity conversion such that each of the spreading codes exhibits two polarity states, i.e., inverted and noninverted states, during one period of the second clock, and outputs remaining nearly half of the codes without any change;

N multipliers which multiply signals output from said sample/hold circuits and spreading codes output from said polarity conversion circuit for each corresponding signal;

an adder which adds outputs from said N multipliers;

a peak detector which detects a peak of an output from said adder and demodulates a data signal on the basis of the detected peak; and a clock control circuit which controls inputting of the second clock to said spreading code generating circuit in accordance with detection of the peak by said peak detector.

32. A demodulator according to claim 31, wherein said clock control circuit alternately switches stoppage and resumption of inputting of the second clock to said spreading code generating circuit every time the peak is detected by said peak detector.

33. A demodulator according to claim 32, wherein said clock control circuit stops inputting the second clock to said spreading code generating circuit for a predetermined period of time when the peak is detected by said peak detector.

34. A spread-spectrum demodulator comprising:

N (N is an integer not less than 2) sample/hold circuits each of which samples/holds a received spread signal in synchronism with a first clock having the same frequency as that of a clock used to spread a baseband signal;

a spreading code generating circuit which generates N spreading codes in synchronism with a second clock;

N multipliers which multiply signals output from said sample/hold circuits and spreading codes output from said spreading code generating circuit for each corresponding signal;

a polarity conversion circuit which outputs nearly half of the multiplier output signals from said N multipliers which correspond to either newer or older spread signals in a reception order upon performing polarity conversion such that each of the multiplier output signals exhibits two polarity states, i.e., inverted and noninverted states, during one period of the second clock, and outputs remaining nearly half of the multiplier output signals without any change;

an adder which adds outputs from said polarity conversion circuit;

a peak detector which detects a peak of an output from said adder and demodulates a data signal on the basis of the detected peak; and a clock control circuit which controls inputting of the second clock to said spreading code generating circuit in accordance with detection of the peak by said peak detector.

35. A demodulator according to claim 34, wherein said clock control circuit alternately switches stoppage and resumption of inputting of the second clock to said spreading code generating circuit every time the peak is detected by said peak detector.

36. A demodulator according to claim 34, wherein said clock control circuit stops inputting the second clock to said spreading code generating circuit for a predetermined period of time when the peak is detected by said peak detector.

37. A spread-spectrum demodulator comprising:

N (N is an integer not less than 2) sample/hold circuits each of which samples/holds a received spread signal in synchronism with a first clock having the same frequency as that of a clock used to spread a baseband signal;

a spreading code generating circuit which generates N spreading codes in synchronism with a second clock;

a polarity conversion circuit which outputs nearly half of the sample/hold output signals from said N sample/hold circuits which correspond to either newer or older spread signals in a reception order upon performing polarity conversion such that each of the sample/hold output signals exhibits two polarity states, i.e., inverted and noninverted states, during one period of the second clock, and outputs remaining nearly half of the sample/hold output signals without any change;

N multipliers which multiply signals output from said polarity conversion circuit and spreading codes output from said spreading code generating circuit for each corresponding signal;

an adder which adds outputs from said N multipliers;

a peak detector which detects a peak of an output from said adder and demodulates a data signal on the basis of the detected peak; and a clock control circuit which controls inputting of the second clock to said spreading code generating circuit in accordance with detection of the peak by said peak detector.

38. A demodulator according to claim 37, wherein said clock control circuit alternately switches stoppage and resumption of inputting of the second clock to said spreading code generating circuit every time the peak is detected by said peak detector.

39. A demodulator according to claim 37, wherein said clock control circuit stops inputting the second clock to said spreading code generating circuit for a predetermined period of time when the peak is detected by said peak detector.

40. A spread-spectrum demodulator comprising:

a comparator which converts a received spread signal into a digital signal in synchronism with a first clock having the same frequency as that of a clock used to spread a baseband signal;

(N−1) (N is an integer not less than 2) register circuits which output (N−1) signals by delaying an output signal from said comparator circuit by one period to (N−1) periods of the first clock, respectively;

a first spreading code generating circuit which generates N first spreading codes in synchronism with a second clock;

a second spreading code generating circuit which generates N second spreading codes obtained by rearranging the first spreading codes in reverse order in synchronism with the second clock;

a polarity conversion circuit which outputs nearly half of the N spreading codes output from said first spreading code generating circuit or said second spreading code generating circuit which correspond to either newer or older spread signals in a reception order upon performing polarity conversion such that each of the spreading codes exhibits two polarity states, i.e., inverted and non-inverted states, during one period of the second clock, and outputs remaining nearly half of the codes without any change, N multipliers which multiply signals output from said comparator circuit and said register circuits and spreading codes output from said spreading code generating circuit for each corresponding signal;

an adder which adds outputs from said N multipliers;

a peak detector which detects a peak of an output from said adder and demodulates a data signal on the basis of the detected peak; and a spreading code control circuit which alternately switches inputting of the first spreading codes from said first spreading code generating circuit to said polarity conversion circuit and inputting of the second spreading codes from said second spreading code generating circuit to said polarity conversion circuit every time the peak is detected by said peak detector.

41. A demodulator according to claim 40, wherein said register circuit comprises a flip-flop circuit, said first spreading code generating circuit comprises N flip-flop circuits of a first flip-flop circuit group each of which shifts the N first spreading codes in synchronism with the second clock, a first exclusive-OR circuit which receives outputs from a plurality of flip-flop circuits of said first flip-flop circuit group, and a first switch group which cascades the flip-flop circuits of said first flip-flop circuit group and connects an output of said first exclusive-OR circuit to an input of a first-stage flip-flop circuit in said first flip-flop circuit group, said second spreading code generating circuit comprises N flip-flop circuits of a second flip-flop circuit group each of which shifts the N second spreading codes in a reverse direction relative to the first spreading code in synchronism with the second clock, a second exclusive-OR circuit which receives outputs from a plurality of flip-flop circuits in said second flip-flop circuit group, and a second switch group which cascades the flip-flop circuits of said second flip-flop circuit group and connects an output of said second exclusive-OR circuit to an input of a first-stage flip-flop circuit in said second flip-flop circuit group, and said spreading code control circuit alternately switches control operation of said first switch group and said second switch group every time the peak is detected by said peak detector.

42. A demodulator according to claim 41, wherein inputs of the respective flip-flop circuits of said first flip-flop circuit group excluding the first-stage flip-flop circuit, are connected to inputs of the respective flip-flop circuits of said second flip-flop circuit group excluding the first-stage flip-flop circuit, for each corresponding circuit, to output the first spreading codes or second spreading codes from the respective flip-flop circuits of said first flip-flop circuit group.

43. A demodulator according to claim 42, wherein said peak detector comprises means for determining a reference level from a peak level of an output from said adder and a predetermined lower limit level, and means for comparing the reference level with an output from said adder to generate a control signal synchronized with a trailing edge of a peak signal of an output from said adder, and said spreading code control circuit alternately switches control operation of turning on said first switch group and control operation of turning on said second switch group every time the control signal is output.

44. A demodulator according to claim 42, wherein said peak detector comprises means for determining the lower limit level on the basis of a power supply voltage and a common mode level.

45. A spread-spectrum demodulator comprising:

a comparator which converts a received spread signal into a digital signal in synchronism with a first clock having the same frequency as that of a clock used to spread a baseband signal;

(N−1) (N is an integer not less than 2) register circuits which output (N−1) signals by delaying an output signal from said comparator circuit by one period to (N−1) periods of the first clock, respectively;

a first spreading code generating circuit which generates N first spreading codes in synchronism with a second clock;

a second spreading code generating circuit which generates N second spreading codes obtained by rearranging the first spreading codes in reverse order in synchronism with the second clock;

N multipliers which multiply signals output from said comparator circuit and said register circuits and spreading codes output from said first spreading code generating circuit or said second spreading generating circuit for each corresponding signal;

a polarity conversion circuit which outputs nearly half of the multiplier output signals from said N multipliers which correspond to either newer or older spread signals in a reception order upon performing polarity conversion such that each of the multiplier output signals exhibits two polarity states, i.e., inverted and noninverted states, during one period of the second clock, and outputs remaining nearly half of the multiplier output signals without any change, an adder which adds outputs from said polarity conversion circuit;

a peak detector which detects a peak of an output from said adder and demodulates a data signal on the basis of the detected peak; and a spreading code control circuit which alternately switches inputting of the first spreading codes from said first spreading code generating circuit to said multipliers and inputting of the second spreading codes from said second spreading code generating circuit to said multipliers time the peak is detected by said peak detector.

46. A demodulator according to claim 45, wherein said register circuit comprises a flip-flop circuit, said first spreading code generating circuit comprises N flip-flop circuits of a first flip-flop circuit group each of which shifts the N first spreading codes in synchronism with the second clock, a first exclusive-OR circuit which receives outputs from a plurality of flip-flop circuits of said first flip-flop circuit group, and a first switch group which cascades the flip-flop circuits of said first flip-flop circuit group and connects an output of said first exclusive-OR circuit to an input of a first-stage flip-flop circuit in said first flip-flop circuit group, said second spreading code generating circuit comprises N flip-flop circuits of a second flip-flop circuit group each of which shifts the N second spreading codes in a reverse direction relative to the first spreading code in synchronism with the second clock, a second exclusive-OR circuit which receives outputs from a plurality of flip-flop circuits in said second flip-flop circuit group, and a second switch group which cascades the flip-flop circuits of said second flip-flop circuit group and connects an output of said second exclusive-OR circuit to an input of a first-stage flip-flop circuit in said second flip-flop circuit group, and said spreading code control circuit alternately switches control operation of said first switch group and said second switch group every time the peak is detected by said peak detector.

47. A demodulator according to claim 46, wherein inputs of the respective flip-flop circuits of said first flip-flop circuit group excluding the first-stage flip-flop circuit, are connected to inputs of the respective flip-flop circuits of said second flip-flop circuit group excluding the first-stage flip-flop circuit, for each corresponding circuit, to output the first spreading codes or second spreading codes from the respective flip-flop circuits of said first flip-flop circuit group.

48. A demodulator according to claim 47, wherein said peak detector comprises means for determining a reference level from a peak level of an output from said adder and a predetermined lower limit level, and means for comparing the reference level with an output from said adder to generate a control signal synchronized with a trailing edge of a peak signal of an output from said adder, and said spreading code control circuit alternately switches control operation of turning on said first switch group and control operation of turning on said second switch group every time the control signal is output.

49. A demodulator according to claim 47, wherein said peak detector comprises means for determining the lower limit level on the basis of a power supply voltage and a common mode level.

50. A spread-spectrum demodulator comprising:

a comparator which converts a received spread signal into a digital signal in synchronism with a first clock having the same frequency as that of a clock used to spread a baseband signal;

(N−1) (N is an integer not less than 2) register circuits which output (N−1) signals by delaying an output signal from said comparator circuit by one period to (N−1) periods of the first clock, respectively;

a first spreading code generating circuit which generates N first spreading codes in synchronism with a second clock;

a second spreading code generating circuit which generates N second spreading codes obtained by rearranging the first spreading codes in reverse order in synchronism with the second clock;

a polarity conversion circuit which outputs nearly half of output signals from said comparator circuit and said register circuits which correspond to either newer or older spread signals in a reception order upon performing polarity conversion such that each of the output signals exhibits two polarity states, i.e., inverted and noninverted states, during one period of the second clock, and outputs remaining nearly half of the output signals without any change, N multipliers which multiply signals output from said polarity conversion circuit and spreading codes output from said first spreading code generating circuit or said second spreading generating circuit for each corresponding signal;

an adder which adds outputs from said N multipliers;

a peak detector which detects a peak of an output from said adder and demodulates a data signal on the basis of the detected peak; and a spreading code control circuit which alternately switches inputting of the first spreading codes from said first spreading code generating circuit to said multipliers and inputting of the second spreading codes from said second spreading code generating circuit to said multipliers time the peak is detected by said peak detector.

51. A demodulator according to claim 50, wherein said register circuit comprises a flip-flop circuit, said first spreading code generating circuit comprises N flip-flop circuits of a first flip-flop circuit group each of which shifts the N first spreading codes in synchronism with the second clock, a first exclusive-OR circuit which receives outputs from a plurality of flip-flop circuits of said first flip-flop circuit group, and a first switch group which cascades the flip-flop circuits of said first flip-flop circuit group and connects an output of said first exclusive-OR circuit to an input of a first-stage flip-flop circuit in said first flip-flop circuit group, said second spreading code generating circuit comprises N flip-flop circuits of a second flip-flop circuit group each of which shifts the N second spreading codes in a reverse direction relative to the first spreading code in synchronism with the second clock, a second exclusive-OR circuit which receives outputs from a plurality of flip-flop circuits in said second flip-flop circuit group, and a second switch group which cascades the flip-flop circuits of said second flip-flop circuit group and connects an output of said second exclusive-OR circuit to an input of a first-stage flip-flop circuit in said second flip-flop circuit group, and said spreading code control circuit alternately switches control operation of said first switch group and said second switch group every time the peak is detected by said peak detector.

52. A demodulator according to claim 51, wherein inputs of the respective flip-flop circuits of said first flip-flop circuit group excluding the first-stage flip-flop circuit, are connected to inputs of the respective flip-flop circuits of said second flip-flop circuit group excluding the first-stage flip-flop circuit, for each corresponding circuit, to output the first spreading codes or second spreading codes from the respective flip-flop circuits of said first flip-flop circuit group.

53. A demodulator according to claim 52, wherein said peak detector comprises means for determining a reference level from a peak level of an output from said adder and a predetermined lower limit level, and means for comparing the reference level with an output from said adder to generate a control signal synchronized with a trailing edge of a peak signal of an output from said adder, and said spreading code control circuit alternately switches control operation of turning on said first switch group and control operation of turning on said second switch group every time the control signal is output.

54. A demodulator according to claim 52, wherein said peak detector comprises means for determining the lower limit level on the basis of a power supply voltage and a common mode level.

55. A spread-spectrum demodulator comprising:

a comparator which converts a received spread signal into a digital signal in synchronism with a first clock having the same frequency as that of a clock used to spread a baseband signal;

(N-1) (N is an integer not less than 2) register circuits which output (N-1) signals by delaying an output signal from said comparator circuit by one period to (N-1) periods of the first clock, respectively;

a spreading code generating circuit which generates N spreading codes in synchronism with a second clock;

a polarity conversion circuit which outputs nearly half of N spreading codes output from said spreading code generating circuit which correspond to either newer or older spread signals in a reception order upon performing polarity conversion such that each of the spreading codes exhibits two polarity states, i.e., inverted and noninverted states, during one period of the second clock, and outputs remaining nearly half of the codes without any change, N multipliers which multiply signals output from said comparator circuit and said register circuits and spreading codes output from said polarity conversion circuit for each corresponding signal;

an adder which adds outputs from said N multipliers;

a peak detector which detects a peak of an output from said adder and demodulates a data signal on the basis of the detected peak; and a clock control circuit which controls inputting of the second clock to said spreading code generating circuit in accordance with detection of the peak by said peak detector.

56. A demodulator according to claim 55, wherein said clock control circuit alternately switches stoppage and resumption of inputting of the second clock to said spreading code generating circuit every time the peak is detected by said peak detector.

57. A demodulator according to claim 55, wherein said clock control circuit stops inputting the second clock to said spreading code generating circuit for a predetermined period of time when the peak is detected by said peak detector.

58. A spread-spectrum demodulator comprising:

a comparator which converts a received spread signal into a digital signal in synchronism with a first clock having the same frequency as that of a clock used to spread a baseband signal;

(N-1) (N is an integer not less than 2) register circuits which output (N-1) signals by delaying an output signal from said comparator circuit by one period to (N-1) periods of the first clock, respectively;

a spreading code generating circuit which generates N spreading codes in synchronism with a second clock;

N multipliers which multiply signals output from said comparator circuit and said register circuits and spreading codes output from said spreading code generating circuit for each corresponding signal;

a polarity conversion circuit which outputs nearly half of multiplier output signals from said N multipliers which correspond to either newer or older spread signals in a reception order upon performing polarity conversion such that each of the multiplier output signals exhibits two polarity states, i.e., inverted and noninverted states, during one period of the second clock, and outputs remaining nearly half of the multiplier output signals without any change, an adder which adds outputs from said polarity conversion circuit;

a peak detector which detects a peak of an output from said adder and demodulates a data signal on the basis of the detected peak; and a clock control circuit which controls inputting of the second clock to said spreading code generating circuit in accordance with detection of the peak by said peak detector.

59. A demodulator according to claim 58, wherein said clock control circuit alternately switches stoppage and resumption of inputting of the second clock to said spreading code generating circuit every time the peak is detected by said peak detector.

60. A demodulator according to claim 58, wherein said clock control circuit stops inputting the second clock to said spreading code generating circuit for a predetermined period of time when the peak is detected by said peak detector.

61. A spread-spectrum demodulator comprising:

a comparator which converts a received spread signal into a digital signal in synchronism with a first clock having the same frequency as that of a clock used to spread a baseband signal;

(N-1) (N is an integer not less than 2) register circuits which output (N-1) signals by delaying an output signal from said comparator circuit by one period to (N-1) periods of the first clock, respectively;

a spreading code generating circuit which generates N spreading codes in synchronism with a second clock;

a polarity conversion circuit which outputs nearly half of output signals from said comparator circuit and said sample/hold circuits which correspond to either newer or older spread signals in a reception order upon performing polarity conversion such that each of the output signals exhibits two polarity states, i.e., inverted and noninverted states, during one period of the second clock, and outputs remaining nearly half of the output signals without any change, N multipliers which multiply signals output from said polarity conversion circuit and spreading codes output from said spreading code generating circuit for each corresponding signal;

an adder which adds outputs from said N multipliers;

a peak detector which detects a peak of an output from said adder and demodulates a data signal on the basis of the detected peak; and a clock control circuit which controls inputting of the second clock to said spreading code generating circuit in accordance with detection of the peak by said peak detector.

62. A demodulator according to claim 61, wherein said clock control circuit alternately switches stoppage and resumption of inputting of the second clock to said spreading code generating circuit every time the peak is detected by said peak detector.

63. A demodulator according to claim 61, wherein said clock control circuit stops inputting the second clock to said spreading code generating circuit for a predetermined period of time when the peak is detected by said peak detector.

* * * * *